United States Patent
Huang et al.

(10) Patent No.: US 10,079,496 B2
(45) Date of Patent: Sep. 18, 2018

(54) SYSTEMS FOR MANAGING CHARGING DEVICES BASED ON BATTERY HEALTH INFORMATION

(71) Applicant: mophie, Inc., Tustin, CA (US)

(72) Inventors: Daniel Huang, Irvine, CA (US); Vannin Gale, Anaheim Hills, CA (US); Kerloss Sadek, Corona, CA (US)

(73) Assignee: mophie inc., Tustin, CA (US)

( * ) Notice: Subject to any disclaimer, the term of this patent is extended or adjusted under 35 U.S.C. 154(b) by 137 days.

(21) Appl. No.: 14/843,814

(22) Filed: Sep. 2, 2015

(65) Prior Publication Data
US 2016/0064979 A1 Mar. 3, 2016

Related U.S. Application Data

(60) Provisional application No. 62/045,461, filed on Sep. 3, 2014, provisional application No. 62/077,134, filed on Nov. 7, 2014.

(51) Int. Cl.
*H02J 7/00* (2006.01)

(52) U.S. Cl.
CPC .......... *H02J 7/0029* (2013.01); *H02J 7/0045* (2013.01); *H02J 7/0055* (2013.01); *H02J 7/0073* (2013.01);
(Continued)

(58) Field of Classification Search
CPC ...... H02J 7/0029; H02J 7/0055; H02J 7/0073; H02J 7/0045; H02J 7/0042; H02J 2007/0096
See application file for complete search history.

(56) References Cited

U.S. PATENT DOCUMENTS 3,851,126 A 11/1974 Keller
4,028,515 A 6/1977 Desio et al.
(Continued)

FOREIGN PATENT DOCUMENTS

CN 201252577 Y 6/2009
CN 301573426 S 6/2011
(Continued)

OTHER PUBLICATIONS

U.S. Appl. No. 29/410,518 including its prosecution history, filed Jan. 9, 2012, To.
(Continued)

*Primary Examiner* — Naum B Levin
(74) *Attorney, Agent, or Firm* — Knobbe, Martens, Olson & Bear LLP

(57) ABSTRACT

A charging device can include an input interface for receiving electrical power from a power source and an output interface for outputting electrical power to a mobile electronic device. The charging device can include a supplemental battery. A bypass electrical pathway can couple the input interface to the output interface to pass electrical charge from the power supply through the charging device to the mobile electronic device. A charging electrical pathway can couple the input interface to the supplemental battery. A discharge electrical pathway can couple the supplemental battery to the output interface. The bypass electrical pathway can include a voltage modifier configured to modify the voltage output by the output interface. The charging device can be configured to empirically determine the power capacity of the power supply. The charging device can monitor temperatures and/or battery health information, which can be used to reduce current or disable the charging device.

18 Claims, 32 Drawing Sheets

(52) U.S. Cl.
CPC ..... *H02J 7/0042* (2013.01); *H02J 2007/0096* (2013.01)

(56) References Cited

U.S. PATENT DOCUMENTS

| | | | |
|---|---|---|---|
| D267,795 S | 2/1983 | Mallon | |
| 4,479,596 A | 10/1984 | Swanson | |
| 4,515,272 A | 5/1985 | Newhouse | |
| D284,372 S | 6/1986 | Carpenter | |
| D300,831 S | 4/1989 | Jenkinds et al. | |
| D303,799 S | 10/1989 | Fennell et al. | |
| 4,951,817 A | 8/1990 | Barletta et al. | |
| D312,534 S | 12/1990 | Nelson et al. | |
| 5,001,772 A | 3/1991 | Holcomb et al. | |
| D322,719 S | 12/1991 | Jayez | |
| D327,868 S | 7/1992 | Oka | |
| 5,360,108 A | 11/1994 | Alagia | |
| 5,368,159 A | 11/1994 | Doria | |
| 5,383,091 A | 1/1995 | Snell | |
| 5,386,084 A | 1/1995 | Risko | |
| 5,508,123 A | 4/1996 | Fan | |
| D372,896 S | 8/1996 | Nagele et al. | |
| 5,586,002 A | 12/1996 | Notarianni | |
| 5,604,050 A | 2/1997 | Brunette et al. | |
| 5,610,979 A | 3/1997 | Yu | |
| 5,648,712 A | 7/1997 | Hahn | |
| D384,327 S | 9/1997 | Nakui | |
| 5,708,707 A | 1/1998 | Halttlunen et al. | |
| 5,711,013 A | 1/1998 | Collett et al. | |
| D392,248 S | 3/1998 | Johansson | |
| D392,939 S | 3/1998 | Finke-Anlauff | |
| 5,786,106 A | 7/1998 | Armani | |
| D400,162 S | 10/1998 | Lam | |
| D400,163 S | 10/1998 | Lam | |
| 5,816,459 A | 10/1998 | Armistead | |
| D400,495 S | 11/1998 | Deslyper et al. | |
| D400,496 S | 11/1998 | Barber et al. | |
| 5,859,481 A | 1/1999 | Banyas | |
| 5,864,766 A | 1/1999 | Chiang | |
| D405,801 S | 2/1999 | Nagele et al. | |
| D407,063 S | 3/1999 | Reis et al. | |
| 5,876,351 A | 3/1999 | Rohde | |
| D407,708 S | 4/1999 | Nagele et al. | |
| 5,896,277 A | 4/1999 | Leon et al. | |
| 5,932,855 A | 8/1999 | Wang et al. | |
| 5,959,433 A | 9/1999 | Rohde | |
| 5,973,477 A | 10/1999 | Chang | |
| D417,189 S | 11/1999 | Amero, Jr. et al. | |
| 6,043,626 A | 3/2000 | Snyder et al. | |
| 6,051,957 A | 4/2000 | Klein | |
| D424,512 S | 5/2000 | Ho | |
| 6,069,332 A | 5/2000 | Suchanek et al. | |
| D427,193 S | 6/2000 | Fedele | |
| 6,081,595 A | 6/2000 | Picaud | |
| D428,019 S | 7/2000 | Amron | |
| 6,082,535 A | 7/2000 | Mitchell | |
| D436,596 S | 1/2001 | Ito et al. | |
| 6,171,138 B1 | 1/2001 | Le Febvre et al. | |
| D438,004 S | 2/2001 | Watson et al. | |
| 6,184,654 B1 | 2/2001 | Bachner, III et al. | |
| D439,218 S | 3/2001 | Yu | |
| 6,201,867 B1 | 3/2001 | Koike | |
| 6,208,115 B1 | 3/2001 | Binder | |
| 6,266,539 B1 | 7/2001 | Pardo | |
| D446,497 S | 8/2001 | Yu | |
| 6,273,252 B1 | 8/2001 | Mitchell | |
| D447,462 S | 9/2001 | Kosiba | |
| 6,313,982 B1 | 11/2001 | Hino | |
| 6,317,313 B1 | 11/2001 | Mosgrove et al. | |
| 6,324,380 B1 | 11/2001 | Kiuchi et al. | |
| 6,346,791 B1 | 2/2002 | Berguirdjian | |
| 6,377,811 B1 | 4/2002 | Sood et al. | |
| 6,405,056 B1 | 6/2002 | Altschul et al. | |
| D460,411 S | 7/2002 | Wang | |
| D460,761 S | 7/2002 | Croley | |
| 6,415,138 B2 | 7/2002 | Sirola et al. | |
| 6,434,371 B1 | 8/2002 | Claxton | |
| 6,434,404 B1 | 8/2002 | Claxton et al. | |
| 6,441,588 B1 * | 8/2002 | Yagi ..................... H02J 7/0091 320/139 |
| 6,445,577 B1 | 9/2002 | Madsen et al. | |
| 6,471,056 B1 | 10/2002 | Tzeng | |
| D469,427 S | 1/2003 | Ma et al. | |
| 6,536,589 B2 | 3/2003 | Chang | |
| 6,538,413 B1 | 3/2003 | Beard et al. | |
| D472,384 S | 4/2003 | Richardson | |
| 6,552,513 B1 | 4/2003 | Li | |
| 6,555,990 B1 | 4/2003 | Yang | |
| 6,583,601 B2 | 6/2003 | Simoes et al. | |
| 6,594,472 B1 | 7/2003 | Curtis et al. | |
| 6,614,722 B2 | 9/2003 | Polany et al. | |
| 6,626,362 B1 | 9/2003 | Steiner et al. | |
| D481,716 S | 11/2003 | He et al. | |
| D482,529 S | 11/2003 | Hardigg et al. | |
| 6,646,864 B2 | 11/2003 | Richardson | |
| 6,650,085 B2 | 11/2003 | Lau et al. | |
| D484,874 S | 1/2004 | Chang et al. | |
| D485,834 S | 1/2004 | Davetas | |
| 6,681,003 B2 | 1/2004 | Linder et al. | |
| D487,458 S | 3/2004 | Gentil et al. | |
| 6,701,159 B1 | 3/2004 | Powell | |
| 6,708,887 B1 | 3/2004 | Garrett et al. | |
| 6,714,802 B1 | 3/2004 | Barvesten | |
| 6,785,566 B1 | 8/2004 | Irizarry | |
| D496,029 S | 9/2004 | Skulley et al. | |
| 6,794,849 B2 * | 9/2004 | Mori ................. G01R 31/3648 320/107 |
| 6,819,549 B1 | 11/2004 | Lammers-Meis et al. | |
| D500,041 S | 12/2004 | Tsujimoto | |
| 6,842,708 B2 * | 1/2005 | Odaohhara ............... G06F 1/28 702/57 |
| D503,679 S | 4/2005 | Andre et al. | |
| D506,612 S | 6/2005 | Rosa et al. | |
| D508,495 S | 8/2005 | Bone et al. | |
| D513,123 S | 12/2005 | Richardson et al. | |
| 6,980,777 B2 | 12/2005 | Shepherd et al. | |
| D513,451 S | 1/2006 | Richardson et al. | |
| D513,617 S | 1/2006 | Tierney | |
| 6,992,461 B2 | 1/2006 | Liang et al. | |
| D514,808 S | 2/2006 | Morine et al. | |
| D515,500 S | 2/2006 | Khasminsky | |
| D516,021 S | 2/2006 | Cheng | |
| D516,309 S | 3/2006 | Richardson et al. | |
| D516,553 S | 3/2006 | Richardson et al. | |
| D516,554 S | 3/2006 | Richardson et al. | |
| D516,807 S | 3/2006 | Richardson et al. | |
| D517,007 S | 3/2006 | Yong-Jian et al. | |
| D518,477 S | 4/2006 | Cheng | |
| D520,502 S | 5/2006 | Xu et al. | |
| D520,744 S | 5/2006 | Pangrec et al. | |
| 7,050,841 B1 | 5/2006 | Onda | |
| 7,059,769 B1 | 6/2006 | Potega | |
| 7,069,063 B2 | 6/2006 | Halkosaari et al. | |
| D525,582 S | 7/2006 | Chan | |
| D525,616 S | 7/2006 | Andre et al. | |
| 7,072,699 B2 | 7/2006 | Eiden | |
| 7,079,879 B1 | 7/2006 | Sylvester et al. | |
| 7,081,736 B2 | 7/2006 | Seil et al. | |
| D526,780 S | 8/2006 | Richardson et al. | |
| D526,958 S | 8/2006 | Shimizu | |
| D529,495 S | 10/2006 | Kent et al. | |
| D530,079 S | 10/2006 | Thomas et al. | |
| 7,151,356 B1 | 12/2006 | Chen | |
| D535,252 S | 1/2007 | Sandnes | |
| 7,158,376 B2 | 1/2007 | Richardson et al. | |
| 7,166,987 B2 | 1/2007 | Lee et al. | |
| D537,063 S | 2/2007 | Kim et al. | |
| 7,176,654 B2 * | 2/2007 | Meyer ................. H02J 7/0004 320/110 |
| 7,180,735 B2 | 2/2007 | Thomas et al. | |
| 7,180,754 B2 | 2/2007 | Qin et al. | |
| 7,194,291 B2 | 3/2007 | Peng | |
| D540,539 S | 4/2007 | Gutierrez | |
| 7,203,467 B2 | 4/2007 | Siddiqui | |

(56) References Cited

U.S. PATENT DOCUMENTS

| | | | |
|---|---|---|---|
| D542,286 S | 5/2007 | Taniyama et al. |
| D542,524 S | 5/2007 | Richardson et al. |
| D543,541 S | 5/2007 | Chung et al. |
| D544,486 S | 6/2007 | Hussaini et al. |
| 7,230,823 B2 | 6/2007 | Richardson et al. |
| D547,056 S | 7/2007 | Griffin et al. |
| D547,057 S | 7/2007 | Griffin et al. |
| D550,455 S | 9/2007 | Barnhart |
| D551,216 S | 9/2007 | Wei |
| D551,252 S | 9/2007 | Andre et al. |
| 7,266,391 B2 | 9/2007 | Warren |
| D551,856 S | 10/2007 | Ko et al. |
| D553,857 S | 10/2007 | Pendergraph et al. |
| D556,679 S | 12/2007 | Weinstein et al. |
| D556,681 S | 12/2007 | Kim |
| D557,205 S | 12/2007 | Kim |
| D557,264 S | 12/2007 | Richardson et al. |
| D557,494 S | 12/2007 | Mayette et al. |
| D557,897 S | 12/2007 | Richardson et al. |
| 7,312,984 B2 | 12/2007 | Richardson et al. |
| D558,667 S | 1/2008 | Park et al. |
| D558,757 S | 1/2008 | Andre et al. |
| D558,972 S | 1/2008 | Oh |
| D558,973 S | 1/2008 | Hussaini et al. |
| D559,267 S | 1/2008 | Griffin |
| D560,229 S | 1/2008 | Yagi |
| D560,231 S | 1/2008 | Lee |
| D561,092 S | 2/2008 | Kim |
| 7,336,973 B2 | 2/2008 | Goldthwaite et al. |
| D563,093 S | 3/2008 | Nussberger |
| 7,343,184 B2 | 3/2008 | Rostami |
| D565,291 S | 4/2008 | Brandenburg et al. |
| D565,571 S | 4/2008 | Trifilio et al. |
| D568,312 S | 5/2008 | Wang et al. |
| D569,629 S | 5/2008 | Yu et al. |
| D570,772 S | 6/2008 | Mahaffey et al. |
| D572,250 S | 7/2008 | Yang |
| D573,946 S | 7/2008 | Ledbetter et al. |
| 7,397,658 B2 | 7/2008 | Finke-Anlauff et al. |
| 7,400,917 B2 | 7/2008 | Wood et al. |
| D574,326 S | 8/2008 | Lim |
| D574,819 S | 8/2008 | Andre et al. |
| D575,056 S | 8/2008 | Tan |
| D575,729 S | 8/2008 | Nomi et al. |
| 7,428,427 B2 | 9/2008 | Brunstrom et al. |
| D577,904 S | 10/2008 | Sasaki |
| D579,902 S | 11/2008 | Kim et al. |
| D581,151 S | 11/2008 | Aipa |
| D581,155 S | 11/2008 | Richardson et al. |
| D581,421 S | 11/2008 | Richardson et al. |
| D582,149 S | 12/2008 | Tan |
| 7,464,814 B2 | 12/2008 | Carnevali |
| D584,732 S | 1/2009 | Cho et al. |
| D584,738 S | 1/2009 | Kim et al. |
| 7,479,759 B2 | 1/2009 | Vilanov et al. |
| D587,008 S | 2/2009 | Richardson et al. |
| D587,896 S | 3/2009 | Aipa |
| D588,147 S | 3/2009 | Finlayson et al. |
| D589,016 S | 3/2009 | Richardson et al. |
| D589,021 S | 3/2009 | Millora |
| 7,612,997 B1 | 3/2009 | Diebel et al. |
| D589,953 S | 4/2009 | Turner |
| 7,521,935 B2 * | 4/2009 | Uchida ............. G01R 31/3624 |
| | | 324/426 |
| 7,536,099 B2 | 5/2009 | Dalby et al. |
| D593,319 S | 6/2009 | Richardson et al. |
| D593,746 S | 6/2009 | Richardson et al. |
| D593,940 S | 6/2009 | Nomi et al. |
| D594,833 S | 6/2009 | Park |
| D594,849 S | 6/2009 | Ko |
| 7,541,780 B2 * | 6/2009 | Nagasawa ............. H02J 7/0029 |
| | | 320/150 |
| 7,555,325 B2 | 6/2009 | Goros |
| D597,089 S | 7/2009 | Khan et al. |
| 7,562,813 B2 | 7/2009 | Humphrey et al. |
| D597,301 S | 8/2009 | Richardson et al. |
| D598,375 S | 8/2009 | Nomi |
| D598,407 S | 8/2009 | Richardson et al. |
| D598,414 S | 8/2009 | Joung et al. |
| 7,577,462 B2 | 8/2009 | Kumar |
| D600,640 S | 9/2009 | Stein et al. |
| D600,908 S | 9/2009 | Richardson et al. |
| D601,955 S | 10/2009 | Ekmekdje |
| D601,959 S | 10/2009 | Lee |
| D601,960 S | 10/2009 | Dai |
| 7,609,512 B2 | 10/2009 | Richardson et al. |
| D601,583 S | 11/2009 | Andre et al. |
| D603,334 S | 11/2009 | Suzuki |
| D603,602 S | 11/2009 | Richardson et al. |
| D603,603 S | 11/2009 | Laine et al. |
| D605,850 S | 12/2009 | Richardson et al. |
| D606,528 S | 12/2009 | Khan et al. |
| D606,529 S | 12/2009 | Ferrari et al. |
| 7,635,086 B2 | 12/2009 | Spencer, II |
| 7,638,969 B2 | 12/2009 | Woud |
| 7,647,082 B2 | 1/2010 | Holmberg |
| D609,228 S | 2/2010 | Ferrari et al. |
| D609,463 S | 2/2010 | Bullen |
| D610,538 S | 2/2010 | Wu et al. |
| 7,656,120 B2 | 2/2010 | Neu et al. |
| 7,663,878 B2 | 2/2010 | Swan et al. |
| 7,667,433 B1 | 2/2010 | Smith |
| D610,807 S | 3/2010 | Bau |
| D611,042 S | 3/2010 | Ferrari et al. |
| D611,478 S | 3/2010 | Richardson et al. |
| 7,669,829 B2 | 3/2010 | Ogatsu |
| D613,282 S | 4/2010 | Richardson et al. |
| D615,077 S | 5/2010 | Richardson et al. |
| D615,535 S | 5/2010 | Richardson et al. |
| D615,536 S | 5/2010 | Richardson et al. |
| D615,967 S | 5/2010 | Richardson et al. |
| D616,360 S | 5/2010 | Huang |
| D616,361 S | 5/2010 | Huang |
| 7,713,073 B2 | 5/2010 | Lin |
| D617,753 S | 6/2010 | Cheng |
| D617,784 S | 6/2010 | Richardson et al. |
| D617,785 S | 6/2010 | Richardson et al. |
| D617,786 S | 6/2010 | Richardson et al. |
| D617,787 S | 6/2010 | Richardson et al. |
| D618,231 S | 6/2010 | Fahrendorff et al. |
| D618,237 S | 6/2010 | Wang |
| 7,733,637 B1 | 6/2010 | Lam |
| D619,573 S | 7/2010 | Khan et al. |
| D619,574 S | 7/2010 | Richardson et al. |
| D619,991 S | 7/2010 | Huang |
| D620,000 S | 7/2010 | Bau |
| D620,487 S | 7/2010 | Richardson et al. |
| D621,394 S | 8/2010 | Richardson et al. |
| D621,395 S | 8/2010 | Richardson et al. |
| D621,821 S | 8/2010 | Richardson et al. |
| D621,822 S | 8/2010 | Richardson et al. |
| 7,778,023 B1 | 8/2010 | Mohoney |
| 7,778,410 B2 | 8/2010 | Liu et al. |
| 7,782,610 B2 | 8/2010 | Diebel et al. |
| D623,179 S | 9/2010 | Richardson et al. |
| D623,180 S | 9/2010 | Diebel |
| D623,399 S | 9/2010 | McSweyen |
| D623,638 S | 9/2010 | Richardson et al. |
| D623,639 S | 9/2010 | Richardson et al. |
| D623,640 S | 9/2010 | Freeman |
| D624,317 S | 9/2010 | Wenchel et al. |
| D624,533 S | 9/2010 | Richardson et al. |
| D624,747 S | 10/2010 | McSweyen |
| D624,908 S | 10/2010 | Huskinson |
| D624,909 S | 10/2010 | Huskinson |
| D624,910 S | 10/2010 | Richardson et al. |
| D625,303 S | 10/2010 | Kim |
| D626,120 S | 10/2010 | Richardson et al. |
| D626,121 S | 10/2010 | Richardson et al. |
| D626,538 S | 11/2010 | Brown et al. |
| D626,539 S | 11/2010 | Brown et al. |
| D626,540 S | 11/2010 | Brown et al. |
| D626,964 S | 11/2010 | Richardson et al. |
| D628,153 S | 11/2010 | Fujii et al. |

(56) References Cited

U.S. PATENT DOCUMENTS

| | | |
|---|---|---|
| 7,824,211 B1 | 11/2010 | Wu |
| D628,535 S | 12/2010 | Cheng |
| D628,568 S | 12/2010 | Richardson et al. |
| D628,572 S | 12/2010 | Wang |
| D628,994 S | 12/2010 | Griffin, Jr. et al. |
| 7,859,222 B2 | 12/2010 | Woud |
| D631,246 S | 1/2011 | Boettner |
| 7,863,856 B2 | 1/2011 | Sherman et al. |
| 7,863,862 B2 | 1/2011 | Idzik et al. |
| 7,872,448 B2 * | 1/2011 | Taniguchi ............ H01M 4/525 320/131 |
| D631,877 S | 2/2011 | Rak et al. |
| D632,648 S | 2/2011 | Yang |
| D632,683 S | 2/2011 | Richardson et al. |
| D632,684 S | 2/2011 | Richardson et al. |
| D632,685 S | 2/2011 | Richardson et al. |
| D632,686 S | 2/2011 | Magness et al. |
| 7,889,489 B2 | 2/2011 | Richardson et al. |
| 7,889,498 B2 | 2/2011 | Diebel et al. |
| D633,493 S | 3/2011 | Akana et al. |
| D633,908 S | 3/2011 | Akana et al. |
| D634,704 S | 3/2011 | Tieleman et al. |
| D634,741 S | 3/2011 | Richardson et al. |
| 7,899,397 B2 | 3/2011 | Kumar |
| 7,907,394 B2 | 3/2011 | Richardson et al. |
| 7,911,530 B2 | 3/2011 | Sawachi |
| D635,961 S | 4/2011 | Gidden et al. |
| D636,386 S | 4/2011 | Richardson et al. |
| D636,387 S | 4/2011 | Willes et al. |
| D636,392 S | 4/2011 | Akana et al. |
| 7,930,011 B2 | 4/2011 | Shi et al. |
| 7,933,122 B2 | 4/2011 | Richardson et al. |
| D637,588 S | 5/2011 | Richardson et al. |
| D637,589 S | 5/2011 | Willes et al. |
| D637,590 S | 5/2011 | Michie et al. |
| D637,591 S | 5/2011 | Willes et al. |
| D637,592 S | 5/2011 | Magness et al. |
| D637,951 S | 5/2011 | Perez |
| D637,952 S | 5/2011 | Tan |
| D638,005 S | 5/2011 | Richardson et al. |
| D638,411 S | 5/2011 | Willes et al. |
| D638,413 S | 5/2011 | Magness et al. |
| D638,414 S | 5/2011 | Magness et al. |
| D638,828 S | 5/2011 | Melanson et al. |
| D638,829 S | 5/2011 | Melanson et al. |
| D638,830 S | 5/2011 | Magness et al. |
| D639,731 S | 6/2011 | Sun |
| D640,679 S | 6/2011 | Willes et al. |
| D640,680 S | 6/2011 | Magness et al. |
| 7,957,524 B2 | 6/2011 | Chipping |
| D641,013 S | 7/2011 | Richardson et al. |
| D641,014 S | 7/2011 | Smith et al. |
| D641,974 S | 7/2011 | Stampfli |
| D642,169 S | 7/2011 | Andre et al. |
| D642,170 S | 7/2011 | Johnson et al. |
| D642,171 S | 7/2011 | Melanson et al. |
| 7,983,862 B2 * | 7/2011 | Zhang ................ H01M 10/482 702/63 |
| D642,516 S | 8/2011 | Ueda et al. |
| D642,558 S | 8/2011 | Magness |
| D643,029 S | 8/2011 | Feng |
| D643,424 S | 8/2011 | Richardson et al. |
| D643,427 S | 8/2011 | McGoldrick et al. |
| D644,215 S | 8/2011 | Dong |
| D644,216 S | 8/2011 | Richardson et al. |
| D644,219 S | 8/2011 | Sawada |
| 7,988,010 B2 | 8/2011 | Yang et al. |
| 8,004,962 B2 | 8/2011 | Yang et al. |
| D644,635 S | 9/2011 | Richardson et al. |
| D644,639 S | 9/2011 | Weller et al. |
| D645,049 S | 9/2011 | Faranda et al. |
| D645,050 S | 9/2011 | Faranda et al. |
| D647,084 S | 10/2011 | Fathollahi |
| D647,108 S | 10/2011 | Lee |
| 8,028,794 B1 | 10/2011 | Freeman |
| 8,046,039 B2 | 10/2011 | Lee et al. |
| D647,908 S | 11/2011 | Chen et al. |
| D648,270 S | 11/2011 | Jiang |
| D648,714 S | 11/2011 | Jones, III et al. |
| D648,715 S | 11/2011 | Jones, III et al. |
| D648,716 S | 11/2011 | Jones, III et al. |
| D648,717 S | 11/2011 | Fahrendorff et al. |
| D649,143 S | 11/2011 | Jones, III et al. |
| D649,539 S | 11/2011 | Hong |
| 8,063,606 B2 * | 11/2011 | Veselic ................ H02J 7/045 320/119 |
| D649,932 S | 12/2011 | Symons |
| D650,810 S | 12/2011 | Lemelman et al. |
| 8,084,987 B2 * | 12/2011 | Hurtz ................ G06F 1/3203 320/103 |
| D652,379 S | 1/2012 | Vandiver |
| D652,827 S | 1/2012 | Fahrendorff et al. |
| D652,828 S | 1/2012 | Fahrendorff et al. |
| D653,202 S | 1/2012 | Hasbrook et al. |
| D653,207 S | 1/2012 | Vandiver |
| D653,659 S | 2/2012 | Fahrendorff et al. |
| D654,069 S | 2/2012 | Kwon |
| D654,483 S | 2/2012 | Richardson et al. |
| D654,852 S | 2/2012 | Hansen |
| D654,854 S | 2/2012 | Inskeep |
| D654,931 S | 2/2012 | Lemelman et al. |
| D655,281 S | 3/2012 | Turocy |
| D655,699 S | 3/2012 | Bau |
| D656,096 S | 3/2012 | Sasada et al. |
| D656,495 S | 3/2012 | Andre et al. |
| D658,165 S | 4/2012 | Freeman |
| 8,150,485 B2 | 4/2012 | Lee |
| D658,643 S | 5/2012 | Fahrendorff et al. |
| D659,094 S | 5/2012 | Brand et al. |
| 8,167,127 B2 | 5/2012 | Martin et al. |
| 8,168,319 B2 | 5/2012 | Spare et al. |
| D661,249 S | 6/2012 | Smith et al. |
| D662,050 S | 6/2012 | Tien |
| D662,904 S | 7/2012 | Wu et al. |
| D662,923 S | 7/2012 | Piedra et al. |
| D662,924 S | 7/2012 | Melanson et al. |
| D663,263 S | 7/2012 | Gupta et al. |
| D663,319 S | 7/2012 | Chen et al. |
| D663,684 S | 7/2012 | Yang |
| D663,685 S | 7/2012 | Yang |
| D663,724 S | 7/2012 | Lee |
| D664,091 S | 7/2012 | Pliner et al. |
| D664,501 S | 7/2012 | Inskeep |
| D664,502 S | 7/2012 | Inskeep |
| 8,224,408 B2 | 7/2012 | Tomasini et al. |
| D665,386 S | 8/2012 | Fathollahi |
| D665,732 S | 8/2012 | Saito et al. |
| D665,735 S | 8/2012 | Kang et al. |
| D666,144 S | 8/2012 | Brand et al. |
| 8,245,842 B2 | 8/2012 | Bau |
| 8,247,102 B2 | 8/2012 | Hua |
| 8,255,176 B2 * | 8/2012 | Plestid ............ G01R 31/3679 320/128 |
| D667,783 S | 9/2012 | Zhang et al. |
| D667,788 S | 9/2012 | Mai |
| D670,281 S | 11/2012 | Corpuz et al. |
| D670,689 S | 11/2012 | Wang |
| D671,096 S | 11/2012 | Song et al. |
| D671,105 S | 11/2012 | Rothbaum et al. |
| D671,106 S | 11/2012 | Rothbaum et al. |
| D671,493 S | 11/2012 | Hasbrook et al. |
| 8,321,619 B2 * | 11/2012 | Kular ................ G11C 5/141 710/305 |
| D671,937 S | 12/2012 | Akana et al. |
| D672,309 S | 12/2012 | Tien |
| D672,343 S | 12/2012 | Akana et al. |
| 8,328,008 B2 | 12/2012 | Diebel et al. |
| 8,339,775 B2 | 12/2012 | Degner et al. |
| D674,394 S | 1/2013 | Kajimoto |
| D674,748 S | 1/2013 | Ferber et al. |
| D675,156 S | 1/2013 | Vandiver et al. |
| 8,342,325 B2 | 1/2013 | Rayner |
| 8,355,515 B2 | 1/2013 | Mao et al. |
| D675,603 S | 2/2013 | Melanson et al. |

(56) References Cited

U.S. PATENT DOCUMENTS

| | | |
|---|---|---|
| D676,032 S | 2/2013 | Stump et al. |
| D676,380 S | 2/2013 | Sun |
| D676,432 S | 2/2013 | Hasbrook et al. |
| 8,367,235 B2 * | 2/2013 | Huang ............... H01M 2/1022 361/679.56 |
| 8,380,264 B2 | 2/2013 | Hung et al. |
| D677,223 S | 3/2013 | Cho |
| D677,249 S | 3/2013 | Li et al. |
| D677,251 S | 3/2013 | Melanson et al. |
| D677,657 S | 3/2013 | Akana et al. |
| D678,187 S | 3/2013 | Huang |
| D678,869 S | 3/2013 | Diebel |
| 8,390,255 B1 | 3/2013 | Fathollahi |
| 8,393,466 B2 | 3/2013 | Rayner |
| D679,271 S | 4/2013 | Liu |
| D679,684 S | 4/2013 | Baker et al. |
| D679,699 S | 4/2013 | Piedra et al. |
| D680,063 S | 4/2013 | Sasada |
| D681,020 S | 4/2013 | Magness et al. |
| D682,196 S | 5/2013 | Leung |
| D682,197 S | 5/2013 | Leung |
| D682,202 S | 5/2013 | Weaver, Jr. et al. |
| D682,777 S | 5/2013 | Gupta et al. |
| D682,781 S | 5/2013 | Wakafuji et al. |
| D682,815 S | 5/2013 | Chang |
| D683,310 S | 5/2013 | McSweyn |
| D683,338 S | 5/2013 | Wilson et al. |
| 8,439,191 B1 | 5/2013 | Lu |
| 8,452,242 B2 | 5/2013 | Spencer, II |
| D684,554 S | 6/2013 | Park |
| D684,571 S | 6/2013 | Akana et al. |
| 8,457,701 B2 | 6/2013 | Diebel |
| D685,356 S | 7/2013 | Diebel |
| D685,732 S | 7/2013 | Miller et al. |
| D686,150 S | 7/2013 | Lee et al. |
| D686,152 S | 7/2013 | Lee et al. |
| D686,153 S | 7/2013 | Qu |
| D686,586 S | 7/2013 | Cho |
| D686,606 S | 7/2013 | Hong |
| 8,483,758 B2 | 7/2013 | Huang |
| D687,426 S | 8/2013 | Requa |
| D688,233 S | 8/2013 | Dong |
| D688,660 S | 8/2013 | Akana et al. |
| 8,499,933 B2 | 8/2013 | Ziemba |
| 8,505,718 B2 | 8/2013 | Griffin, Jr. et al. |
| 8,509,864 B1 | 8/2013 | Diebel |
| 8,509,865 B1 | 8/2013 | LaColla et al. |
| D689,847 S | 9/2013 | To |
| 8,531,833 B2 | 9/2013 | Diebel et al. |
| 8,541,985 B1 | 9/2013 | Wong |
| D690,693 S | 10/2013 | Akana et al. |
| D691,990 S | 10/2013 | Rayner |
| D692,379 S | 10/2013 | Bae et al. |
| 8,547,061 B1 | 10/2013 | Wong |
| 8,560,014 B1 | 10/2013 | Hu et al. |
| D692,825 S | 11/2013 | Izen et al. |
| D693,297 S | 11/2013 | Inskeep |
| D693,798 S | 11/2013 | Chuang et al. |
| D693,801 S | 11/2013 | Rayner |
| 8,579,172 B2 | 11/2013 | Monaco et al. |
| 8,583,955 B2 * | 11/2013 | Lu ...................... H04L 12/2807 713/300 |
| D694,703 S | 12/2013 | Faro |
| D695,214 S | 12/2013 | Roberts et al. |
| D696,234 S | 12/2013 | Wright |
| D697,502 S | 1/2014 | Chu et al. |
| D697,504 S | 1/2014 | Yang |
| D697,865 S | 1/2014 | Saito et al. |
| D698,774 S | 2/2014 | Wardy |
| D699,177 S | 2/2014 | Higashi |
| D703,652 S | 4/2014 | Melanson et al. |
| 8,687,359 B2 | 4/2014 | Theobald et al. |
| D704,135 S | 5/2014 | Stewart et al. |
| D704,182 S | 5/2014 | Smith |
| D704,688 S | 5/2014 | Reivo et al. |
| D705,768 S | 5/2014 | Melanson et al. |
| D706,253 S | 6/2014 | Simmer |
| D706,255 S | 6/2014 | Akana et al. |
| D706,256 S | 6/2014 | Ward et al. |
| D706,272 S | 6/2014 | Poon |
| D709,058 S | 7/2014 | Hemesath et al. |
| D709,439 S | 7/2014 | Ferber et al. |
| D709,485 S | 7/2014 | Bishop |
| 8,788,852 B2 * | 7/2014 | Chun ..................... G06F 1/266 320/126 |
| D710,344 S | 8/2014 | Smith et al. |
| D710,347 S | 8/2014 | Esses |
| D710,795 S | 8/2014 | Gupta et al. |
| D710,839 S | 8/2014 | Chang |
| D711,312 S | 8/2014 | Tien |
| D711,362 S | 8/2014 | Poon |
| D711,863 S | 8/2014 | Wen |
| D714,215 S | 9/2014 | To |
| D714,274 S | 9/2014 | Jung |
| D714,278 S | 9/2014 | Case et al. |
| 8,837,156 B2 | 9/2014 | Sun et al. |
| 8,841,798 B2 * | 9/2014 | Tuukkanen ............... H02J 7/02 307/65 |
| D716,784 S | 11/2014 | Wen |
| D716,785 S | 11/2014 | White |
| D717,781 S | 11/2014 | Kim |
| D718,230 S | 11/2014 | To et al. |
| D718,289 S | 11/2014 | Brand |
| D718,291 S | 11/2014 | Hong |
| D718,293 S | 11/2014 | Namminga et al. |
| D718,754 S | 12/2014 | To et al. |
| D718,755 S | 12/2014 | To et al. |
| D719,947 S | 12/2014 | Kobayashi |
| 8,917,506 B2 | 12/2014 | Diebel et al. |
| D720,687 S | 1/2015 | Hasbrook |
| D720,738 S | 1/2015 | Rodriguez et al. |
| D720,740 S | 1/2015 | Wicks et al. |
| D721,328 S | 1/2015 | Freeman et al. |
| D721,356 S | 1/2015 | Hasbrook et al. |
| D721,646 S | 1/2015 | Kim |
| D721,685 S | 1/2015 | Hasbrook et al. |
| D721,687 S | 1/2015 | To et al. |
| 8,933,659 B2 * | 1/2015 | Sakai ................. H01M 10/465 320/101 |
| D722,312 S | 2/2015 | Tages et al. |
| D723,018 S | 2/2015 | White |
| 8,954,117 B2 | 2/2015 | Huang |
| 8,955,678 B2 | 2/2015 | Murphy et al. |
| D723,530 S | 3/2015 | Namminga et al. |
| D724,065 S | 3/2015 | Fathollahi |
| D724,574 S | 3/2015 | Williams |
| D725,091 S | 3/2015 | Wen |
| 8,971,039 B2 | 3/2015 | Huang et al. |
| D727,883 S | 4/2015 | Brand et al. |
| D728,467 S | 5/2015 | Hasbrook |
| D728,468 S | 5/2015 | Ferber et al. |
| D729,729 S | 5/2015 | Rabalais et al. |
| 9,026,187 B2 | 5/2015 | Huang |
| D732,012 S | 6/2015 | Tsai et al. |
| D733,043 S | 6/2015 | Hasbrook et al. |
| 9,073,437 B2 * | 7/2015 | Matsumoto ........... B60L 3/0046 |
| 9,077,013 B2 | 7/2015 | Huang et al. |
| 9,088,028 B2 | 7/2015 | Huang et al. |
| 9,088,029 B2 | 7/2015 | Huang et al. |
| D738,301 S | 9/2015 | Symons |
| D738,365 S | 9/2015 | Melanson et al. |
| D739,394 S | 9/2015 | Rayner et al. |
| 9,123,935 B2 | 9/2015 | Huang |
| 9,142,985 B2 * | 9/2015 | Arai ..................... H02J 7/0031 |
| D740,223 S | 10/2015 | Yoneta |
| D740,797 S | 10/2015 | Daniel |
| D741,844 S | 10/2015 | Rayner et al. |
| 9,153,985 B1 | 10/2015 | Gjøvik et al. |
| 9,172,070 B2 | 10/2015 | Huang et al. |
| D744,472 S | 12/2015 | Lerenthal |
| D744,989 S | 12/2015 | Lee |
| D744,993 S | 12/2015 | Diebel |
| D744,995 S | 12/2015 | Lerenthal |
| D746,273 S | 12/2015 | Herbst |

(56) References Cited

U.S. PATENT DOCUMENTS

| | | |
|---|---|---|
| D746,275 S | 12/2015 | Mohammad |
| D746,801 S | 1/2016 | Pan |
| D748,612 S | 2/2016 | Chan et al. |
| D749,557 S | 2/2016 | Feng |
| D751,058 S | 3/2016 | Cocchia et al. |
| D751,059 S | 3/2016 | Cocchia et al. |
| D751,542 S | 3/2016 | Daniel |
| 9,276,421 B2 * | 3/2016 | Weissinger, Jr. ..... H02J 7/0026 |
| 9,313,305 B1 | 4/2016 | Diebel |
| 9,319,501 B2 | 4/2016 | Huang |
| D756,910 S | 5/2016 | Gupta et al. |
| 9,356,267 B1 | 5/2016 | To et al. |
| D759,641 S | 6/2016 | Lai et al. |
| 9,402,452 B2 | 8/2016 | Diebel et al. |
| 9,406,913 B2 | 8/2016 | Huang et al. |
| D765,628 S | 9/2016 | Watt et al. |
| D765,636 S | 9/2016 | Kanazawa |
| D768,612 S | 10/2016 | Wright et al. |
| 9,477,288 B2 * | 10/2016 | Yang ........................ G06F 1/266 |
| D772,855 S | 11/2016 | Ju |
| 9,576,178 B2 | 2/2017 | Pope et al. |
| 9,583,792 B2 * | 2/2017 | Bulur ................ H01M 10/4207 |
| D781,839 S | 3/2017 | Kim et al. |
| 9,751,423 B2 * | 9/2017 | Niioka .................. B60L 3/0046 |
| 9,793,750 B2 | 10/2017 | Miller et al. |
| 2001/0054148 A1 | 12/2001 | Hoornaert et al. |
| 2002/0065054 A1 | 5/2002 | Humphreys et al. |
| 2002/0111189 A1 | 8/2002 | Chou |
| 2002/0147035 A1 | 10/2002 | Su |
| 2002/0193136 A1 | 12/2002 | Halkosaari et al. |
| 2002/0197965 A1 | 12/2002 | Peng |
| 2003/0000984 A1 | 1/2003 | Vick, III |
| 2003/0096642 A1 | 5/2003 | Bessa et al. |
| 2003/0151890 A1 | 8/2003 | Huang et al. |
| 2003/0217210 A1 | 11/2003 | Carau, Sr. |
| 2003/0218445 A1 | 11/2003 | Behar |
| 2003/0228866 A1 | 12/2003 | Pezeshki |
| 2004/0096054 A1 | 5/2004 | Nuovo |
| 2004/0097256 A1 | 5/2004 | Kujawski |
| 2004/0104268 A1 | 6/2004 | Bailey |
| 2004/0247113 A1 | 12/2004 | Akatsu |
| 2004/0268005 A1 | 12/2004 | Dickie |
| 2005/0049016 A1 | 3/2005 | Cho et al. |
| 2005/0088141 A1 | 4/2005 | Lee et al. |
| 2005/0090301 A1 | 4/2005 | Lange et al. |
| 2005/0093510 A1 | 5/2005 | Seil et al. |
| 2005/0116684 A1 | 6/2005 | Kim |
| 2005/0130721 A1 | 6/2005 | Gartrell |
| 2005/0228281 A1 * | 10/2005 | Nefos ...................... A61B 8/08 600/446 |
| 2005/0231159 A1 | 10/2005 | Jones et al. |
| 2005/0247787 A1 | 11/2005 | Von Mueller et al. |
| 2005/0248312 A1 | 11/2005 | Cao et al. |
| 2005/0286212 A1 | 12/2005 | Brignone et al. |
| 2006/0003709 A1 | 1/2006 | Wood |
| 2006/0010588 A1 | 1/2006 | Schuster et al. |
| 2006/0052064 A1 | 3/2006 | Goradesky |
| 2006/0058073 A1 | 3/2006 | Kim |
| 2006/0063569 A1 | 3/2006 | Jacobs et al. |
| 2006/0099999 A1 | 5/2006 | Park |
| 2006/0105722 A1 | 5/2006 | Kumar |
| 2006/0105824 A1 | 5/2006 | Kim et al. |
| 2006/0125445 A1 | 6/2006 | Cao et al. |
| 2006/0140461 A1 | 6/2006 | Kim |
| 2006/0197674 A1 | 9/2006 | Nakajima |
| 2006/0205447 A1 | 9/2006 | Park et al. |
| 2006/0208694 A1 * | 9/2006 | Fee ........................ H02J 7/0008 320/110 |
| 2006/0255493 A1 | 11/2006 | Fouladpour |
| 2007/0004450 A1 | 1/2007 | Parikh |
| 2007/0019804 A1 | 1/2007 | Kramer |
| 2007/0030711 A1 | 2/2007 | Liu |
| 2007/0093140 A1 | 4/2007 | Begic et al. |
| 2007/0123316 A1 | 5/2007 | Little |
| 2007/0142097 A1 | 6/2007 | Hamasaki et al. |
| 2007/0152633 A1 | 7/2007 | Lee |
| 2007/0161404 A1 | 7/2007 | Yasujima et al. |
| 2007/0167190 A1 | 7/2007 | Mossavi et al. |
| 2007/0187563 A1 | 8/2007 | Ogatsu |
| 2007/0223182 A1 | 9/2007 | Swan et al. |
| 2007/0225031 A1 | 9/2007 | Bodkin et al. |
| 2007/0236180 A1 | 10/2007 | Rodgers |
| 2007/0261978 A1 | 11/2007 | Sanderson |
| 2007/0263366 A1 | 11/2007 | Wu et al. |
| 2007/0264535 A1 | 11/2007 | Lee et al. |
| 2007/0297149 A1 | 12/2007 | Richardson et al. |
| 2008/0007214 A1 | 1/2008 | Cheng |
| 2008/0015717 A1 | 1/2008 | Griffin et al. |
| 2008/0026794 A1 | 1/2008 | Warren |
| 2008/0026803 A1 | 1/2008 | Demuynck |
| 2008/0032758 A1 | 2/2008 | Rostami |
| 2008/0053770 A1 | 3/2008 | Tynyk |
| 2008/0058010 A1 | 3/2008 | Lee |
| 2008/0096620 A1 | 4/2008 | Lee et al. |
| 2008/0108395 A1 | 5/2008 | Lee et al. |
| 2008/0119244 A1 | 5/2008 | Malhotra |
| 2008/0123287 A1 | 5/2008 | Rossell et al. |
| 2008/0132289 A1 | 6/2008 | Wood et al. |
| 2008/0139258 A1 | 6/2008 | Park et al. |
| 2008/0150367 A1 | 6/2008 | Oh et al. |
| 2008/0164790 A1 | 7/2008 | Tsang et al. |
| 2008/0238356 A1 | 10/2008 | Batson et al. |
| 2009/0009945 A1 | 1/2009 | Johnson et al. |
| 2009/0017883 A1 | 1/2009 | Lin |
| 2009/0051319 A1 | 2/2009 | Fang et al. |
| 2009/0069050 A1 | 3/2009 | Jain et al. |
| 2009/0073650 A1 | 3/2009 | Huang et al. |
| 2009/0096417 A1 | 4/2009 | Idzik et al. |
| 2009/0108800 A1 | 4/2009 | Woud |
| 2009/0111543 A1 | 4/2009 | Tai et al. |
| 2009/0114556 A1 | 5/2009 | Tai et al. |
| 2009/0117955 A1 | 5/2009 | Lo |
| 2009/0128092 A1 | 5/2009 | Woud |
| 2009/0143104 A1 | 6/2009 | Loh et al. |
| 2009/0144456 A1 | 6/2009 | Gelf et al. |
| 2009/0146898 A1 | 6/2009 | Akiho et al. |
| 2009/0152089 A1 | 6/2009 | Hanes |
| 2009/0160399 A1 | 6/2009 | Woud |
| 2009/0160400 A1 | 6/2009 | Woud |
| 2009/0181729 A1 | 7/2009 | Griffin, Jr. et al. |
| 2009/0186264 A1 | 7/2009 | Huang |
| 2009/0205983 A1 | 8/2009 | Estlander |
| 2009/0246621 A1 | 10/2009 | Miebori |
| 2009/0247244 A1 | 10/2009 | Mittleman et al. |
| 2009/0284216 A1 | 11/2009 | Bessa et al. |
| 2009/0301289 A1 | 12/2009 | Gynes |
| 2009/0312058 A9 | 12/2009 | Wood et al. |
| 2009/0314400 A1 | 12/2009 | Liu |
| 2009/0325657 A1 | 12/2009 | Ramsdell et al. |
| 2010/0001684 A1 | 1/2010 | Eastlack |
| 2010/0005225 A1 | 1/2010 | Honda et al. |
| 2010/0013431 A1 | 1/2010 | Liu |
| 2010/0022277 A1 | 1/2010 | An et al. |
| 2010/0026589 A1 | 2/2010 | Dou et al. |
| 2010/0048267 A1 | 2/2010 | Lin |
| 2010/0056054 A1 | 3/2010 | Yamato et al. |
| 2010/0064883 A1 | 3/2010 | Gynes |
| 2010/0066311 A1 | 3/2010 | Bao et al. |
| 2010/0078343 A1 | 4/2010 | Hoellwarth et al. |
| 2010/0088439 A1 | 4/2010 | Ang et al. |
| 2010/0093412 A1 | 4/2010 | Serra et al. |
| 2010/0096284 A1 | 4/2010 | Bau |
| 2010/0113106 A1 | 5/2010 | Supran |
| 2010/0117597 A1 | 5/2010 | Wang |
| 2010/0121588 A1 * | 5/2010 | Elder .................... H01M 10/48 702/63 |
| 2010/0132724 A1 | 6/2010 | Seidel et al. |
| 2010/0154062 A1 | 6/2010 | Baram et al. |
| 2010/0190046 A1 | 7/2010 | Chen et al. |
| 2010/0195279 A1 | 8/2010 | Michael |
| 2010/0200456 A1 | 8/2010 | Parkinson |
| 2010/0203931 A1 | 8/2010 | Hynecek et al. |
| 2010/0224519 A1 | 9/2010 | Kao |
| 2010/0243516 A1 | 9/2010 | Martin et al. |

(56) References Cited

U.S. PATENT DOCUMENTS

| | | |
|---|---|---|
| 2010/0302716 A1 | 12/2010 | Gandhi |
| 2010/0315041 A1 | 12/2010 | Tan |
| 2010/0328203 A1 | 12/2010 | Hsu |
| 2011/0021255 A1 | 1/2011 | Kim et al. |
| 2011/0034221 A1 | 2/2011 | Hung et al. |
| 2011/0049005 A1 | 3/2011 | Wilson et al. |
| 2011/0050164 A1 | 3/2011 | Partovi et al. |
| 2011/0055447 A1 | 3/2011 | Costa |
| 2011/0084081 A1 | 4/2011 | Chung et al. |
| 2011/0090626 A1 | 4/2011 | Hoellwarth et al. |
| 2011/0117974 A1 | 5/2011 | Spitalnik et al. |
| 2011/0136555 A1 | 6/2011 | Ramies et al. |
| 2011/0175569 A1 | 7/2011 | Austin |
| 2011/0199041 A1 | 8/2011 | Yang |
| 2011/0215767 A1 | 9/2011 | Johnson et al. |
| 2011/0244930 A1 | 10/2011 | Kong et al. |
| 2011/0253569 A1 | 10/2011 | Lord |
| 2011/0259664 A1 | 10/2011 | Freeman |
| 2011/0261511 A1 | 10/2011 | Alderson et al. |
| 2011/0297578 A1 | 12/2011 | Stiehl et al. |
| 2011/0309728 A1 | 12/2011 | Diebel |
| 2012/0013295 A1 | 1/2012 | Yeh |
| 2012/0032830 A1 | 2/2012 | Yamamoto |
| 2012/0071214 A1 | 3/2012 | Ash, Jr. et al. |
| 2012/0088555 A1 | 4/2012 | Hu |
| 2012/0088558 A1 | 4/2012 | Song |
| 2012/0106037 A1* | 5/2012 | Diebel .................. G06F 1/1628 361/679.01 |
| 2012/0115551 A1 | 5/2012 | Cho et al. |
| 2012/0119695 A1 | 5/2012 | Pin |
| 2012/0122520 A1 | 5/2012 | Phillips |
| 2012/0161696 A1 | 6/2012 | Cook et al. |
| 2012/0177967 A1 | 7/2012 | Wang |
| 2012/0209745 A1 | 8/2012 | Spencer, II |
| 2012/0258629 A1 | 10/2012 | Kemp |
| 2012/0282977 A1 | 11/2012 | Haleluk |
| 2012/0286741 A1 | 11/2012 | Seethaler et al. |
| 2012/0302294 A1 | 11/2012 | Hammond et al. |
| 2012/0305422 A1 | 12/2012 | Vandiver |
| 2012/0320501 A1 | 12/2012 | Ackloo |
| 2012/0325637 A1 | 12/2012 | Kikuchi |
| 2013/0007336 A1* | 1/2013 | Chun .................. G06F 1/266 710/316 |
| 2013/0020998 A1* | 1/2013 | Howard .................. H02J 1/00 320/117 |
| 2013/0023313 A1 | 1/2013 | Kim |
| 2013/0045775 A1 | 2/2013 | Heywood |
| 2013/0052871 A1 | 2/2013 | Eklind |
| 2013/0082662 A1 | 4/2013 | Carre et al. |
| 2013/0084799 A1 | 4/2013 | Marholev et al. |
| 2013/0088815 A1 | 4/2013 | Hu et al. |
| 2013/0098790 A1 | 4/2013 | Hong |
| 2013/0125251 A1 | 5/2013 | Johnson |
| 2013/0146491 A1 | 6/2013 | Ghali et al. |
| 2013/0166928 A1* | 6/2013 | Yang .................. G06F 1/266 713/300 |
| 2013/0189923 A1 | 7/2013 | Lewin |
| 2013/0193911 A1 | 8/2013 | Miller et al. |
| 2013/0210475 A1 | 8/2013 | Nylund |
| 2013/0248339 A1 | 9/2013 | Koepsell |
| 2013/0273983 A1 | 10/2013 | Hsu |
| 2013/0305528 A1 | 11/2013 | Anderson |
| 2013/0307818 A1 | 11/2013 | Pope et al. |
| 2013/0314030 A1 | 11/2013 | Fathollahi |
| 2013/0318282 A1 | 11/2013 | Wakutsu et al. |
| 2014/0035511 A1 | 2/2014 | Ferber et al. |
| 2014/0042969 A1 | 2/2014 | Miller et al. |
| 2014/0051292 A1 | 2/2014 | Weaver et al. |
| 2014/0065948 A1 | 3/2014 | Huang |
| 2014/0069825 A1 | 3/2014 | Macrina et al. |
| 2014/0268518 A1 | 3/2014 | Huang et al. |
| 2014/0091765 A1 | 4/2014 | Law |
| 2014/0132205 A1 | 5/2014 | Paczkowski et al. |
| 2014/0141838 A1* | 5/2014 | Cai .................. H04M 1/72575 455/557 |
| 2014/0147704 A1 | 5/2014 | Roh |
| 2014/0152257 A1 | 6/2014 | Miller et al. |
| 2014/0165379 A1 | 6/2014 | Diebel et al. |
| 2014/0191033 A1 | 7/2014 | Wojcik et al. |
| 2014/0199570 A1 | 7/2014 | Cho |
| 2014/0239276 A1 | 8/2014 | Lin et al. |
| 2014/0239916 A1 | 8/2014 | To et al. |
| 2014/0268519 A1 | 9/2014 | Huang et al. |
| 2014/0329116 A1 | 11/2014 | Byun |
| 2014/0375182 A1 | 12/2014 | Li et al. |
| 2014/0375186 A1 | 12/2014 | Tarnow et al. |
| 2015/0028797 A1 | 1/2015 | Miller et al. |
| 2015/0140386 A1 | 5/2015 | Huang et al. |
| 2015/0141090 A1 | 5/2015 | Hwan et al. |
| 2015/0148093 A1 | 5/2015 | Huang et al. |
| 2015/0151402 A1 | 6/2015 | Cazzoli et al. |
| 2015/0189053 A1 | 7/2015 | LaHam |
| 2015/0194648 A1 | 7/2015 | Fathollahi et al. |
| 2015/0194833 A1 | 7/2015 | Fathollahi et al. |
| 2015/0214993 A1 | 7/2015 | Huang |
| 2015/0215439 A1 | 7/2015 | Stanimirovic et al. |
| 2015/0256008 A1 | 9/2015 | Miller et al. |
| 2015/0281410 A1 | 10/2015 | Takahashi |
| 2015/0289615 A1 | 10/2015 | Welsch |
| 2015/0303722 A1 | 10/2015 | Li |
| 2015/0364875 A1 | 12/2015 | Ginsberg |
| 2015/0381226 A1 | 12/2015 | Mogol |
| 2016/0004896 A1 | 1/2016 | Pope et al. |
| 2016/0043764 A1 | 2/2016 | Huang |
| 2016/0064962 A1 | 3/2016 | Huang et al. |
| 2016/0064963 A1 | 3/2016 | Huang et al. |
| 2016/0093122 A1* | 3/2016 | Chen .................. G07C 5/0808 701/29.6 |
| 2016/0112085 A1 | 4/2016 | Johnson |
| 2016/0181580 A1 | 6/2016 | To et al. |
| 2016/0254698 A1* | 9/2016 | Anderson .................. H01M 10/465 320/101 |
| 2016/0267313 A1 | 9/2016 | Pope et al. |
| 2016/0329607 A1* | 11/2016 | Miyao .................. H01M 2/1055 |
| 2018/0019613 A1 | 1/2018 | Miller et al. |

FOREIGN PATENT DOCUMENTS

| | | |
|---|---|---|
| CN | 202364273 U | 8/2012 |
| CN | 202424278 U | 9/2012 |
| CN | 302063473 S | 9/2012 |
| CN | 302063476 S | 9/2012 |
| CN | 202535667 U | 11/2012 |
| CN | 302510329 S | 7/2013 |
| CN | 302535056 S | 8/2013 |
| CN | 302573150 S | 9/2013 |
| DE | 10 2007 021 988 | 11/2008 |
| EP | 1732291 A1 | 12/2006 |
| JP | 62-014133 | 1/1987 |
| JP | 8-18637 | 1/1996 |
| JP | 2000-175720 | 6/2000 |
| JP | D1459213 | 1/2013 |
| JP | D1474456 | 7/2013 |
| JP | D1474533 | 7/2013 |
| JP | D1474534 | 7/2013 |
| KR | 10-2005-0027961 | 3/2005 |
| KR | 10-2008-0017688 | 2/2008 |
| KR | 20-2010-0005030 | 5/2010 |
| KR | 10-2010-0132724 | 12/2010 |
| KR | 10-2011-0005507 | 1/2011 |
| KR | 10-2011-0062089 | 6/2011 |
| KR | 30-0650361 | 7/2012 |
| TW | D150044 | 11/2012 |
| TW | D156538 | 10/2013 |
| TW | D156836 | 11/2013 |
| WO | WO 95/15619 | 6/1995 |

(56) References Cited

FOREIGN PATENT DOCUMENTS

| WO | WO 97/33497 | 9/1997 |
|---|---|---|
| WO | WO 03/065227 A1 | 8/2003 |
| WO | WO 08/151362 A2 | 12/2008 |

OTHER PUBLICATIONS

U.S. Appl. No. 29/464,271 including its prosecution history, filed Aug. 14, 2013, To.
U.S. Appl. No. 29/478,253 including its prosecution history, filed Jun. 30, 2015, Namminga.
U.S. Appl. No. 29/501,885 including its prosecution history, filed Sep. 9, 2014, mophie, Inc.
"MBP52L Battery Pack w. Lightning/Micro USB cable for iPad/tablet, iPhone/smartphone, and iPod/MP3 player." Retrieved Oct. 14, 2015. Macally Europe. http://macally-europe.com/mbp521.
"Mophie Powerstation Plus." Posted: Nov. 24, 2014. Marcus Troy. http://marcustroy.com/mophie-powerstation-plus-mophie/.
"On the Go Charger." Posted: Oct. 2012. Rayovac. http://www.rayovac.com/Portable-Power/On-The-Go-Keychain-Chargers/PS78-Phone-Boost-800-Apple-Lightning-Pin-Charger.aspx.
Cheng, Jacqui. "Mophie JuicePack Powerstation: fast, high-volume charging for iDevices." Posted: Jul. 8, 2012. arstechnica. http://arstechnica.com/apple/2012/07/mophie-juicepack-powerstation-fast-high-capacity-charging-for-your -idevices/.
Choy, Ken. "Hyperjuice Pico." Retrieved Oct. 14, 2015. Gizmo Porn. http://www.gizmoporn.com/2013/01 lhyperjuice-pico.html.
Guy, Nick. "Mophie Juice Pack Powerstation Duo" Posted: Apr. 24, 2013. iLounge. http://www.ilounge.com/index.php/reviews/entry/mophie-juice-pack-powerstation-duo/.
Jeremy Horwitz, "Kensington Mini Battery Pack and Charger for iPhone and iPod," dated May 16, 2008, http://www.ilounge.com/index.php/reviews/entry/kensington-mini-battery-pack-and-charger-for-iphone-and-ipod/.
Kensington Mini Battery Pack and Charger for iPhone and iPod, dated Sep. 30, 2008, 1 Page.
Sven Rafferty, "Mybat External Battery for iPhone and iPod," dated May 18, 2008, http://svenontech.com/reviews/?p=74.
Dave Rees, "Richard Solo Backup Battery for iPhone / iPod Review," dated Jun. 16, 2008, http://the-gadgeteer.com/2008/06/16/richard_solo_backup_battery_for_iphone_ipod/.
"Cheap DIY iPhone External Battery," dated Jul. 22, 2008, http://fastdad.wordpress.com/2008/07/22/cheap-diy-iphone-external-battery/.
Jeremy Horwitz, "iLuv i603 / i604 Rechargeable Lithium Polymer Batteries with Silicone Skin," dated Jun. 27, 2006, http://www.ilounge.com/index.php/reviews/entry/iluv-i603-rechargeable-lithium-polymer-battery-with-silicone-skin/.
Devin Coldewey, "Combination iPhone battery pack and flash from FastMac," dated Nov. 4, 2008, http://crunchgear.com/2008/11/04/combination-iphone-battery-pack-and-flash-from-fastmac/.
Tennant, Roger. "igadgetgeek's 2012 Holiday Gift Guide." Posted: Dec. 20, 2012. igadgetgeek.com. http://www.igadgetgeek.com/home/holiday-gift-guide.
Reexamination Control No. 90/013,319 including its prosecution history, Sep. 18, 2014 Filing Date, Huang et al.
U.S. Appl. No. 15/130,196 including its prosecution history, filed Apr. 15, 2016, Huang.
U.S. Appl. No. 14/187,046 Including its prosecution history, filed Feb. 21, 2014, To et al.
U.S. Appl. No. 14/205,167 Including its prosecution history, filed Mar. 11, 2014, Huang et al.
U.S. Appl. No. 29/382,515 Including its prosecution history, filed Jan. 4, 2011, Gallouzi et al.
U.S. Appl. No. 29/464,620 Including its prosecution history, filed Aug. 19, 2013, Tsai.
U.S. Appl. No. 29/478,391 Including its prosecution history, filed Jan. 3, 2014, Namminga et al.
U.S. Appl. No. 29/478,390 Including its prosecution history, filed Jan. 3, 2014, Dang et al.
U.S. Appl. No. 29/478,383 Including its prosecution history, filed Jan. 3, 2014, Dang et al.
U.S. Appl. No. 29/478,388 Including its prosecution history, filed Jan. 3, 2014, Kim et al.
U.S. Appl. No. 29/499,868 Including its prosecution history, filed Aug. 19, 2014, Mophie, Inc.
U.S. Appl. No. 29/539,419 Including its prosecution history, filed Sep. 14, 2015, Dang et al.
U.S. Appl. No. 29/510,154 Including its prosecution history, filed Nov. 25, 2014, Mophie, Inc.
U.S. Appl. No. 29/510,153 Including its prosecution history, filed Nov. 25, 2014, Mophie, Inc.
U.S. Appl. No. 29/522,987 Including its prosecution history, filed Apr. 6, 2015, Gjøvik et al.
U.S. Appl. No. 29/510,839 Including its prosecution history, filed Dec. 3, 2014, Mophie, Inc.
U.S. Appl. No. 29/523,211 Including its prosecution history, filed Apr. 7, 2015, To et al.
U.S. Appl. No. 29/523,209 Including its prosecution history, filed Apr. 7, 2015, Mophie, Inc.
U.S. Appl. No. 29/528,266 Including its prosecution history, filed May 27, 2015, Gjøvik et al.
U.S. Appl. No. 29/524,901 Including its prosecution history, filed Jul. 31, 2015, Dang et al.
U.S. Appl. No. 15/223,683 Including its prosecution history, filed Jul. 29, 2016, Huang et al.
U.S. Appl. No. 15/223,735 Including its prosecution history, filed Jul. 29, 2016, Diebel et al.
International Search Report and Written Opinion of the International Searching Authority for PCT/US2011/037244, dated Jul. 19, 2011.
International Preliminary Report on Patentability for PCT/US2011/037244, dated Nov. 29, 2012.
International Search Report and Written Opinion of the International Searching Authority for PCT/US2011/037249, dated Jul. 13, 2011.
International Preliminary Report on Patentability for PCT/US2011/037249, dated Nov. 29, 2012.
International Search Report and Written Opinion of the International Searching Authority for PCT/US2011/037254, dated Jul. 13, 2011.
International Preliminary Report on Patentability for PCT/US2011/037254, dated Nov. 29, 2012.
International Search Report and Written Opinion of the International Searching Authority for PCT/US2011/037257, dated Sep. 22, 2011.
International Preliminary Report on Patentability for PCT/US2011/037257, dated Nov. 29, 2012.
International Search Report and Written Opinion of the International Searching Authority for PCT/US2012/041768, dated Feb. 27, 2013.
International Preliminary Report on Patentability for PCT/US2012/041768, dated Dec. 27, 2013.
International Search Report and Written Opinion of the International Searching Authority for PCT/US2013/057276, dated Dec. 10, 2013.
International Preliminary Report on Patentability for PCT/US2013/057276, dated Mar. 3, 2015.
International Search Report and Written Opinion of the International Searching Authority for PCT/US2014/017781, dated Jun. 8, 2014.
International Preliminary Report on Patentability for PCT/US2014/017781, dated Aug. 25, 2015.
International Search Report and Written Opinion of the International Searching Authority for PCT/US2014/023592, dated Aug. 28, 2014.
International Preliminary Report on Patentability for PCT/US2014/023592, dated Sep. 15, 2015.
International Search Report and Written Opinion for PCT/US2014/067470, dated Mar. 31, 2015.

(56) References Cited

OTHER PUBLICATIONS

International Preliminary Report of Patentability for PCT/US2014/067470, dated Jun. 9, 2016.
International Search Report and Written Opinion for PCT/US2015/065800, dated Apr. 21, 2016.
Mophie Pulse for iPod Touch 4G, http://www.mophie.com/pulse-iPod-Touch-4th-Gen-vibrating-gaming-case-p/2015_PUL-T4-GRY.htm.
"Sandberg BatteryCase for iPhone 4/4S delivers more band for your buck," dated Mar. 15, 2012, http://www.gizmag.com/sanberg-batterycase-iphone/21839.
Shawn Brown, "Incase Power Slider battery doubles as a case," dated Nov. 19, 2008, http://www.iphonebuzz.com/incase-power-slider-battery-doubles-as-a-case-195224.php.
Nick Guy, "Incipio offGRID Battery Case for iPhone 5/5s," dated Oct. 9, 2013, http://www.ilounge.com/index.php/reviews/entry/incipio-offgrid-battery-case-for-iphone-5-5s/.
Jeremy Horwitz, "Mophie Juice Pack Plus for iPhone 5," dated May 21, 2013, http://www.ilounge.com/index.php/reviews/entry/mophie-juice-pack-plus-for-iphone-5/.
Nick Guy, "RND Power Solutions Sync & Charge Dock with Lightning Connector," dated Nov. 18, 2013, http://www.ilounge.com/index.php/reviews/entry/tylt-energi-sl.
Julie Strietelmeier, "Seidio INNODock Desktop Cradle for Treo 650," dated Jul. 28, 2005, http://the-gadgeteer.com/2005/07/28/seidio_innodock_desktop_cradle_for_treo_650/.
Brian Nyhuis, "Mophie Juice Pack Battery Case for Samsung Galaxy S III Review," dated Nov. 28, 2012, http://www.legitreviews.com/mophie-juice-pack-battery-case-for-samsung-galaxy-s-iii-review_2084.
"PowerSkin Samsung Galaxy S3 Case with Backup Battery," dated Aug. 19, 2012, http://gadgetsin.com/powerskin-samsung-galaxy-s3-case-with-backup-battery.htm.
"iPhone 4 Case with Battery Pack," dated Sep. 28, 2010, http://gadgetsin.com/iphone-4-case-with-battery-pack.htm.
Jonathan Pena, "iPhone 5 Cases, Round 3," dated Sep. 16, 2012, http://www.technologytell.com/apple/103833/iphone-5-cases-round-3/.
Jeremy Horwitz, "Mophie Juice Pack for iPhone," dated Dec. 7, 2007, http://www.ilounge.com/index.php/reviews/entry/mophie-juice-pack-for-iphone/.
Dr. Macenstein, "Review: Mophie Juice Pack for iPhone," dated Apr. 27, 2008, http://macenstein.com/default/archives/1314.
Wayne Schulz, "iPhone Extended Battery Review—Mophie Juice Pack," dated Jun. 17, 2008, http://www.geardiary.com/2008/06/17/iphone-extended-battery-review-mophie-juice-pack/.
Mophie Juice Pack iPhone 1G Product—Figures 1-7—Retrieved from http://www.mophie.com/products/juice-pack on Apr. 10, 2009.
Mophie Juice Pack iPhone 1G Product—Figure 8—Retrieved from http://www.mophie.com/pages/information/ on Apr. 10, 2009.
Mophie Juice Pack iPhone 1G Product—Figures 9-14—Retrieved from http://www.mophie.com/blogs/Juice_Pack_FAQ on Apr. 10, 2009.
Mophie Juice Pack iPhone 1G Product—Figures 15-16—Retrieved from http://mophie.com/blogs/Juice_Pack_FAQ on Apr. 20, 2009. Figure 16 is dated May 1, 2008.
Tomas Ratas, "Mophie Juice Pack—iPhone 3G," dated Dec. 9, 2008, http://www.testfreaks.com/blog/review/mophie-juice-pack-iphone-3g/.
Dr. Macenstein, "Review: Mophie Juice Pack 3G for iPhone," dated Nov. 27, 2008, http://macenstein.com/default/archives/1820.
Ewdison Then, "Mophie Juice Pack iPhone 3G Review," dated Nov. 12, 2008, http://www.slashgear.com/mophie-juice-pack-iphone-3g-review-1222446/.
Mophie Juice Pack iPhone 3G Product—Figures 1-8—Retrieved from http://www.mophie.com/products/juice-pack-iphone-3g on Apr. 10, 2009.
Mophie Juice Pack iPhone 3G Product—Figures 9-10—Retrieved from http://www.mophie.com/pages/iphone-3g-details on Apr. 10, 2009.
Mophie Juice Pack iPhone 3G Product—Figures 11-14—Retrieved from http://mophie.com/blogs/Juice_Pack_3G_FAQ on Apr. 10, 2009.
Mophie Juice Pack iPhone 3G Product—Figures 15-16—Retrieved from http://mophie.com/blogs/press on Apr. 20, 2009. Figure 15 is dated Aug. 4, 2008, and Figure 16 is dated Nov. 10, 2008.
Mophie Juice Pack iPhone 3G User Manual—Retrieved from http://static3.shopify.com/s/files/1/0008/4942/assets/mophie_juice_pack_3G_manual_rl.pdf on Apr. 10, 2009.
Panasonic Lithium Ion Batteries Technical Handbook, dated 2007.
Chris Foresman, "Several Backup Batteries Can Extend Your Daily iPhone 3G Use," dated Jul. 18, 2008, http://arstechnica.com/apple/2008/07/several-backup-batteries-can-extend-your-daily-iphone-3g-use/.
Using Your Treo 650 Smartphone by palmOne, dated 2005.
Lisa Gade, "Palm Treo 750," dated Jan. 17, 2007, http://www.mobiletechreview.com/phones/Treo-750.htm.
Incase Power Slider 3G for iPhone 3G Product Reference, alleged by Incase to be available on Nov. 28, 2008.
iPhone User's Guide, 2007.
"Power Slider," Web Archive Date Dec. 4, 2008, https://web.archive.org/web/20081204105303/http://goincase.com/products/detail/power-slider-ec20003/?.
Azadeh Ensha, "A Case for Filling the iPhone 3G's Power Vacuum," Dated Nov. 27, 2008.
Joseph Flatley, "Incase Power Slider for iPhone 3G Doubles the Juice, Lets You Sync," dated Nov. 17, 2008.
Darren Quick, "Mophie Juice Pack for iPhone 3G now shipping," dated Nov. 10, 2008, http://www.gizmag.com/mophie-juice-pack-iphone-3g/10342/.
Otterbox Catalog, 2006.
Jeremy Horwitz, "PhoneSuit MiLi Power Pack for iPhone," Jan. 29, 2009, http://www.ilounge.com/index.php/reviews/entry/phonesuit-mili-power-pack-for-iphone/.
Jeremy Horwitz, "FastMac TruePower iV Universal Battery Charger," Dec. 11, 2008, http://www.ilounge.com/index.php/reviews/entry/fastmac-truepower-iv-universal-battery-charger/.
Jeremy Horwitz, "Konnet PowerKZ Extended Power for iPhone," Apr. 2, 2009, http://www.ilounge.com/index.php/reviews/entry/konnet-powerkz-extended-power-for-iphone/.
"Test: Batterie iPhone SKPAD" with Machine English Translation, Feb. 2, 2009, http://iphonesofa.com/2009/02/02/test-batterie-iphone-skpad.
Kanamori et al., "USB battery-charger designs meet new industry standards," EDN pp. 63-70, dated Feb. 21, 2008.
AVR458: Charging Lithium-Ion Batteries with ATAVRBC100, which appear to include a date of Aug. 2008.
Battery Charging Specification, dated Apr. 15, 2009.
BCM2033 Product Brief, 2 pages, dated Nov. 1, 2002.
"USB battery charger detector intelligently powers mobiles," Dec. 17, 2007, http://www.eetasia.com/ART_8800493819_765245_NP_10b171b6.HTMce#.
Webpage Archive, Mophie.com, Nov. 25, 2007.
Ben Kaufman, "Behind the Invention: The mophie Juice Pack," dated Dec. 31, 2013, https://medium.com/@benkaufman/behind-the-invention-the-mophie-juice-pack-a0620f74efcf.
Mophie Relo Recharge, dated Feb. 7, 2006, http://songsling.com/recharge.html.
Amazon.com, "Galaxy S6 Battery Case, i-Blason External Protective Battery Case/Cover for Samsung Galaxy S6 2015 Release." Customer Review published Mar. 29, 2015. Retrieved from internet at <http://www.amazon.com/Case-i-Blason-External-Protective-Versions/dp/B00SNS4LME>, Apr. 28, 2016. 7 pages.
*Case-Ari, LLC* v. *mStation, Inc.*, Case No. 1:2010-CV-01874 in the United States District Court for the Northern District of Georgia, filed Jun. 17, 2010 (Docket).
*Daniel Huang* v. *GC Technology, LLC*, Case No. CV10-4705 CAS (VBKx) in the United States District Court for the Central District of California, filed Jun. 24, 2010 (Docket).
*Hali-Power, Inc.* v. *mStation Corp.*, Case No. 1:2010-CV-00773 in the United States District Court for the Northern District of New York, filed Jun. 30, 2010 (Docket).

(56) References Cited

OTHER PUBLICATIONS

*Mophie, Inc. v. Loza & Loza, LLP*, Case No. SACV11-00539 DOC (MLGx) in the United States District Court for the Central District of California, filed Apr. 7, 2011 (Docket).
Mophie's Complaint, filed Apr. 7, 2011 in *Mophie, Inc. v. Loza & Loza, LLP*, Case No. SACV11-00539 DOC (MLGx) in the United States District Court for the Central District of California.
*Mophie, Inc. v. Foreign Trade Corporation*, Case No. 8:12-CV-00292-JST-RNB in the United States District Court for the Central District of California, filed Feb. 24, 2012 (Docket).
*Mophie, Inc. v. Kdlinks Inc.*, Case No. 2:2012-CV-02639 in the United States District Court for the Central District of California, filed Mar. 27, 2012 (Docket).
*Otter Products, LLC v. Mophie, LLC*, Case No. 1:2012-CV-01969 in the United States District Court for the District of Colorado, filed Jul. 27, 2012 (Docket).
Mophie's Answer, filed Oct. 15, 2012 in *Otter Products, LLC v. Mophie, LLC*, Case No. 1:2012-CV-01969 in the United States District Court for the District of Colorado.
Otter's Motion for Summary Judgment of Infringement and Declaration in Support Thereof, filed May 13, 2013 in *Otter Products, LLC v. Mophie, LLC*, Case No. 1:2012-CV-01969 in the United States District Court for the District of Colorado.
Mophie's Opposition to Motion for Summary Judgment of Infringement, filed Jun. 6, 2013 in *Otter Products, LLC v. Mophie, LLC*, Case No. 1:2012-CV-01969 in the United States District Court for the District of Colorado.
Mophie's Claim Construction Brief, filed Jun. 14, 2013 in *Otter Products, LLC v. Mophie, LLC*, Case No. 1:2012-CV-01969 in the United States District Court for the District of Colorado.
Otter's Claim Construction Brief, filed Jun. 14, 2013 in *Otter Products, LLC v. Mophie, LLC*, Case No. 1:2012-CV-01969 in the United States District Court for the District of Colorado.
Mophie's Brief in Response to Otter's Claim Construction Brief, filed Jun. 24, 2013 in *Otter Products, LLC v. Mophie, LLC*, Case No. 1:2012-CV-01969 in the United States District Court for the District of Colorado.
Otter's Rebuttal Brief for Construction of Claim Terms and Declaration, filed Jun. 24, 2013 in *Otter Products, LLC v. Mophie, LLC*, Case No. 1:2012-CV-01969 in the United States District Court for the District of Colorado.
Otter's Reply in Support of Motion for Summary Judgment of Infringement, filed Jun. 24, 2013 in *Otter Products, LLC v. Mophie, LLC*, Case No. 1:2012-CV-01969 in the United States District Court for the District of Colorado.
Joint Claim Construction Statement, filed Jun. 26, 2013 in *Otter Products, LLC v. Mophie, LLC*, Case No. 1:2012-CV-01969 in the United States District Court for the District of Colorado.
*Incase Designs, Inc. v. Mophie, Inc.*, Case No. 3:2013-CV-00602 in the United States District Court for the Northern District of California, filed Feb. 12, 2013 (Docket).
Mophie's Amended Answer and Counterclaims, filed May 8, 2013 in *Incase Designs, Inc. v. Mophie, Inc.*, Case No. 3:2013-CV-00602 in the United States District Court for the Northern District of California.
Mophie's Opposition to Motion to Strike Amended Affirmative Defenses, Filed Jun. 12, 2013 in *Incase Designs, Inc. v. Mophie, Inc.*, Case No. 3:2013-CV-00602 in the United States District Court for the Northern District of California.
Mophie's Reply in Support of Motion to Stay and Supporting Declaration, filed Sep. 3, 2013 in *Incase Designs, Inc. v. Mophie, Inc.*, Case No. 3:2013-CV-00602 in the United States District Court for the Northern District of California.
*Incase Designs, Inc. v. Mophie, Inc.*, Case No. 3:2013-CV-03356 in the United States District Court for the Northern District of California, filed Jul. 18, 2013 (Docket).
*Incase Designs, Corp. v. Mophie, Inc.*, Case No. 3:2013-CV-04314 in the United States District Court for the Northern District of California, filed Sep. 18, 2013 (Docket).

Mophie Motion 1—To Be Accorded Benefit, filed Nov. 20, 2013 in Patent Interference No. 105,946(RES).
Declaration of John Feland, Ph.D, in Support of Mophie Motion 1 To Be Accorded Benefit, dated Nov. 20, 2013, in Patent Interference No. 105,946(RES).
Mophie Motion 2—For Judgment that Incase's Involved Claims Are Unpatentable, filed Nov. 20, 2013 in Patent Interference No. 105,946(RES).
Declaration of John Feland, Ph.D, In Support of Mophie Motion 2 for Judgement That Incase's Involved Claims Are Unpatentable, dated Nov. 20, 2013, in Patent Interference No. 105,946(RES).
Incase Motion 1—Motion for Benefit, filed Nov. 20, 2013 in Patent Interference No. 105,946(RES).
Incase Motion 2—Motion to Undesignate Claims, filed Nov. 20, 2013 in Patent Interference No. 105,946(RES).
Incase Motion 3—Motion for Judgment Based on Lack of Written Description, filed Nov. 20, 2013 in Patent Interference No. 105,946(RES).
Incase Motion 4—Motion for Unpatentability of Mophie Claims, filed Nov. 20, 2013 in Patent Interference No. 105,946(RES).
Declaration of Andrew Wolfe, filed Nov. 20, 2013 in Patent Interference No. 105,946(RES).
Declaration of Thomas Overthun, filed Nov. 20, 2013 in Patent Interference No. 105,946(RES).
Declaration of Gabriel Dan, filed Nov. 20, 2013 in Patent Interference No. 105,946(RES).
Mophie's Third Amended Complaint, filed Jun. 27, 2014, in *Mophie, Inc. v. Source Vista*, Case No. 8:13-CV-01321 in the United States District Court for the Central District of California.
LivingSocial's Answer to Mophie's Fifth Amended Complaint and Counterclaims, filed Sep. 24, 2014, in *Mophie, Inc. v. Source Vista*, Case No. 8:13-CV-01321 in the United States District Court for the Central District of California.
Shah's Answer, Affirmative Defenses, and Counterclaims to Plaintiff's Fifth Amended Complaint, filed Sep. 24, 2014, in *Mophie, Inc. v. Source Vista*, Case No. 8:13-CV-01321 in the United States District Court for the Central District of California.
Expert Report of Dr. David Munson, dated Aug. 28, 2014, in *Mophie, Inc. v. Source Vista*, Case No. 8:13-CV-01321 in the United States District Court for the Central District of California.
Expert Report of John Feland, Ph.D, dated Aug. 28, 2014, in *Mophie, Inc. v. Source Vista*, Case No. 8:13-CV-01321 in the United States District Court for the Central District of California.
Rebuttal Expert Report of John Feland, Ph.D, dated Sep. 25, 2014, in *Mophie, Inc. v. Source Vista*, Case No. 8:13-CV-01321 in the United States District Court for the Central District of California.
Rebuttal Expert Report of Dr. David Munson, dated Sep. 25, 2014, in *Mophie, Inc. v. Source Vista*, Case No. 8:13-CV-01321 in the United States District Court for the Central District of California.
Mophie's Second Amended Response to LivingSocial's Interrogatory No. 1[21], dated Aug. 28, 2014, in *Mophie, Inc. v. Source Vista*, Case No. 8:13-CV-01321 in the United States District Court for the Central District of California.
Mophie's Second Amended Response to Serve Global's Interrogatory No. 2, dated Aug. 28, 2014, in *Mophie, Inc. v. Source Vista*, Case No. 8:13-CV-01321 in the United States District Court for the Central District of California.
Defendant's Memorandum in Support of Motion for Partial Summary Judgement, dated Sep. 23, 2014, in *Mophie, Inc. v. Source Vista*, Case No. 8:13-CV-01321 in the United States District Court for the Central District of California.
Declaration of David Munson in Support of Defendant's Motion for Partial Summary Judgment, dated Sep. 22, 2014, in *Mophie, Inc. v. Source Vista*, Case No. 8:13-CV-01321 in the United States District Court for the Central District of California.
John Feland, Ph.D. Deposition Transcript, dated Sep. 30, 2014, in *Mophie, Inc. v. Source Vista*, Case No. 8:13-CV-01321 in the United States District Court for the Central District of California.
Matthew Brand Deposition Transcript, dated Jul. 23, 2014, in *Mophie, Inc. v. Source Vista*, Case No. 8:13-CV-01321 in the United States District Court for the Central District of California.

(56) References Cited

OTHER PUBLICATIONS

Dharmesh Shah Deposition Transcript, dated Jul. 11, 2014, in *Mophie, Inc. v. Source Vista*, Case No. 8:13-CV-01321 in the United States District Court for the Central District of California.
Defendants' Statement of Uncontroverted Material Fact and Contentions of Law, filed Sep. 22, 2014 in *Mophie, Inc. v. Source Vista*, Case No. 8:13-CV-01321 in the United States District Court for the Central District of California.
Memorandum of Points and Authorities in Support of Mophie's Motion for Summary Judgment, filed Sep. 22, 2014, in *Mophie, Inc. v. Source Vista*, Case No. 8:13-CV-01321 in the United States District Court for the Central District of California.
Statement of Uncontroverted Facts and Conclusions of Law in Support of Mophie's Motion for Summary Judgment, filed Sep. 22, 2014, in *Mophie, Inc. v. Source Vista*, Case No. 8:13-CV-01321 in the United States District Court for the Central District of California.
Mophie's Opposition to Shah and Serve Global's Motion for Partial Summary Judgment, dated Oct. 3, 2014, in *Mophie, Inc. v. Source Vista*, Case No. 8:13-CV-01321 in the United States District Court for the Central District of California.
Statement of Genuine Disputes of Material Fact in Opposition to Shah and Serve Global's Motion for Partial Summary Judgment, filed Oct. 3, 2014, in *Mophie, Inc. v. Source Vista*, Case No. 8:13-CV-01321 in the United States District Court for the Central District of California.
Opposition of LivingSocial to Mophie's Motion for Summary Judgment, dated Oct. 3, 2014, in *Mophie, Inc. v. Source Vista*, Case No. 8:13-CV-01321 in the United States District Court for the Central District of California.
Defendants' Opposition to Plaintiff's Motion for Summary Judgment, filed Oct. 3, 2014, in *Mophie, Inc. v. Source Vista*, Case No. 8:13-CV-01321 in the United States District Court for the Central District of California.
Defendants' Response to Plaintiffs Statement of Uncontroverted Material Fact and Contentions of Law, filed Oct. 3, 2014, in *Mophie, Inc. v. Source Vista*, Case No. 8:13-CV-01321 in the United States District Court for the Central District of California.
David Munson Deposition Transcript, dated Sep. 29, 2014, in *Mophie, Inc. v. Source Vista*, Case No. 8:13-CV-01321 in the United States District Court for the Central District of California.
Mophie's First Amended Complaint, filed Jun. 25, 2014, in *Mophie, Inc. v. UNU Electronics Inc.*, Case No. 8:13-CV-01705 in the United States District Court for the Central District of California.
UNU's Answer and Counterclaims, filed Jul. 10, 2014, in *Mophie, Inc. v. UNU Electronics Inc.*, Case No. 8:13-CV-01705 in the United States District Court for the Central District of California.
Mophie's Responses to Defendant's Third Set of Interrogatories (No. 12), dated Aug. 21, 2014, in *Mophie, Inc. v. UNU Electronics Inc.*, Case No. 8:13-CV-01705 in the United States District Court for the Central District of California.
Mophie's Responses to Defendant's First set of Requests for Admissions (Nos. 1-46), dated Aug. 19, 2014, in *Mophie, Inc. v. UNU Electronics Inc.*, Case No. 8:13-CV-01705 in the United States District Court for the Central District of California.
Mophie's Responses to Defendant's Second set of Requests for Admissions (Nos. 47-109), dated Aug. 19, 2014, in *Mophie, Inc. v. UNU Electronics Inc.*, Case No. 8:13-CV-01705 in the United States District Court for the Central District of California.
Request for Ex Parte Reexamination of U.S. Pat. No. 8,367,235, filed Aug. 14, 2014.
Corrected Request for Ex Parte Reexamination of U.S. Pat. No. 8,367,235, filed Sep. 18, 2014.
Declaration of John Feland, Ph.D. In Support of Mophie's Opposition to Defendants Motion for Partial Summary Judgment, filed Oct. 3, 2014, in *Mophie, Inc. v. Source Vista*, Case No. 8:13-CV-01321 in the United States District Court for the Central District of California.

LivingSocial's Reply in Support of Motion for Summary Judgment, Filed Oct. 10, 2014, in *Mophie, Inc. v. Source Vista*, Case No. 8:13-CV-01321 in the United States District Court for the Central District of California.
Defendants' Reply in Support of Motion for Partial Summary Judgment, Filed Oct. 10, 2014, in *Mophie, Inc. v. Source Vista*, Case No. 8:13-CV-01321 in the United States District Court for the Central District of California.
Reply in Support of Mophie's Motion for Summary Judgment, Filed Oct. 10, 2014, in *Mophie, Inc. v. Source Vista*, Case No. 8:13-CV-01321 in the United States District Court for the Central District of California.
Mophie's Reply to Counterclaims of LivingSocial, filed Oct. 14, 2014, in *Mophie, Inc. v. Source Vista*, Case No. 8:13-CV-01321 in the United States District Court for the Central District of California.
Mophie's Reply to Counterclaims of Shah, filed Oct. 14, 2014, in *Mophie, Inc. v. Source Vista*, Case No. 8:13-CV-01321 in the United States District Court for the Central District of California.
Defendant's Response to Mophie's Fourth Set of Interrogatories, dated Sep. 23, 2014, in *Mophie, Inc. v. UNU Electronics Inc.*, Case No. 8:13-CV-01705 in the United States District Court for the Central District of California.
Plaintiff Mophie's Preliminary Claim Constructions and Identification of Extrinsic Evidence, dated Oct. 14, 2014, in *Mophie, Inc. v. UNU Electronics Inc.*, Case No. 8:13-CV-01705 in the United States District Court for the Central District of California.
Defendant's Preliminary Claim Constructions and Extrinsic Evidence, dated Oct. 14, 2014, in *Mophie, Inc. v. UNU Electronics Inc.*, Case No. 8:13-CV-01705 in the United States District Court for the Central District of California.
Plaintiff Mophie's Opening Brief on Claim Construction, filed Oct. 29, 2014, in *Mophie, Inc. v. UNU Electronics Inc.*, Case No. 8:13-CV-01705 in the United States District Court for the Central District of California.
Declaration of John Feland, Ph.D. In Support of Plaintiff's Preliminary Claim Constructions, filed Oct. 29, 2014, in *Mophie, Inc. v. UNU Electronics Inc.*, Case No. 8:13-CV-01705 in the United States District Court for the Central District of California.
Supplemental Declaration of John Feland, Ph.D. in Support of Plaintiff's Claim Constructions, filed Oct. 29, 2014, in *Mophie, Inc. v. UNU Electronics Inc.*, Case No. 8:13-CV-01705 in the United States District Court for the Central District of California.
Declaration of Sheila N. Swaroop in Support of Mophie's Opening Claim Construction Brief, filed Oct. 29, 2014, in *Mophie, Inc. v. UNU Electronics Inc.*, Case No. 8:13-CV-01705 in the United States District Court for the Central District of California.
Transcript of Deposition of John Feland, dated Oct. 21, 2014, in *Mophie, Inc. v. UNU Electronics Inc.*, Case No. 8:13-CV-01705 in the United States District Court for the Central District of California.
Defendant's Opening Claim Construction Brief, dated Oct. 29, 2014, in *Mophie, Inc. v. UNU Electronics Inc.*, Case No. 8:13-CV-01705 in the United States District Court for the Central District of California.
Order Granting Request for Ex Parte Reexamination of U.S. Pat. No. 8,367,235, in Reexamination Control No. 90/013,319, dated Oct. 24, 2014.
Order Re LivingSocial's Motion for Summary Judgment, Mophie's Motion for Summary Judgment, Source Vista and Shah's Motion for Partial Summary Judgment, and Mophie's Motion to Bifurcate, dated Nov. 12, 2014, in *Mophie, Inc. v. Source Vista*, Case No. 8:13-CV-01321 in the United States District Court for the Central District of California.
Mophie's Memorandum in Support of its Motion for Reconsideration, filed Nov. 19, 2014, in *Mophie, Inc. v. Source Vista*, Case No. 8:13-CV-01321 in the United States District Court for the Central District of California.
Declaration of Sheila N. Swaroop in Support of Mophie's Motion for Reconsideration, filed Nov. 19, 2014, in *Mophie, Inc. v. Source Vista*, Case No. 8:13-CV-01321 in the United States District Court for the Central District of California.

(56) References Cited

OTHER PUBLICATIONS

Order Denying Plaintiff's Motion for Reconsideration, dated Nov. 21, 2014, in *Mophie, Inc. v. Source Vista*, Case No. 8:13-CV-01321 in the United States District Court for the Central District of California.

Defendants Dharmesh Shah and Serve Global, LLC's Memorandum of Points and Authorities in Support of Defendants's Motion for Attorney's Fees, filed Mar. 21, 2015, in *Mophie, Inc. v. Source Vista*, Case No. 8:13-CV-01321 in the United States District Court for the Central District of California.

Memorandum of Points and Authorities in Support of Livingsocial, Inc.'s Motion for Legal Fees and Costs, filed Mar. 20, 2015, in *Mophie, Inc. v. Source Vista*, Case No. 8:13-CV-01321 in the United States District Court for the Central District of California.

Plaintiff Mophie, Inc.'s Opposition to Defendants Dharmesh Shah and Serve Global, LLC's Motion for Attorneys' Fees, filed Apr. 3, 2015, in *Mophie, Inc. v. Source Vista*, Case No. 8:13-CV-01321 in the United States District Court for the Central District of California.

Plaintiff Mophie, Inc.'s Opposition to Defendant Livingsocial, Inc.'s Motion for Attorneys' Fees, filed Apr. 3, 2015, in *Mophie, Inc. v. Source Vista*, Case No. 8:13-CV-01321 in the United States District Court for the Central District of California.

Reply to Plaintiff's Opposition to Defendants Dharmesh Shah and Serve Global, LLC's Motion for Attorney's Fees, filed Apr. 10, 2015, in *Mophie, Inc. v. Source Vista*, Case No. 8:13-CV-01321 in the United States District Court for the Central District of California.

Reply in Support of Livingsocial, Inc.'s Motion for Legal Fees and Costs, filed Apr. 10, 2015, in *Mophie, Inc. v. Source Vista*, Case No. 8:13-CV-01321 in the United States District Court for the Central District of California.

Amended Final Judgment and Permanent Injunction, dated Dec. 11, 2015, in *Mophie, Inc. v. Source Vista*, Case No. 8:13-CV-01321 in the United States District Court for the Central District of California.

Order Re Motions for Attorneys' Fees, Motion to Amend Permanent Injunction, Motions for Judgment as a Matter of Law, Motion for Relief From Judgment, and Motion for New Trial, dated Dec. 11, 2015, in *Mophie, Inc. v. Source Vista*, Case No. 8:13-CV-01321 in the United States District Court for the Central District of California.

Mophie's Complaint, filed Dec. 16, 2015, in *Mophie, Inc. v. Cute Mobile Inc.*, Case No. 8:15-cv-02086 in the United States District Court for the Central District of California.

Daniel Huang Deposition Transcript (Redacted) with Exhibit 121, dated Aug. 21, 2014, in *Mophie, Inc. v. Source Vista*, Case No. 8:13-CV-01321 in the United States District Court for the Central District of California.

Mophie's First Amended Complaint, filed May 25, 2016 in *Mophie, Inc. v. Cute Mobile Inc.*, Case No. 8:15-cv-02086 in the United States District Court for the Central District of California.

U.S. Appl. No. 29/556,805 Including its prosecution history, filed Mar. 3, 2016, Dang et al.

U.S. Appl. No. 29/556,807 Including its prosecution history, filed Mar. 3, 2016, Dang et al.

U.S. Appl. No. 29/556,809 Including its prosecution history, filed Mar. 3, 2016, Dang et al.

U.S. Appl. No. 15/686,770 Including its prosecution history, filed Aug. 25, 2017, Huang et al.

Jun. 29, 2017 Int'l Preliminary Report on Patentability for PCT/US2015/065800.

U.S. Appl. No. 29/626,999 Including its prosecution history, filed Nov. 21, 2017.

U.S. Appl. No. 15/820,197 Including its prosecution history, filed Nov. 21, 2017, DiLella.

\* cited by examiner

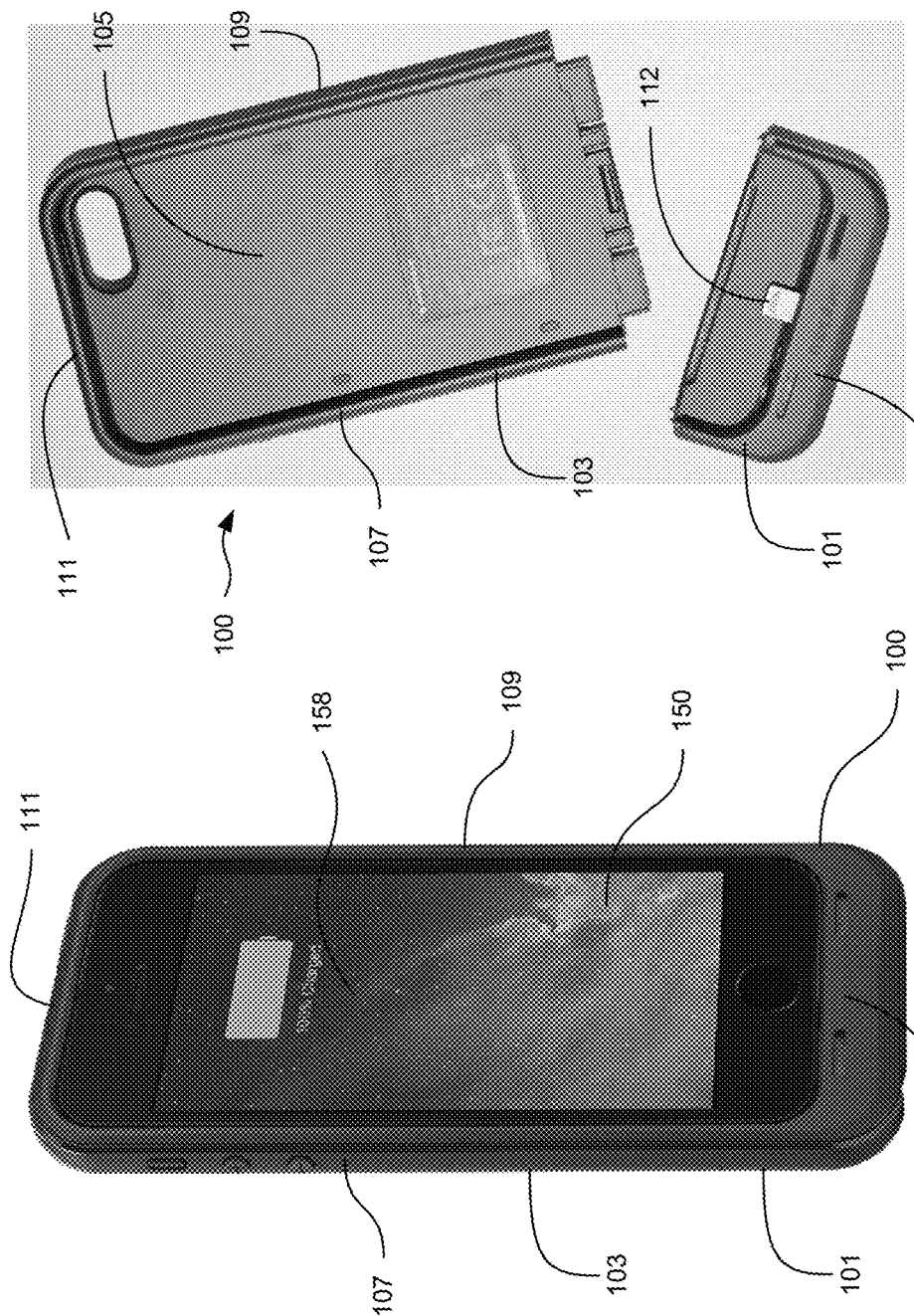

| Charge/Discharge Type | Battery Health Degradation Value |
|---|---|
| From 0% to 100% | 10 |
| From 20% to 80% | 6 |
| From 40% to 100% | 6 |
| From 60% to 80% | 2 |
| From 100% to 0% | 10 |
| From 50% to 10% | 4 |
| From 100% to 50% | 5 |
| ... | ... |

SYSTEMS FOR MANAGING CHARGING DEVICES BASED ON BATTERY HEALTH INFORMATION

CROSS-REFERENCE TO RELATED APPLICATIONS

This application claims the benefit under 35 U.S.C. § 119(e) of U.S. Provisional Patent Application No. 62/045,461, filed Sep. 3, 2014, and titled SYSTEMS AND METHODS FOR BATTERY CHARGING AND MANAGEMENT, and of U.S. Provisional Patent Application No. 62/077,134, filed Nov. 7, 2014, and titled SYSTEMS AND METHODS FOR BATTERY CHARGING AND MANAGEMENT. Each of the applications listed above is incorporated by reference in its entirety.

BACKGROUND OF THE INVENTION

Field of the Disclosure

Some embodiments of this disclosure generally relate to systems and methods for charging batteries of mobile electronic devices.

Description of the Related Art

There currently exist a number of charging devices for charging mobile electronic devices. Nevertheless, there remains a need for improved charging devices.

SUMMARY OF CERTAIN EMBODIMENTS

The summary of certain example embodiments provided below are disclosed by way of example, and are not intended to be limiting.

Various embodiments disclosed herein can relate to a charging device for charging a mobile electronic device. The charging device can include a supplemental battery, an input interface configured to receive electrical power from an external power source, an output interface configured to output electrical power to the mobile electronic device, and a controller. The charging device can include a charging electrical pathway from the input interface to the supplemental battery, can the controller can be configured to direct electricity from the input interface, along the charging electrical pathway, to the supplemental battery to charge the supplemental battery. The charging device can include a discharge electrical pathway from the supplemental battery to the output interface, and the controller can be configured to direct electricity from the supplemental battery, along the discharge electrical pathway, to the output interface to charge the mobile electronic device. The charging device can include a bypass electrical pathway from the input interface to the output interface, and the controller can be configured to direct electricity from the input interface, along the bypass electrical pathway, to the output interface to charge the mobile electronic device. The charging device can include a first voltage modifier on the charging electrical pathway between the input interface and the supplemental battery. The first voltage modifier can be configured to reduce voltage that is supplied to the supplemental battery from the input interface. The charging device can include a second voltage modifier on both the discharge electrical pathway and the bypass electrical pathway. The second voltage modifier can be configured to increase voltage supplied from the supplemental battery to the output interface along the discharge electrical pathway and to increase voltage supplied from the input interface to the output interface along the bypass electrical pathway.

The first voltage modifier can include a buck converter. The second voltage modifier can include a boost converter. The controller can be configured to actuate one or more switches to selectively direct electricity along one or more of the charging electrical pathway, the discharge electrical pathway, and the bypass electrical pathway.

The charging device can be configured to transfer data between the mobile electronic device and an external device through the output interface and the input interface.

The charging device can include a protective case configured to at least partially enclose the mobile electronic device. The protective case can include a back portion configured to be positioned along at least a portion of a back side of the mobile electronic device, a right side portion configured to be positioned along at least a portion of a right side of the mobile electronic device, a left side portion configured to be positioned along at least a portion of a left side of the mobile electronic device, a top portion configured to be positioned along at least a portion of a top of the mobile electronic device, a bottom portion configured to be positioned along at least a portion of a bottom of the mobile electronic device, and/or a front opening configured such that a display of the mobile electronic device is visible through the front opening.

The charging device can include a computer-readable memory element that includes power capacity information for the external power supply. The controller can be configured to determine a first current for the bypass electrical pathway and a second current for the charging electrical pathway based at least in part on the power capacity information. The controller can be configured to direct supplemental electrical current from the supplemental battery along the discharge electrical pathway when the electrical current provided from the external power supply along the bypass electrical pathway is below a charging current value of the mobile electronic device.

The controller can include a hardware processor and computer-executable instructions stored on a memory element.

Various embodiments disclosed herein can relate to a charging device for charging a mobile electronic device. The charging device can include a protective case configured to at least partially enclose the mobile electronic device. The protective case can include a lower case portion comprising a back portion configured to be positioned along at least a portion of a back side of the mobile electronic device, a bottom portion configured to be positioned along at least a portion of a bottom of the mobile electronic device, a right side portion configured to be positioned along at least a portion of a right side of the mobile electronic device, a left side portion configured to be positioned along at least a portion of a left side of the mobile electronic device, an open top side to facilitate insertion of the mobile electronic device into the lower case portion, a supplemental battery disposed in the back portion of the lower case portion, an input interface on an exterior of the lower case portion, the input interface configured to receive electrical power from an external power source, and an output interface on an interior of the lower case portion, the output interface configured to engage an electrical port on the mobile electronic device to output electrical power to the mobile electronic device. The protective case can include an upper case portion that has a top portion configured to be positioned along at least a portion of a top of the mobile electronic device. The upper case portion can be configured to removably couple to the lower case portion to hold the mobile electronic device in the protective case. A front opening of the protective case can be configured such that a display of the mobile electronic device is visible through the front opening when the upper case portion is coupled to the lower case portion. The charging device can include one or more voltage modifiers that can be configured to modify voltage supplied from the input interface to the supplemental battery for charging the supplemental battery, modify voltage supplied from the supplemental battery to the output interface for charging the mobile electronic device, and modify voltage supplied from the input interface to the output interface without going through the supplemental battery for charging the mobile electronic device.

The at least one voltage modifier can include a buck converter configured to reduce the voltage supplied from the input interface to the supplemental battery for charging the supplemental battery. The at least one voltage modifier can include a boost converter configured to increase the voltage supplied from the supplemental battery to the output interface for charging the mobile electronic device and to increase the voltage supplied from the input interface to the output interface without going through the supplemental battery for charging the mobile electronic device.

The charging device can include a controller that can be configured to actuate one or more switches to selectively direct electricity along one or more of a charging electrical pathway from the input interface to the supplemental battery, a discharge electrical pathway from the supplemental battery to the output interface, and a bypass electrical pathway from the input interface to the output interface.

Various embodiments disclosed herein can relate to a charging device that includes a supplemental battery, an input interface configured to receive electrical power for charging the supplemental battery, an output interface configured to output electrical power for charging a mobile electronic device, a bypass electrical pathway from the input interface and the output interface without going through the supplemental battery, and a voltage modifier on the bypass electrical pathway configured to modify the voltage supplied from the input interface, along the bypass electrical pathway, to the output interface.

The charging device can include a discharge electrical pathway from the supplemental battery to the output interface, and the discharge electrical pathway can go through the voltage modifier such that the voltage modifier is configured to modify voltage supplied from the supplemental battery to the output interface.

The voltage modifier can be configured to boost the voltage. The voltage modifier can be a boost converter.

The charging device can include a protective case configured to at least partially enclose the mobile electronic device. The protective case can include a back portion configured to be positioned along at least a portion of a back side of the mobile electronic device, a right side portion configured to be positioned along at least a portion of a right side of the mobile electronic device, a left side portion configured to be positioned along at least a portion of a left side of the mobile electronic device, a top portion configured to be positioned along at least a portion of a top of the mobile electronic device, a bottom portion configured to be positioned along at least a portion of a bottom of the mobile electronic device, and/or a front opening configured such that a display of the mobile electronic device is visible through the front opening.

The output interface can include an electrical connector extending upward from the bottom portion, and the electrical connector can be configured to engage an electrical port on the mobile electronic device.

Various embodiments disclosed herein can relate to a method for determining power output capacity of a power supply. The method can include charging a battery with a first amount of current from a power supply, measuring a first voltage provided by the power supply when charging the battery with the first amount of current, determining that the first voltage is above a threshold voltage value, charging the battery with a second amount of current from the power supply, wherein the second amount of current is higher than the first amount of current, measuring a second voltage provided by the power supply when charging the battery with the second amount of current, determining that the second voltage is above the threshold voltage value, attempting to charge the battery with a third amount of current from the power supply, wherein the third amount of current is higher than the second amount of current, measuring a third voltage provided by the power supply when attempting to charge the battery with the third amount of current, determining that the third voltage is below the threshold voltage value, and determining the power output capacity of the power supply based at least in part on the value of the second amount of current.

The method can include charging the battery with one or more additional current amounts that are between the first amount of current and the second amount of current, measuring one or more additional voltages provided by the power supply when charging the battery at the one or more additional current amounts, and determining that the one or more additional voltages are above the threshold voltage value.

Determining the power output capacity of the power supply can be based at least in part on the second amount of current multiplied by the threshold voltage value. Determining the power output capacity of the power supply can include calculating a percentage of the second amount of current multiplied by the threshold voltage value. The determined power output capacity can be lower than the threshold voltage value multiplied by the third amount of current, and/or the determined power output capacity can be greater than or equal to the threshold voltage value multiplied by the second amount of current.

The method can include determining a first amount of electrical power to send to the battery for charging the battery and determining a second amount of electrical power to send to an output interface for charging a mobile electronic device based at least in part on the determined power output capacity of the power supply.

Various embodiments disclosed herein can relate to a charging device for determining a power output capacity of a power supply and for charging a mobile electronic device. The charging device can include a supplemental battery, an input interface configured to receive electrical power from an external power supply, an output interface configured to output electrical power to a mobile electronic device, and a controller. The charging device can include a charging electrical pathway from the input interface to the supplemental battery, and the controller can be configured to direct electricity from the input interface, along the charging electrical pathway, to the supplemental battery to charge the supplemental battery. The charging device can include a discharge electrical pathway from the supplemental battery to the output interface, and the controller can be configured to direct electricity from the supplemental battery, along the discharge electrical pathway, to the output interface to charge the mobile electronic device. The charging device can include a bypass electrical pathway from the input interface to the output interface, and the controller can be configured to direct electricity from the input interface, along the bypass electrical pathway, to the output interface to charge the mobile electronic device. The controller can be configured to direct a first amount of current from the input interface, along the charging electrical pathway, to the supplemental battery, determine a first voltage associated with the first amount of current, determine that a threshold is satisfied based at least in part on the first voltage for the first amount of current, direct a second amount of current from the input interface, along the charging electrical pathway, to the supplemental battery, wherein the second amount of current is greater than the first amount of current, determine a second voltage associated with the second amount of current, determine that the threshold is not satisfied based at least in part on the second voltage for the second amount of current, and determine a power output capacity of the external power supply coupled to the input interface based at least in part on the determinations that the threshold is satisfied by the first amount of current at the first voltage and that the threshold is not satisfied by the second amount of current at the second voltage.

The threshold can be a threshold voltage value. To determine that the threshold is not satisfied based at least in part on the second voltage for the second amount of current, the controller can be configured to determine whether dV/dI exceeds a threshold value, wherein dV is a voltage difference between the second voltage and the first voltage, and where dI is a current difference between the second amount of current and the first amount of current.

Determining the power output capacity of the external power supply can be based at least in part on the first amount of current. The controller can be configured to determine how much electrical power to direct along one or more of the bypass electrical pathway, the charging electrical pathway, and the discharge electrical pathway based at least in part on the determined power output capacity of the external power supply.

The charging device can include a protective case configured to at least partially enclose the mobile electronic device. The protective case can include a back portion configured to be positioned along at least a portion of a back side of the mobile electronic device, a right side portion configured to be positioned along at least a portion of a right side of the mobile electronic device, a left side portion configured to be positioned along at least a portion of a left side of the mobile electronic device, a top portion configured to be positioned along at least a portion of a top of the mobile electronic device, a bottom portion configured to be positioned along at least a portion of a bottom of the mobile electronic device, and/or a front opening configured such that a display of the mobile electronic device is visible through the front opening.

Various embodiments disclosed herein can relate to an electrical device for empirically determining a power output capacity of a power supply. The electrical device can include a power input interface configured to receive electrical power from a power supply, a variable load circuit configured to draw variable amounts of electrical current from the power supply through the power input interface, a voltmeter configured to determine an input voltage provided by the power supply as the variable amounts of electrical current are drawn from the power supply, and a controller configured to incrementally increase the amount of electrical current drawn by the variable load circuit from the power supply through the input interface, use the voltmeter to monitor the input voltage provided by the power supply as the amount of electrical current is incrementally increased, and determine whether a threshold is satisfied based at least in part based on the monitored input voltage, while the threshold is satisfied, continue to incrementally increase the amount of electrical current drawn by the variable load circuit from the power supply through the input interface, and when the threshold is not satisfied, determine a power output capacity of the power supply based at least in part on one or more of the determinations of whether the threshold was satisfied for the variable amounts of electrical current.

The variable load circuit can include a battery. The electrical device can include an output interface for outputting electrical power from the battery for charging a mobile electronic device. The electrical device can include a protective case configured to at least partially enclose the mobile electronic device. The controller can be configured to determine how much electrical power to send to the battery and to the output interface based at least in part on the determined power output capacity of the power supply.

The controller can be configured to determine the power output capacity of the power supply based at least in part on the value of the highest amount of electrical current for which the threshold was determined to be satisfied. The threshold can be a voltage value threshold.

Various embodiments disclosed herein can relate to a charging device for charging a mobile electronic device. The charging device can include a protective case configured to at least partially enclose the mobile electronic device. The protective case can include a lower case portion that case a back portion configured to be positioned along at least a portion of a back side of the mobile electronic device, a bottom portion configured to be positioned along at least a portion of a bottom of the mobile electronic device, a right side portion configured to be positioned along at least a portion of a right side of the mobile electronic device, a left side portion configured to be positioned along at least a portion of a left side of the mobile electronic device, an open top side to facilitate insertion of the mobile electronic device into the lower case portion, a supplemental battery disposed in the back portion of the lower case portion, an input interface on an exterior of the lower case portion, the input interface configured to receive electrical power from an external power source, and an output interface on an interior of the lower case portion. The output interface can be configured to engage an electrical port on the mobile electronic device to output electrical power to the mobile electronic device. The protective case can include an upper case portion that has a top portion configured to be positioned along at least a portion of a top of the mobile electronic device. The upper case portion can be configured to removably couple to the lower case portion to hold the mobile electronic device in the protective case. A front opening of the protective case can be configured such that a display of the mobile electronic device is visible through the front opening when the upper case portion is coupled to the lower case portion. The charging device can include a battery health monitor configured to monitor battery health information and to disable or limit charging or discharging of the supplemental battery based at least in part on the battery health information.

The battery health monitor can include a temperature sensor configured to measure a temperature for the charging device. The battery health information can include charge cycle information. The battery health information can include a health score, and the battery health monitor can be configured to adjust the health score by a first amount upon at least one of charging and discharging the supplemental battery at a first capacity range, and the battery health monitor can be configured to adjust the health score by a second amount upon at least one of charging and discharging the supplemental battery at a second capacity range. The battery health monitor can be configured to reduce the power capacity to which the supplemental battery is charged in response to a change in the health score.

Various embodiments disclosed herein can relate to a charging device for charging a mobile electronic device. The charging device can include a supplemental battery, an input interface configured to receive electrical power from an external power source, an output interface configured to output electrical power to a mobile electronic device, and a controller. The charging device can include a charging electrical pathway from the input interface to the supplemental battery, and the controller can be configured to direct electricity from the input interface, along the charging electrical pathway, to the supplemental battery to charge the supplemental battery. The charging device can include a discharge electrical pathway from the supplemental battery to the output interface, and the controller can be configured to direct electricity from the supplemental battery, along the discharge electrical pathway, to the output interface to charge the mobile electronic device. The charging device can include a bypass electrical pathway from the input interface to the output interface, and the controller can be configured to direct electricity from the input interface, along the bypass electrical pathway, to the output interface to charge the mobile electronic device. The charging device can include a computer-readable memory element. The controller can be configured to store battery health information in the computer-readable memory element, disable or reduce electrical current along one or more of the charging electrical pathway, the discharge electrical pathway, and the bypass electrical pathway based at least in part on the battery health information.

The charging device can include a protective case configured to at least partially enclose the mobile electronic device.

The charging device can include a temperature sensor, and the battery health information can include temperature information received from the temperature sensor. The battery health information can include charge cycle information. The battery health information can include a health score, and the controller can be configured to adjust the health score by a first amount upon at least one of charging and discharging the supplemental battery at a first capacity range, and the controller can be configured to adjust the health score by a second amount upon at least one of charging and discharging the supplemental battery at a second capacity range. The controller can be configured to reduce the power capacity to which the supplemental battery is charged based in part on the battery health information.

Upon detection of a major risk event, the controller can be configured to disable the supplemental battery from charging and discharging, and provide a notification to a user. Upon detection of a minor risk event, the controller can be configured to diagnose the health of the supplemental battery to determine whether the supplemental battery is unrecoverable, partially recoverable, or fully recoverable. Upon a determination that the supplemental battery is unrecoverable, the controller can be configured to disable the supplemental battery from charging and discharging, and provide a notification to a user. Upon a determination that the supplemental battery is partially recoverable, the controller can be configured to resume charging and discharging of the supplemental battery at a reduced performance level. Upon a determination that the supplemental battery is fully recoverable, the controller can be configured to resume normal charging and discharging of the supplemental battery. A major risk event can include a temperature measurement of less than about −10 degrees Celsius or greater than about 60 degrees Celsius. A minor risk event can include a temperature measurement between about −10 degrees Celsius and about 0 degrees Celsius or between about 45 degrees Celsius and about 60 degrees Celsius.

Various embodiments disclosed herein can relate to a charging device for charging a mobile electronic device. The charging device can include a supplemental battery, an input interface configured to receive electrical power from an external power source for charging the supplemental battery, an output interface configured to output electrical power to a mobile electronic device, and a controller configured to receive battery health information and to disable or limit charging or discharging of the supplemental battery based at least in part on the battery health information.

The charging device can include a protective case configured to at least partially enclose the mobile electronic device.

The charging device can include a temperature sensor, and the battery health information can include temperature information received from the temperature sensor. The battery health information can include charge cycle information. The battery health information can include a health score, and the controller can be configured to adjust the health score by a first amount upon at least one of charging and discharging the supplemental battery at a first capacity range, and the controller can be configured to adjust the health score by a second amount upon at least one of charging and discharging the supplemental battery at a second capacity range.

The controller can be configured to reduce the power capacity to which the supplemental battery is charged based at least in part on the battery health information.

Upon detection of a major risk event, the controller can be configured to disable the supplemental battery from charging and discharging, and provide a notification to a user. Upon detection of a minor risk event, the controller can be configured to diagnose the health of the supplemental battery to determine whether the supplemental battery is unrecoverable, partially recoverable, or fully recoverable. Upon a determination that the supplemental battery is unrecoverable, the controller can be configured to disable the supplemental battery from charging and discharging and provide a notification to a user. Upon a determination that the supplemental battery is partially recoverable, the controller can be configured to resume charging and discharging of the supplemental battery at a reduced performance level. Upon a determination that the supplemental battery is fully recoverable, the controller can be configured to resume normal charging and discharging of the supplemental battery.

Various embodiments disclosed herein can relate to a charging device for charging a mobile electronic device. The charging device can include a supplemental battery, an input interface configured to receive electrical power from an external power source, an output interface configured to output electrical power to the mobile electronic device, and a controller. The charging device can include a charging electrical pathway from the input interface to the supplemental battery. The controller can be configured to direct electricity from the input interface, along the charging electrical pathway, to the supplemental battery to charge the supplemental battery. The charging device can include a discharge electrical pathway from the supplemental battery to the output interface. The controller can be configured to direct electricity from the supplemental battery, along the discharge electrical pathway, to the output interface to charge the mobile electronic device. The charging device can include a bypass electrical pathway from the input interface to the output interface. The controller can be configured to direct electricity from the input interface, along the bypass electrical pathway, to the output interface to charge the mobile electronic device. The charging device can include a first voltage modifier on the charging electrical pathway between the input interface and the supplemental battery. The first voltage modifier can be configured to reduce voltage that is supplied to the supplemental battery from the input interface. The charging device can include a second voltage modifier on the discharge electrical pathway between the supplemental battery and the output interface, and the second voltage modifier can be configured to increase voltage supplied from the supplemental battery to the output interface. The second voltage modifier can be on the bypass electrical pathway between the input interface and the output interface, and the second voltage modifier can be configured to increase voltage supplied from the input interface to the output interface.

The first voltage modifier can include a buck converter. The second voltage modifier can include a boost converter. The controller can be configured to actuate one or more switches to direct electricity along the charging electrical pathway, the discharge electrical pathway, and/or the bypass electrical pathway. The bypass electrical pathway can include a bypass switch between the input interface and the output interface. The charging electrical pathway can include a charging switch between the input interface and the supplemental battery.

The charging device can include a protective case configured to at least partially enclose the mobile electronic device. The protective case can include a back portion configured to be positioned along a back side of the mobile electronic device, a right side portion configured to be positioned along a right side of the mobile electronic device, a left side portion configured to be positioned along a left side of the mobile electronic device, a top portion configured to be positioned along a top of the mobile electronic device, a bottom portion configured to be positioned along a bottom of the mobile electronic device, and/or a front opening configured such that a display of the mobile electronic device is visible through the front opening.

The charging device can include a computer-readable memory element that includes power capacity information for the external power supply. The controller can be configured to determine a first current for the bypass electrical pathway and a second current for the charging electrical pathway based at least in part on the power capacity information. The controller can be configured to direct supplemental electrical current from the supplemental battery along the discharge electrical pathway when the electrical current provided from the external power supply along the bypass electrical pathway is below a charging current value of the mobile electronic device. The controller can include at least one hardware processor and computer-executable instructions stored on at least one memory element.

Various embodiments disclosed herein can relate to a charging device that can include a supplemental battery, an input interface, and output interface, a bypass electrical pathway from the input interface and the output interface without going through the supplemental battery, and a voltage modifier on the bypass electrical pathway configured to modify the voltage supplied from the input interface, along the bypass electrical pathway, to the output interface.

The charging device can include a discharge electrical pathway from the supplemental battery to the output interface, and the discharge electrical pathway can go through the voltage modifier such that the voltage modifier is configured to modify voltage supplied from the supplemental battery to the output interface. The voltage modifier can be configured to boost the voltage. The voltage modifier can be a boost converter.

The charging device can include a protective case configured to at least partially enclose the mobile electronic device. The protective case can include a back portion configured to be positioned along a back side of the mobile electronic device, a right side portion configured to be positioned along a right side of the mobile electronic device, a left side portion configured to be positioned along a left side of the mobile electronic device, a top portion configured to be positioned along a top of the mobile electronic device, a bottom portion configured to be positioned along a bottom of the mobile electronic device, and/or a front opening configured such that a display of the mobile electronic device is visible through the front opening. The output interface can include an electrical connector extending upward from the bottom portion and configured to engage an electrical port on the mobile electronic device.

Various embodiments disclosed herein can relate to a method for determining power output capacity of a power supply. The method can include charging a battery with a first amount of current from the power supply, measuring a first voltage provided by the power supply when charging the battery with the first amount of current, determining that the first voltage is above a threshold voltage value, charging the battery with a second amount of current from the power supply, wherein the second amount of current is higher than the first amount of current, measuring a second voltage provided by the power supply when charging the battery with the second amount of current, determining that the second voltage is above the threshold voltage value, attempting to charge the battery with a third amount of current from the power supply, wherein the third amount of current is higher than the second amount of current, measuring a third voltage provided by the power supply when attempting to charge the battery with the third amount of current, determining that the third voltage is below the threshold voltage value, and determining the power output capacity of the power supply based at least in part on the value of the second amount of current.

The power output capacity can be determined based at least in part on the value of the voltage threshold. The method can include charging the battery with one or more additional current amounts that are between the second amount of current and the third amount of current, measuring one or more additional voltages provided by the power supply when charging the battery at the one or more additional current amounts; and determining that the one or more additional voltages are above the threshold voltage value.

Various embodiments disclosed herein can relate to a method of determining an electrical power output capacity of a power supply. The method can include requesting electrical output from the power supply at a plurality of different values of electrical current, receiving electrical output from the power supply at the plurality of different values of electrical current, determining whether voltage associated with each of the plurality of different values of electrical current is above or below a threshold voltage value, determining the electrical output power capacity of the power supply based at least in part on the determinations of whether the voltage associated with each of the plurality of different values of electrical current is above or below the threshold voltage value.

Various embodiments disclosed herein can relate to a charging device for charging a mobile electronic device. The charging device can include a supplemental battery, an input interface configured to receive electrical power from an external power source, an output interface configured to output electrical power to the mobile electronic device, and a controller. A charging electrical pathway can extend from the input interface to the supplemental battery, and the controller can be configured to direct electricity from the input interface, along the charging electrical pathway, to the supplemental battery to charge the supplemental battery. A discharge electrical pathway can extend from the supplemental battery to the output interface, and the controller can be configured to direct electricity from the supplemental battery, along the discharge electrical pathway, to the output interface to charge the mobile electronic device. A bypass electrical pathway can extend from the input interface to the output interface, and the controller can be configured to direct electricity from the input interface, along the bypass electrical pathway, to the output interface to charge the mobile electronic device. The controller can be configured to direct a first amount of current from the input interface, along the charging electrical pathway, to the supplemental battery, determine whether a first voltage associated with the first amount of current is above a threshold voltage value, direct a second amount of current from the input interface, along the charging electrical pathway, to the supplemental battery, determine whether a second voltage associated with the second amount of current is above the threshold voltage value, and determine a power output capacity of an external power supply coupled to the input interface based at least in part on the determinations of whether the first and second voltages were above the threshold voltage value.

The controller can be configured to use the determined power output capacity to determine amounts of electrical current to direct along one or more of the bypass electrical pathway, the charging electrical pathway, and the discharge electrical pathway.

The charging device can include a protective case configured to at least partially enclose the mobile electronic device. The protective case can include a back portion configured to be positioned along a back side of the mobile electronic device, a right side portion configured to be positioned along a right side of the mobile electronic device, a left side portion configured to be positioned along a left side of the mobile electronic device, a top portion configured to be positioned along a top of the mobile electronic device, a bottom portion configured to be positioned along a bottom of the mobile electronic device, and/or a front opening configured such that a display of the mobile electronic device is visible through the front opening.

Various embodiment disclosed herein can relate to an electronic device that includes an input interface configured to receive electrical power from an external power source, and a controller configured to empirically determine an electrical power capacity of the external power source.

The electronic device can include a battery. The controller can be configured to empirically determine the electrical power capacity of the external power source by incrementally increasing the amount of electrical current drawn from the external power source to charge the battery while monitoring the input voltage from the external power source. The electronic device can include a memory element, and the controller can be configured to store the determined electrical power capacity in the memory element. The controller can be configured to use the determined electrical power capacity to determine amounts of electrical current to direct along one or more of a bypass electrical pathway, a charging electrical pathway, and a discharge electrical pathway.

Various embodiments disclosed herein can relate to a charging device for charging a mobile electronic device. The charging device can include a supplemental battery, an input interface configured to receive electrical power from an external power source, an output interface configured to output electrical power to the mobile electronic device, and a controller. A charging electrical pathway can extend from the input interface to the supplemental battery, and the controller can be configured to direct electricity from the input interface, along the charging electrical pathway, to the supplemental battery to charge the supplemental battery. A discharge electrical pathway can extend from the supplemental battery to the output interface, wherein the controller is configured to direct electricity from the supplemental battery, along the discharge electrical pathway, to the output interface to charge the mobile electronic device. A bypass electrical pathway can extend from the input interface to the output interface, and the controller can be configured to direct electricity from the input interface, along the bypass electrical pathway, to the output interface to charge the mobile electronic device. The charging device can include a temperature sensor. The controller can be configured to receive temperature information measured by the temperature sensor, determine whether the measured temperature is above a threshold temperature value, and reduce or disable electrical current on one or more of the charging electrical pathway, the discharge electrical pathway, and the bypass electrical pathway when the measured temperature is above the threshold temperature value.

The temperature sensor can be configured to measure a temperature of the inside of the charging device, a temperature outside of the charging device, and/or a temperature associated with the supplemental battery.

Various embodiments disclosed herein can relate to a charging device that includes a supplemental battery, an input interface configured to receive electrical power from an external power source, an output interface configured to output electrical power, a temperature sensor, and a controller that can be configured to reduce or disable electrical current in response to temperature information from the temperature sensor.

Various embodiments disclosed herein can relate to a charging device for charging a mobile electronic device. The charging device can include a supplemental battery, an input interface configured to receive electrical power from an external power source, an output interface configured to output electrical power to the mobile electronic device, and a controller. A charging electrical pathway can extend from the input interface to the supplemental battery, and the controller can be configured to direct electricity from the input interface, along the charging electrical pathway, to the supplemental battery to charge the supplemental battery. A discharge electrical pathway can extend from the supplemental battery to the output interface, and the controller can be configured to direct electricity from the supplemental battery, along the discharge electrical pathway, to the output interface to charge the mobile electronic device. A bypass electrical pathway can extend from the input interface to the output interface, and the controller can be configured to direct electricity from the input interface, along the bypass electrical pathway, to the output interface to charge the mobile electronic device. The charging device can include a computer-readable memory element. The controller can be configured to store battery health information in the memory element, disable or reduce electrical current along one or more of the charging electrical pathway, the discharge electrical pathway, and the bypass electrical pathway based at least in part on the battery health information.

The battery health information can include temperature information received from a temperature sensor of the charging device. The battery health information can include charge cycle information.

Various embodiment disclosed herein can relate to a charging device that includes a supplemental battery, an input interface configured to receive electrical power from an external power source, an output interface configured to output electrical power, a memory element that can include battery health information, and a controller that can be configured to disable the charging device based at least in part on the battery health information.

The battery health information can include temperature information received from a temperature sensor of the charging device. The battery health information can include charge cycle information.

Various embodiments disclosed herein can relate to a method for determining a power output capacity of a power supply. The method can include drawing a first amount of current from the power supply, receiving a first voltage provided by the power supply when drawing the first amount of current, drawing a second amount of current from the power supply, wherein the second amount of current is greater than the first amount of current by a current difference, receiving a second voltage provided by the power supply when drawing the second amount of current, the second voltage being different from the first voltage by a voltage difference, determining that the voltage difference per the current difference exceeds a threshold change rate, and determining the power output capacity of the power supply based at least in part on the determination that the threshold change rate is exceeded.

The method can include drawing a percentage of the power output capacity of the power supply, and charging a first battery of a mobile electronic device while drawing the drawing the percentage of the power output capacity of the power supply. The method can include drawing a third amount of current from the power supply, receiving a third voltage provided by the power supply while drawing the third amount of current, and determining that the third voltage is below a voltage threshold; wherein determining the power output capacity comprises determining a current output capacity that is between the first current amount and the third current amount. Charging the first battery includes routing the percentage of the power output capacity of the power supply through a charging device to the first battery. The charging device can include a supplemental battery. Charging the first battery can include charging the first battery at a charging capacity of the first battery. The method can include charging a supplemental battery of a charging device with at least a portion of the power output capacity.

The method can include drawing additional currents from the power supply. The additional currents can be between the first amount of current and the second amount of current. The method can include receiving additional voltages when drawing the additional currents, and determining whether or not the threshold change rate was exceeded when receiving the additional voltages when drawing the additional currents.

The method can include drawing a third amount of current from the power supply, wherein the third amount of current is greater than the first amount of current by a second current difference, and the third amount of current can be different (e.g., less) than the second amount of current, receiving a third voltage provided by the power supply when drawing the third amount of current, the third voltage being different from the first voltage by a second voltage difference, determining that the second voltage difference per the second current difference is within the threshold change rate.

Various embodiments can relate to a method for determining a power output capacity of a power supply. The method can include charging a battery with a first amount of current from the power supply, measuring a first voltage provided by the power supply when charging the first battery with the first amount of current, charging the battery with a second amount of current from the power supply, wherein the second amount of current is higher than the first amount of current by a first current difference, measuring a second voltage provided by the power supply when charging the first battery with the second amount of current, wherein the second voltage is different from the first voltage by a first voltage difference, determining that the first voltage difference per first current difference is within a threshold change value, attempting to charge the battery with a third amount of current from the power supply, wherein the third amount of current is higher than the second amount of current by a second current difference, measuring a third voltage provided by the power supply when attempting to charge the first battery with the third amount of current, wherein the third voltage is different from the second voltage by a second voltage difference, determining that the second voltage difference per second current difference exceeds the threshold change value, and determining the power output capacity of the power supply based at least in part on the value of the second amount of current.

Various embodiments disclosed herein can relate to a charging device for charging a mobile electronic device. The charging device can include a supplemental battery, an input interface configured to receive electrical power from an external power source, the input interface supporting a plurality of input connection types; an output interface configured to output electrical power to the mobile electronic device, the output interface supporting a plurality of output connection types, and a controller. The controller can be configured to negotiate, when coupled to the external power source, a selected input connection type, the selected input connection type having a highest input power capacity compatible with the external power source, negotiate, when coupled to the mobile electronic device, a selected output connection type, the selected output connection type having a highest output power capacity compatible with the mobile electronic device, enable a bypass electrical pathway from the input interface to the output interface when the selected input connection type and the selected output connection type are the same, enable a charging pathway to charge both the mobile electronic device and the supplemental battery when the highest input power capacity exceeds the highest output power capacity, and enable a supplemental charging pathway to charge the mobile electronic device when the input power capacity is less than the highest output power capacity.

The controller can be configured to establish the selected input connection type having the highest input power capacity compatible with the external power source by negotiating with the external power source to maximize power draw.

Various embodiments disclosed herein can relate to a charging device for charging a mobile electronic device. The charging device can include a supplemental battery, an input interface configured to receive electrical power from an external power source, an output interface configured to output electrical power to the mobile electronic device, a host detector configured to detect coupling of a universal serial bus (USB) host, an electronic device detector configured to detect coupling of the mobile electronic device, and a controller. The controller can be configured to identify, through the input interface, the charging device as a charging downstream port when the host detector detects the coupled USB host and the electronic device detector detects no electronic device. The controller can be configured to charge the supplemental battery from the external power source when the host detector detects the coupled USB host and the electronic device detector detects no electronic device. The controller can be configured to identify, through the output interface, the charging device as a dedicated charger when the host detector detects no host and the electronic device detector detects the coupled mobile electronic device. The controller can be configured to charge the mobile electronic device from the supplemental battery when the host detector detects no host and the electronic device detector detects the coupled mobile electronic device. The controller can be configured to enable a bypass electrical pathway from the input interface to the output interface when the host detector detects the coupled USB host and the electronic device detector detects the coupled mobile electronic device.

The controller can be configured to, after receiving no data for at least a timeout period, change the identification of the device, through the input interface, to identify as a dedicated charger.

Various embodiments disclosed herein can relate to a charging device for charging a mobile electronic device. The charging device can include a battery health monitor configured to report battery health information. The battery health monitor can include a fuel gauge configured to perform coulomb counting, memory configured to store charging history data, and an event detector configured to detect a risk event. The charging device can include a microcontroller unit and a supplemental battery monitored by the battery health monitor. The microcontroller unit can be configured to adjust the performance of the supplemental battery based at least in part on the battery health information.

The microcontroller unit can be configured to adjust the performance of the supplemental battery by determining, based at least in part on the coulomb counting, a reduced power capacity for the supplemental battery, and reducing a power capacity to which the supplemental battery is charged. The microcontroller unit can be configured to adjust the performance of the supplemental battery by determining, based at least in part on the history data, an increased supplemental battery voltage limit and a decreased supplemental battery current limit, and charging and discharging the supplemental battery using a voltage amount at or exceeding the increased supplemental battery voltage limit and using a current amount at or less than the decreased supplemental battery current limit.

The risk event detector can include at least one of a temperature detector, a drop detector, an impact detector, a bending detector, a short circuit detector, and a water detector.

Adjusting the performance of the supplemental battery can include, upon the detection of a major risk event, notifying a user and permanently disabling the supplemental battery from charging and discharging. Adjusting the performance of the supplemental battery can include, upon the detection of a minor risk event, performing diagnostic tests on the battery, notifying the user, at least one of temporarily disabling the supplemental battery from charging and discharging, and temporarily adjusting a performance of the supplemental battery, and depending on results of the diagnostic tests, at least one of resuming normal performance of the supplemental battery, permanently adjusting the performance of the supplemental battery, and permanently disabling the supplemental battery.

Adjusting the performance of the supplemental battery can include at least one of changing a supplemental battery capacity limit, changing a supplemental battery charging voltage limit, changing a supplemental battery discharging voltage limit, changing a supplemental battery charging current limit, and changing a supplemental battery discharging current limit.

Various embodiments disclosed here can relate to a method for managing battery health of a supplemental battery by tracking a health score. The method can include adjusting the health score by a first amount upon at least one of charging and discharging a first capacity range of the supplemental battery, adjusting the health score by a second amount upon at least one of charging and discharging a second capacity range of the supplemental battery, and adjusting the performance of the supplemental battery based at least in part on the health score and a threshold value.

Various embodiments disclosed herein can relate to a method for protecting a charging device for a mobile electronic device against risk events. The method can include detecting a major risk event, disabling charging to a supplemental battery, disabling charging from the supplemental battery, and notifying a user of the major risk event.

Various embodiments disclosed herein can relate to a method for protecting a charging device for a mobile electronic device against risk events. The method can include detecting a minor risk event, at least one of temporarily disabling charging and discharging to a supplemental battery and temporarily adjusting a performance of the supplemental battery. The method can include diagnosing the health of the supplemental battery. Upon determining that the health of the supplemental battery is unrecoverable, the method can include disabling charging to a supplemental battery, disabling charging from the supplemental battery, and notifying a user of the risk event. Upon determining that the health of the supplemental battery is partially recoverable, the method can include permanently adjusting the performance of the supplemental battery. Upon determining that the health of the supplemental battery is fully recoverable, the method can include resuming normal charging and discharging performance of the battery.

The method can include waiting for the minor risk event condition to clear, and subsequent to determining that the health of the supplemental battery is fully recoverable increasing the performance of the battery to less than normal performance, and performing additional diagnostic battery health monitoring.

Various embodiments disclosed herein can relate to a method for managing a charging device for a mobile electronic device. The method can include charging the mobile electronic device with a first voltage and a first current from a supplemental battery of the charging device, storing a charging profile history based at least in part on the charging of the mobile electronic device, determining, based at least in part on a charging profile history, a new voltage and new current, charging the mobile electronic device with electric power characterized by the new voltage and the new current from the supplemental battery of the charging device.

The charging profile history can include at least one of a duration of the charging of the mobile electronic device with the first voltage and first current, a capacity of the mobile electronic device with the first voltage and first current, a time of day of the charging of the mobile electronic device with the first voltage and first current, a day of week of the charging of the mobile electronic device with the first voltage and first current, and a power capacity of supplemental battery when charging the mobile electronic device.

The charging profile history can include the duration of the charging of the mobile electronic device with the first voltage and first current. The duration can exceed a threshold efficient time value. The new voltage can be higher than the first voltage, and the new current can be less than the first current.

The charging profile history can include the duration of the charging of the mobile electronic device with the first voltage and first current. The duration can be less than a threshold speed time value. The new voltage can be lower than the first voltage, and the new current can be higher than the first current.

Various embodiments disclosed herein can relate to an Application Specific Integrated Circuit (ASIC) for charging a charging a mobile electronic device and a supplemental battery. The ASIC can include a battery management unit comprising a voltage regulator, a reconfigurable protection circuit module (PCM) configured to protect the supplemental battery at one or more protection limits, a microcontroller unit (MCU) comprising a processor and memory, where the microcontroller can be configured to reconfigure one or more protection limits, a low drop out (LDO) regulator module configured to output a regulated voltage, a battery health module configured to monitor a health status of the supplemental battery, and/or a universal serial bus (USB) switch module configured to identify the charging device to the mobile electronic device. The ASIC can be configured to charge the mobile electronic device with power from at least one of the supplemental battery and an external power supply.

The voltage regulator can include a boost converter. The battery management unit can include a buck converter and a bypass electrical pathway. The PCM can be configured to protect the supplemental battery against an overvoltage limit and an overcurrent limit. The USB switch can include a USB bypass pathway configured to couple a USB input interface port to a USB output interface port.

The voltage regulator can include a buck converter. The battery management unit can include a boost converter. The supplemental battery can be configured to charge at a supplemental charging voltage level. The ASIC can be configured to receive electrical power from the external power source, the received electrical power characterized by an input voltage level and input current level, and charge the mobile electronic device at a device charging voltage. The battery management unit can be configured to boost the received electrical power from the input voltage level to a higher voltage level. The higher voltage level can be a higher one of the supplemental charging voltage level and the device charging voltage level. The battery management unit can be configured to buck an electrical power supply from the higher voltage level to a lower voltage level. The lower voltage level can be a lower one of the supplemental charging voltage level and the device charging voltage level.

The reconfigurable PCM can be configured to protect the supplemental battery at the one or more protection limits comprising an overvoltage limit and an overcurrent limit. The MCU can include an overvoltage register coupled through a first digital to analog converter (DAC) to overvoltage protection circuitry in the PCM. The MCU can include an overcurrent register coupled through a second DAC to overcurrent protection circuitry in the PCM. The battery health module can be configured to, upon detecting a battery health problem, cause the MCU to change adjust a first value stored in the overvoltage register and to change a second value stored in the overcurrent register.

The USB switch module can be configured to register as a downstream charging device to a USB host and change to a dedicated charging port after receiving no data from the USB host for at least a threshold period of time, register as a dedicated charger to the mobile electronic device, and couple a USB host to the mobile electronic device via a USB bypass pathway to the USB host.

Various embodiments disclosed herein can relate to a charging device for determining a power output capacity of a power supply. The charging device can include a power input interface configured to draw a first amount of current from the power supply through the power input interface, receive a first voltage provided by the power supply when drawing the first amount of current, draw a second amount of current from the power supply, wherein the second amount of current is greater than the first amount of current by a current difference, and receive a second voltage provided by the power supply when drawing the second amount of current, the second voltage being different from the first voltage by a voltage difference. The charging device can include a comparator configured to determine that the voltage difference per the current difference exceeds a threshold change rate. The charging device can include a processor configured to determine the power output capacity of the power supply based at least in part on the determination that the threshold change rate is exceeded. The charging device can include a supplemental battery configured to receive power from the power supply.

Various embodiments disclosed herein can relate to a reconfigurable system for protecting a supplemental battery. The system can include a register, a processor configured to write a value to the register, an analog to digital converter configured to convert the value in the register to an analog voltage on an analog line, and an operational amplifier having a first input coupled to the supplemental battery and having a second input coupled to the analog line. The operational amplifier can be configured to output on an detection line one of an overvoltage detection signal, an undervoltage detection signal, an overcurrent detection signal, and an undercurrent detection signal, based at least in part on a voltage on the analog line and a voltage at the first input.

BRIEF DESCRIPTION OF THE DRAWINGS

FIG. 2 is a perspective view of an example embodiment charging device protective case with a mobile electronic device coupled thereto.

FIG. 3 is a perspective view of the charging device protective case in an open configuration.

Figure 1:
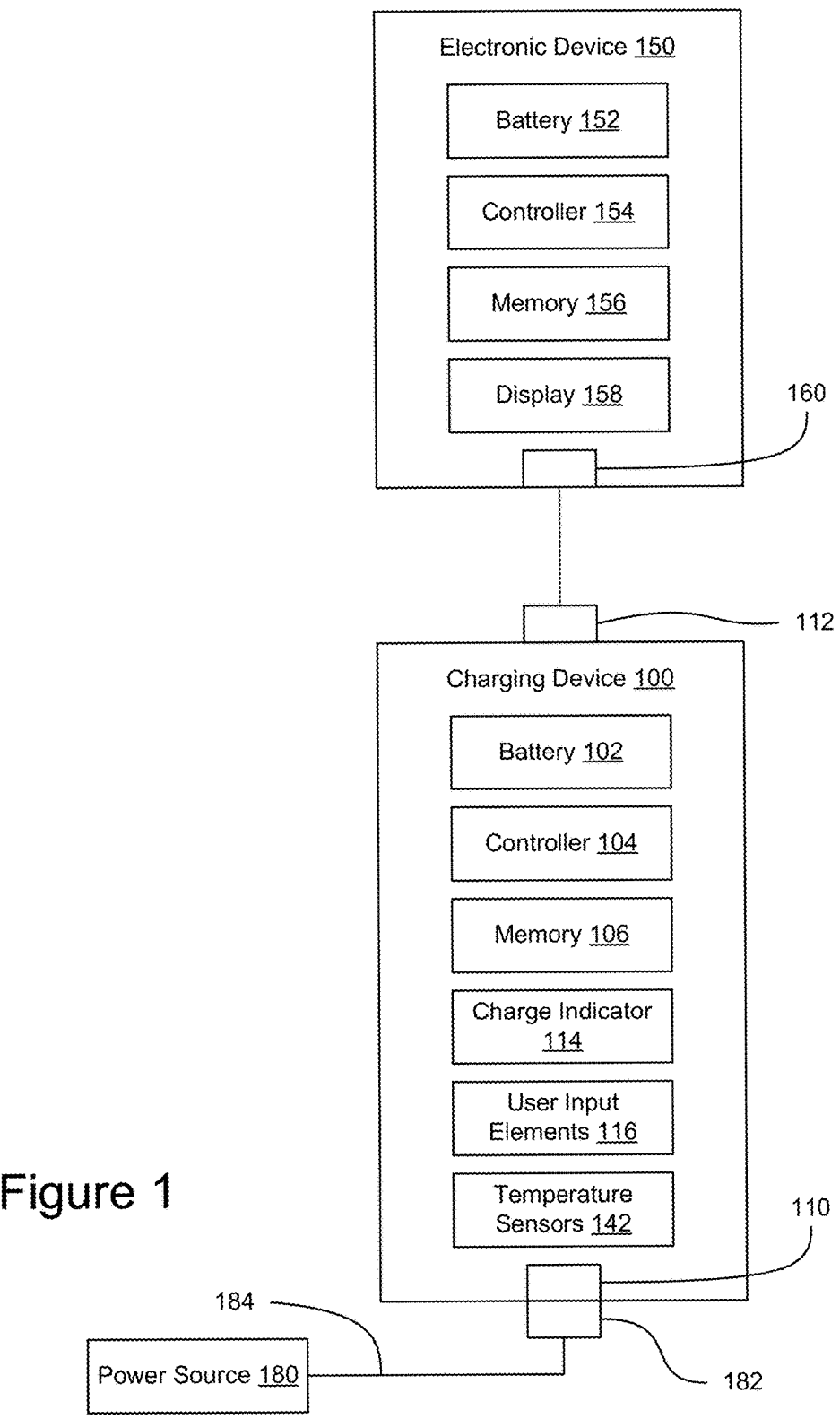
FIG. 1 is a schematic view of an example embodiment of a charging device coupled to an external power source and configured to couple to a mobile electronic device.

The illustrated embodiments are disclosed by way of example, and are not intended to be limiting.

DETAILED DESCRIPTION OF CERTAIN EMBODIMENTS

Many mobile electronic devices, such as mobile phones, tablet computers, smart watches, or smart glasses, have an internal power storage unit, which can be a rechargeable battery. The rechargeable battery of the mobile electronic can be charged through an external power source (e.g., an electrical power outlet). In some instances, an external charging device can have a supplemental battery and can be used to output power to recharge the battery of the mobile electronic device. The external charging device can have an input interface configured to receive electrical power from an external power source (e.g., an electrical power outlet) for charging the supplemental battery of the charging device and/or for passing the electrical power to the mobile electronic device to recharge the battery of the mobile electronic device. In some circumstances, the electrical power relayed from the input interface through the charging device to the mobile electronic device can be outside the voltage range that is accepted by the mobile electronic device. For example, the electrical power that is passed through the charging device can have a voltage that is below a minimum voltage level that is accepted by the mobile electronic device for various reasons, such as the use of an improper external power supply (e.g., wrong wall charger unit), a malfunction of the external power supply, voltage drop along a cable extending between the external power supply and the charging device (e.g., if an unusually long cable were used), voltage drop along interfaces or other components of the charging device, etc. Accordingly, in some circumstances electrical power that is merely passed through the charging device might be rejected by the mobile electronic device.

In some embodiments, the charging device can include a voltage modifier (e.g., a boost converter, a buck converter, or voltage regulator) to change the voltage being passed through the charging device such that the voltage that is output to the mobile electronic device is within the acceptable voltage range for the mobile electronic device. The charging device can have a charging electrical pathway from the input interface to the supplemental battery (e.g., for recharging the supplemental battery). The charging device can have a discharge electrical pathway from the supplemental battery 102 to an output interface (e.g., for using the supplemental battery 102 to recharge the battery of the mobile electronic device). The charging device can have a bypass electrical pathway from the input interface to the output interface (e.g., for relaying electricity from an external power source such as a wall charger, through the charging device, and to the mobile electronic device, such as to charge the battery of the mobile electronic device). In some embodiments, the bypass electrical pathway does not include the supplemental battery. In some embodiments, the bypass electrical pathway can include a voltage modifier, as discussed herein, such that the voltage output by the charging device is accepted by the mobile electronic device (e.g., above a minimum voltage threshold or within an acceptable voltage range). In some implementations, the same voltage modifier can be used by the bypass electrical pathway and the discharge electrical pathway.

In various circumstances it can be advantageous for the charging device to interrogate an external power supply that is coupled to the input interface to determine features of the electrical output (e.g., output voltage, output current, and/or output power capacity) of the external power supply. In some embodiments, the charging device can be configured to charge the supplemental battery of the charging device and the battery of the mobile electronic device simultaneously. For example, when the charging device is coupled to an external power supply, the charging device can provide electricity to the mobile electronic device (e.g., via the bypass electrical pathway) and to the supplemental battery (e.g. via the charging electrical pathway). The charging device can provide the appropriate electrical power to the mobile electronic device (e.g., for charging the battery of the mobile electronic device), and the charging device can use some or all of the surplus electrical power to charge the supplemental battery of the charging device. An accurate assessment of the power capacity of the external power supply can enable the charging device to effectively utilize the external power supply, which can result in reduced energy waste and faster charging.

In some embodiments, the charging device can be configured to determine the electrical power capacity of the external power supply from one or more bias voltages output by the external power supply (e.g., from the D+ and/or D− lines).

In some embodiments, the charging device can be configured to determine the electrical power capacity of the external power supply empirically. The charging device can incrementally increase the amount of electrical power drawn from the external power supply while monitoring the input from the external power supply, and when the monitored input from the external power supply indicates that the external power supply has surpassed its maximum power capacity, the charging device can determine the maximum power capacity of the external power supply. By way of example, the charging device can draw a first amount of current from the external power supply to charge the supplemental battery, and the charging device can monitor the input voltage received from the external power supply. If the input voltage is in the acceptable range for the first amount of current, the charging device can increase the amount of current drawn from the external power supply to charge the supplemental battery up to a second level. If the input voltage is in the acceptable range for the second amount of current, the charging device can again increase the amount of current drawn from the external power supply to a third level, and so on, until the input voltage drops below the acceptable range. When the input voltage drops below the acceptable range, the charging device can determine that the maximum power capacity of the external power supply has been surpassed, and can determine the maximum power capacity of the external power supply based at least in part on the value of the highest amount of current that provided an input voltage within the acceptable range.

Many variations and alternatives are possible, some of which are discussed herein. For example, in some embodiments, instead of incrementally increasing the amount of current drawn from the external power supply, an algorithm can be used to draw different amounts of current (e.g. some lower than the maximum capacity and higher than the maximum capacity) in order to determine the capacity of the external power supply with better accuracy and/or in less time.

The empirical interrogation of the external power supply can be advantageous over the bias voltage approach, because the determinations made by the empirical interrogation are based on the actual capabilities of the individual power supply being used, not on a value assigned to the general type or class of power supply. For example, if a power supply were to malfunction or if a long cable were used that produces a significant drop in power, the bias voltage approach could mistakenly report a maximum power capacity that the external power supply cannot actually meet. Also, in some instances an individual power supply can actually be able to output more electrical power than the value indicated using the bias voltage approach (e.g., a manufacturer can assign a conservative power capacity to a power supply), such that using the empirical interrogation approach can reduce the amount of power that goes to waste and result in faster charging. Additionally, in some instances, the empirical interrogation can provide increased precision. For example, a limited number of power capacity values can be resolved using the bias voltage approach. Using the empirical interrogation approach, increased precision can be provided, for example, by decreasing the size of the incremental increases in current that is drawn from the external power supply.

In some embodiments, the charging device can use both the bias voltage approach and the empirical approach. In some embodiments, the results of the two approaches can be compared, and if the difference between the results of the two approaches is above a threshold value, the charging device can determine that an error occurred, issue a warning, disable the charging device, or take other action.

In some embodiments, the charging device can be configured to monitor temperature (e.g., an interior temperature and/or an exterior temperature). The charging device can include one or more temperature sensors (e.g., one or more sensors or thermistors) configured to measure the internal temperature inside the charging device at one or more locations. The charging device can include one or more temperature sensors (e.g., one or more thermistors) configured to measure an external temperature outside the charging device. The charging device can be configured to reduce the amount of electrical current (e.g., current used to charge the supplemental battery of the charging device, current from the supplemental battery 102 to the output interface, and/or current from the input interface to the output interface for passing electricity through the charging device to the mobile electronic device) as the temperature (e.g., internal and/or external temperature) rises. The charging device can use a formula, algorithm, and/or lookup table, etc. to determine how much to lower the current as the temperature rises.

In some embodiments, if the measured temperature (e.g., the internal and/or external temperature) is above an threshold temperature value, below a threshold temperature value, or outside a temperature range, the charging device can be configured to issue a warning, disable the supplemental battery, disable the charging device, and/or take other action. For example, if the charging device were exposed to a temperature that is extreme enough to damage the supplemental battery, the charging device can disable charging of and/or discharging from the supplemental battery.

FIG. 1 schematically shows an example embodiment of a charging device 100 that can be used to charge a mobile electronic device 150. The mobile electronic device 150 can be a mobile phone (e.g., a smart phone), a tablet computer, a smart watch, smart glasses, etc. In some embodiments, the mobile electronic device 150 can include a battery 152, which can be configured to power electrical components of the mobile electronic device 150. The battery 152 can be a rechargeable battery (e.g., a lithium ion battery, a lithium polymer battery, or other suitable battery type). The mobile electronic device 150 can include a controller 154, which can be configured to operate various other components of the mobile electronic device 150. The controller 154 can be implemented in one or more processors, one or more integrated circuits, etc. In some embodiments, the controller 154 can execute instructions stored in one or more memory elements 156, although in some implementations the controller 154 can be a self-contained integrated circuit with instructions effectively hard coded into the hardware circuitry. The mobile electronic device 150 can include additional features, such as one or more input and/or output elements (e.g., a touchscreen display 158), a speaker, a microphone, an antenna for wireless communication, etc.

The mobile electronic device 150 can include an input interface 160, which can be configured to receive electrical power from an outside source (e.g., from the charging device 100 and/or from the external power source 180). The input interface 160 can be a port (e.g., a micro-USB port or Lightning port) configured to receive an electrical connector (e.g., a micro-USB connector or Lightning connector) therein. The mobile electronic device 150 can be configured to use the electrical power received by the input interface 160 to operate electrical components of the mobile electronic device 150 and/or to charge the battery 152. The mobile electronic device 150 can include electrical interconnections to direct electricity between electrical components. In some embodiments, the input interface 160 can be configured to send data from or receive data to the mobile electronic device 150 (e.g., to sync the mobile electronic device). It should be understood that in some instances the input interface 160 can be used to output information and/or electrical power from the mobile electronic device 150.

The charging device 100 can include a supplemental battery 102, which can be configured to power electrical components of the charging device 100 and/or to output electrical power from the charging device 100 (e.g., via the output interface 112), such as for recharging the battery 152 of the mobile electronic device 150. The supplemental battery 102 can be a rechargeable battery (e.g., a lithium ion battery, a lithium polymer battery, or other suitable battery type). The charging device 100 can include a controller 104, which can be configured to operate various components of the charging device 100 (e.g., as described herein). The controller 104 can be implemented in one or more processors, one or more integrated circuits, etc. In some embodiments, the controller 104 can execute instructions stored in one or more memory elements 106 of the charging device 100, although in some implementations the controller 104 can be a self-contained integrated circuit with instructions effectively hard coded into the hardware circuitry. In some embodiments, certain components can be integrated into an application specific integrated circuit also known as an ASIC (not shown in FIG. 1). For example, the controller 104, memory 106, and temperature sensors 142 and other components can be part of the ASIC (not shown in FIG. 1). In other embodiments, these components can be discrete components.

The charging device 100 can include an input interface 110, which can be configured to receive electrical power from an outside source (e.g., from the external power source 180). The input interface 110 can be a port (e.g., a micro-USB port or Lightning port) configured to receive an electrical connector 182 (e.g., a micro-USB connector or Lightning connector) therein. The external power source 180 can be a wall charger unit, which can be configured to plug into an electrical power outlet. An electrical cable 184 can connect the external power source 180 to the electrical connector 182. Many variations are possible. For example, in some implementations, the charging device 100 can include an electrical cable with an electrical connector at the end thereof that is configured to plug into and receive power from an external power source 180. The charging device 100 can be configured to use the electrical power received by the input interface 110 to charge the supplemental battery 102 and/or to operate electrical components of the charging device 100. The charging device 100 can include electrical interconnections to direct electricity between electrical components.

The charging device 100 can include an output interface 112, which can be configured to output electrical power (e.g., to power the mobile electronic device 150 and/or to charge the battery 152). The output interface 112 can be an electrical connector (e.g., a micro-USB connector or Lighting connector) that can be configured to be received by the input interface 160 of the mobile electronic device 150. In some embodiments, an electrical cable (not shown in FIG. 1) can extend between the output interface 112 and the main body of the charging device 100. In some embodiments, the output interface 112 can be a port (e.g., a USB port), which can be configured to receive an electrical connector (e.g., a USB connector) of an interconnection element (not shown in FIG. 1) that can be configured to electrically couple the charging device 100 to the mobile electronic device 150.

In some embodiments, the input interface 110 can be configured to send data from or receive data to the charging device 100. In some embodiments, the input interface 110 and the output interface 112 can be configured to relay data to and/or from the mobile electronic device 150 (e.g., to sync the mobile electronic device 150 while it is coupled to the charging device 100). It should be understood that in some instances the input interface 110 can be used to output information and/or electrical power from the charging device 100, and in some instances the output interface 112 can be used to input information and/or electrical power to the charging device 100.

With reference to FIGS. 2 and 3, in some embodiments, the charging device 100 can be a protective case that is configured to enclose at least part of the mobile electronic device 150. For example, the protective case charging device 100 can be a Juice Pack product sold by mophie of Tustin, Calif. Additional details regarding the protective case charging device 100 are disclosed in U.S. patent application Ser. No. 13/492,785, filed Jun. 8, 2012, and published as U.S. Patent Application Publication No. 2012/0303520 on Nov. 29, 2012, which is hereby incorporated by reference in its entirety, and U.S. patent application Ser. No. 14/020,710, filed Sep. 6, 2013, and published as U.S. Patent Application Publication No. 2014/0165379 on Jun. 19, 2014, which is hereby incorporated by reference in its entirety. The protective case charging device 100 can include two or more housing pieces that removably couple together to form the protective casing. FIG. 2 shows an example embodiment of a protective case charging device 100 in a closed configuration with a mobile electronic device 150 attached thereto. FIG. 3 shows an example embodiment of a protective case charging device 100 in an open configuration with the mobile electronic device 150 removed.

The protective case charging device 100 can include a lower portion 101 and an upper portion 103, which can removably couple together. The case can include a back portion 105 configured to extend across a back of the mobile electronic device 150, a right side portion 107 configured to extend along a right side of the mobile electronic device 150, a left side portion 109 configured to extend along a left side of the mobile electronic device 150, a top portion 111 configured to extend along a top of the mobile electronic device 150, and/or a bottom portion 113 configured to extend along a bottom of the mobile electronic device 150. The back portion 105, right side portion 107, left side portion 109, top portion 111, and/or bottom portion 113 can include openings to provide access to various feature of the mobile electronic device 150 (e.g., the camera, the flash, the headphone port, the volume buttons, the power button, the vibrate/sound switch, etc.). The protective case charging device 100 can have a front opening through which the display 158 of the mobile electronic device is visible.

The output interface 112 can extend upward from the bottom portion 113 and can be configured to enter the input interface 160 of the mobile electronic device 150 when the mobile electronic device 150 is attached to the protective case. In some embodiments, no electrical cable extends between the output interface 112 of the charging device 100 and the input interface 160 of the mobile electronic device 150. The input interface 110 can be positioned on an external portion of the protective case charging device 100, such that an electrical connector 182 can be coupled thereto while the mobile electronic device 150 is attached to the case. For example, the input interface 110 can be positioned on the bottom of the bottom portion 113, although other suitable locations can be used, such as on the back of the back portion 105, on the outside of the right side portion 107, or on the outside of the left side portion 109.

The supplemental battery 102 can be disposed in the back portion 105 of the protective case charging element 100, for example, such that the supplemental battery 102 is disposed directly behind the mobile electronic device 150. In some embodiments, the supplemental battery 102 can be disposed in the upper portion 103 (see FIGS. 2 and 3). The lower portion 101 and the upper portion 103 can include electrical connectors that are configured to couple when the lower portion 101 engages the upper portion 103 so the electrical charge can be transferred between the lower portion 101 (e.g., having the input interface 110 and/or the output interface 112) and the upper portion 103 (e.g., having the supplemental battery 102).

Many other configurations are possible. For example, the supplemental battery 102 can be disposed in the lower portion 101, and the seam between the lower portion 101 and the upper portion 103 can be located closer to the top of the protective case. The supplemental battery 102 can be positioned in the same portion of the case (e.g., the lower portion 101 or the upper portion 103) as the input interface 110 and/or the output interface 112. In some embodiments, the protective case charging device 100 can include a back portion and a front portion (e.g., instead of the lower portion 101 and the upper portion 103) that removably couple together to form the casing. For example, the back portion can include the supplemental battery 102, the input interface 100, and the output interface 112, and the front portion can provide walls that extend around the full periphery of the display 158. For example, the front portion can have a top wall, a right side wall, a left side wall, and a bottom wall. In some embodiments, the protective case charging device 100 can be a single-piece casing. For example, the mobile electronic device 150 can fit into the casing (e.g. snap into the casing) without the casing needing to come apart. In some embodiments, the casing can comprise at least some portions formed of a flexible material such that the casing can flex to allow the mobile electronic device 150 to enter and/or exit the casing. In some embodiments, the casing can be made of rigid materials, such as hard plastic. In some embodiments, the casing can have an open portion (e.g., an open top portion) so that the mobile electronic device 150 can slide into the casing.

Figure 4:
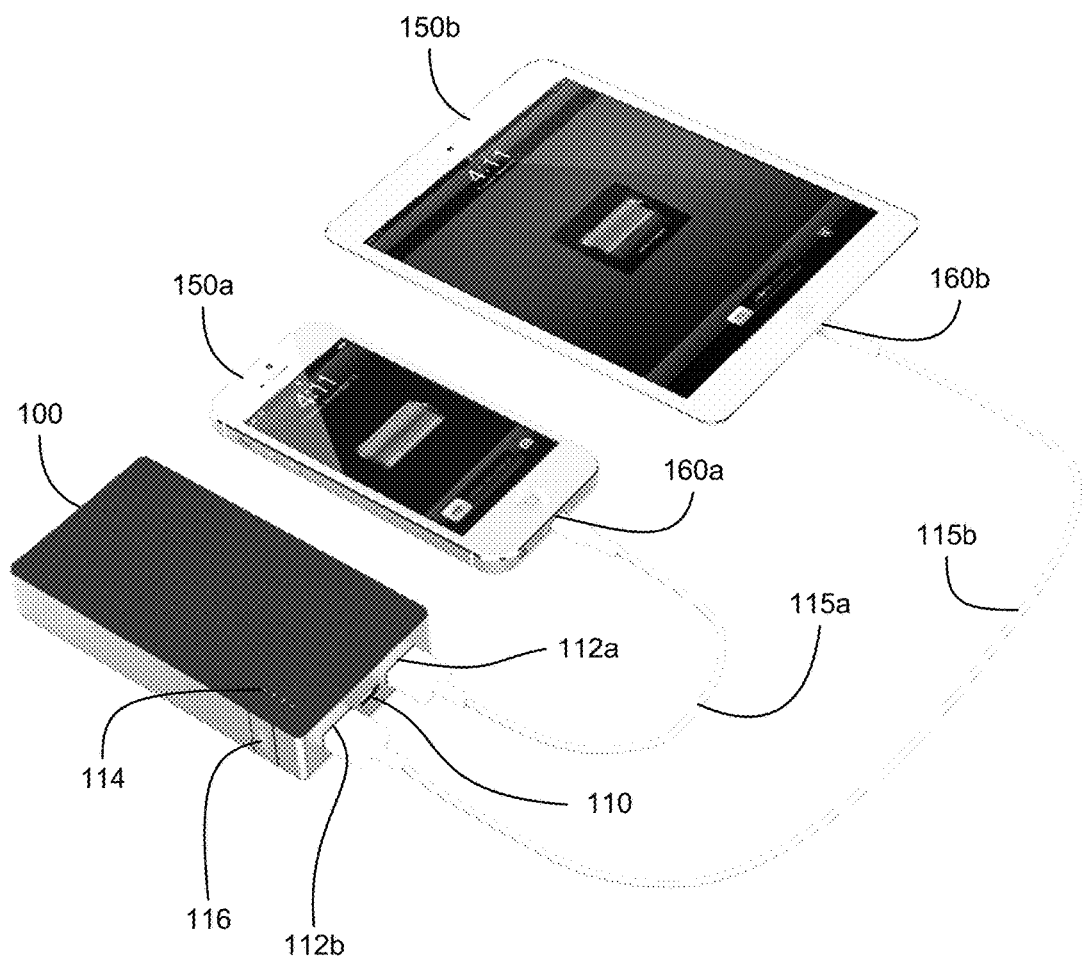
FIG. 4 is a perspective view of an example embodiment of a charging device coupled via electrical cables to two mobile electronic devices.

The charging device 100 can be a portable device, which can be configured to be carried by a user (e.g., attached to the mobile electronic device (see FIGS. 2-3) or in a pocket or backpack). With reference to FIG. 4, in some embodiments, the charging device 100 can be can separate mobile device that is distinct from the mobile electronic device 150 (e.g., not designed to contact the mobile electronic device except for the electrical connection between the output interface 112 of the charging device 100 and the input interface 160 of the mobile electronic device 150. In FIG. 4, the charging device can be a powerstation product sold by mophie of Tustin, Calif.

In some embodiments, the charging device 100 can include multiple output interfaces and can be configured to charge two mobile electronic devices simultaneously. In FIG. 4, the charging device includes two output interfaces 112a and 112b for charging two mobile electronic devices 150a and 150b simultaneously. Interconnection elements 115a and 115b can be used to couple the output interfaces 112a and 112b of the charging device 100 to the input interfaces 160a and 160b of the mobile electronic devices 150a and 150b.

The charging device 100 can include one or more user output elements configured to output information to a user. The charging device 100 can include a battery charge indicator 114, which can output and indication of the level of charge that the supplemental battery 102 has. As can be seen in FIG. 4, the battery charge indicator can include a plurality of lights (e.g., light emitting diodes (LEDs)), which can illuminate to provide battery charge level information to the user. For example, in some embodiments four light sources can be used, and one illuminated light can indicate that the supplemental battery 102 is about 25% charged, two illuminated lights can indicate that the supplemental battery 102 is about 50% charged, three illuminated lights can indicate that the supplemental battery 102 is about 75% charged, and four illuminated lights can indicate that the supplemental battery 102 is about 100% charged. Many variations are possible. More light sources can be used to provide additional precision. In some embodiments, different colors can be used to indicate different charge levels, or a display screen can display an indication of the charge level (e.g., as a number such as 60% or as a progress bar).

The charging device 100 can include one or more user input elements 116. In some implementations, the one or more user input elements 116 and output elements (such as the battery charge indicator 116) can be implemented into a single component (e.g., a touchscreen display). In some embodiments, the user input elements 116 can include one or more button, switches, etc., as discussed herein. A user input element 116 (e.g., a button or other suitable type of user input element) can be used to activate the battery charge indicator 114. For example, a user can push a button to illuminate the light sources of the battery charge indicator 114. In some embodiments, the charging device 100 can include a user input element 116 for controlling the charging performed by the charging device 100. For example, a user can toggle a switch (not shown) to an active position to cause the charging device 100 to output electrical power (e.g., to the mobile electronic device) via the output interface 112. The user can toggle the switch to an inactive position to stop charging. This feature can be particularly advantageous for charging devices that are designed to remain attached to the mobile electronic device when not charging (see, for example, FIGS. 2 and 3). Many variations are possible. The charging can be started and stopped by using one or more buttons instead of a switch. The user input elements 116 (e.g., a switch or button) can be used to control the charging of the supplemental battery 102.

The controller 104 of the charging device 100 can be configured to control various functions of the charging device 100, as discussed herein, such as modifying the voltage of the power that is output by the charging device 100, interrogating the external power source 180 to determine the capacity of the external power source 180, allocating power from the external power supply to various tasks (e.g., to simultaneous pass-through charging of the mobile electronic device 150 and charging of the supplemental battery 102), temperature monitoring and associated adjustments, etc. The controller 104 can include one or more processors (e.g., one or more general purpose processors and/or one or more specific application processors) and/or other electrical components (e.g., sensors, switches, voltage modifiers, etc.) that operate to control aspects of the charging device 100.

In various embodiments, the charging device 100 can enable communication of data between the input interface 110 and the output interface 112. For example, a data communication line can extend between the input interface 110 and the output interface 112. Data can be passed through the charging device 100 (e.g., for syncing the mobile electronic device 150 with an external electronic device such as a computer). The charging device 100 can receive information from the mobile electronic device 150 via the interfaces 160 and 112. The charging device 100 can transfer the data to the input interface 110, where the data can be transmitted to an external electronic device (e.g., a computer). Similarly, the input interface 110 can receive data from an external electronic device (e.g., a computer), and the charging device 100 can transmit the data to the output interface 112 such that the data is communicated to the mobile electronic device 150 (e.g., via the input interface 160). Accordingly, the charging device 100 can enable the mobile electronic device 150 to send data to and/or receive data from an external electronic device that is coupled to the charging device 100 (e.g., via the input interface 110), and in many implementations without a direct data connection between the mobile electronic device 150 and the external electronic device.

In some cases, the information received from the mobile electronic device 150 can be transmitted to the controller 104, and the information can be used by the controller 104 to operate the charging device 100. For example, the mobile electronic device 150 can send information to the charging device 100 indicating that the mobile electronic device 150 is fully charged and in response to that information the controller 104 can stop sending electrical charge to the mobile electronic device 150. By way of another example, the mobile electronic device 150 can send information to the charging device 100 regarding the range of voltage accepted by the mobile electronic device 150, regarding the limits of electrical current for the mobile electronic device 150, regarding a device identifier that is configured to inform the charging device 100 of what type of device is coupled to the output interface 112. The controller 104 can use the information to deliver the appropriate electrical output to the mobile electronic device 150.

In some embodiments, the charging device 100 can deliver information received from an external electronic device (e.g., via the input interface 110) to the controller 104, and the controller 104 can use the information to control operation of the charging device 100. For example, the input interface 110 can receive information regarding the type of the external electronic device and/or the type of connection (e.g., USB 2.0, USB 3.0, etc.), and the controller 104 can control operation of the charging device 100 based at least in part on the information received. Many variations are possible. For example, in some embodiments, the charging device 100 can send and receive data from different interfaces than the interfaces used to send and receive electrical energy for charging batteries.

With reference to FIG. 1, the charging device 100 can be capable of interrogating the power source 180 to determine the maximum power output of the power source 180 by using the disclosed methods. Sometimes, the charging device 100 can have a variety of input connection types that support different types of electrical connectors 182. For example, the charging device might support USB 2.0, USB 3.0, lightning, micro-USB, mini-USB, and other connections of various power capacities. If the power source 180 is coupled to the charging device 100 through an interface that supports power negotiation, which can include determining the maximum power output as described herein, and which can also include using established protocols to agree on a certain capacity of power delivery, then in some instances the charging device can negotiate for the greatest amount of power.

The charging device 100 can sometimes be connected through output interface 112 to an electronic device 150. The electronic device might support a variety of connection types at the output interface 112. The electronic device can also support a variety of compatible connection types with the output interface 112.

Sometimes, the power source 180 and charging device 100 may support a connection type capable of transferring a large amount of current, such as 1 A, 1.5 A, 2.1 A, 2.4 A, 3.0 A, 5.0 A, or more. Sometimes, the charging device 100 can be coupled to a power source 180 capable of providing a high wattage of power, like 5 W, 10 W, 12 W, 18 W, 20 W, 30 W, 50 W, 100 W, or more. In some embodiments, the power source 180 can be configured to output multiple power levels depending on the amount of power requested. In some instances, the charging device 100 and/or the electronic device 150 can negotiate with the power source 180 to determine how much power will be output by the power source 180. In some implementations, the power source 180 can be configured to output an amount of current at different voltage levels (e.g., 5V, 9V, 12V, or 20V) to output different amounts of power. The charging device 100 can be configured to negotiate with the power source 180 to request the appropriate amount of power from the power source 180 for use by the charging device 100. In some embodiments, the charging device 100 can be coupled to an electronic device 150 that is capable of negotiating with the power source 180 to select the appropriate power level for the electronic device 150. If the charging device 100 does not require power, e.g., if the supplemental battery 102 of the charging device 100, is fully charged, the charging device 100 can be configured to merely relay the negotiation signals between the electronic device 150 and the power source 180. If the charging device 100 has its own power requirements, e.g., if the supplemental battery is not fully charged, the charging device 100 can negotiate with the electronic device 150 to determine the amount of power appropriate for the electronic device 150, and the charging device can negotiate with the power source 180 to request more power than what is appropriate for the electronic device 150. The charging device 100 can relay the appropriate power to the electronic device 150 and can use the additional electrical power itself (e.g., for charging the supplemental battery 102). If the electronic device 150 is not capable of negotiating for different power levels, the charging device 100 can still perform the negotiation with the power source 180 to request more power than needed by the electronic device 150, so that the charging device 100 can use the excess power (e.g., for charging the supplemental battery 102).

Sometimes, the electronic device 150 might not have a connection type that is capable of handling the full current or wattage provided by the power source 180.

For example, if the electronic device supports a USB 2.0 interface and the power source 180 supports a USB 3.0 interface, the electronic device 150 may not be capably of requesting the full amount of power that could be provided from the power source 180. In this example, the charging device 100 can act as a middleman and utilize the full power available from the power source. The charging device 100 can couple to the power source 180 over a first, higher power interface (e.g., a USB 3.0 interface), request more power from the power source 180 than the electronic device 150 is configured to use (e.g., the full power provided by the USB 3.0 specification), charge the electronic device 150 over a second, lower power interface (e.g., at the maximum charging rate supported by the electronic device 150 such as using USB 2.0 interface), and then charge the supplemental battery 102 with any excess power.

As another example, an electronic device 150 might be configured to charge with only 5 Watts (W) when connected to a power source 180, even if the power source 180 can provide 10 W. In this example, the charging device 100 can act as a middleman and negotiate to receive more than 5 W (e.g., the full amount of power, such as 10 W, that could be provided by the power source 180). The charging device 100 can couple to the power source 180 and interrogate it to receive the full 10 W of power, charge the electronic device 150 with the maximum power that the electronic device 150 can support (e.g., 5 W), and divert any excess power to charge the supplemental battery 102, such as up to 100 W per USB-PD (USB Power Delivery), or greater.

The charging device 100 can be configured to prioritize charging the electronic device 150 with any power that it receives from the power source 180. In some embodiments, the electronic device 150 can be configured to couple the power source 180 to the electronic device 150 when the power source 180 and the electronic device 150 support interfaces that maximize the transfer of power. For example, if the electronic device 150 is configured to use the full power capacity of the power source 180, the charging device 100 can be configured to pass the full amount of electrical power received from the power source 180 to the electronic device 150.

Figure 5A:
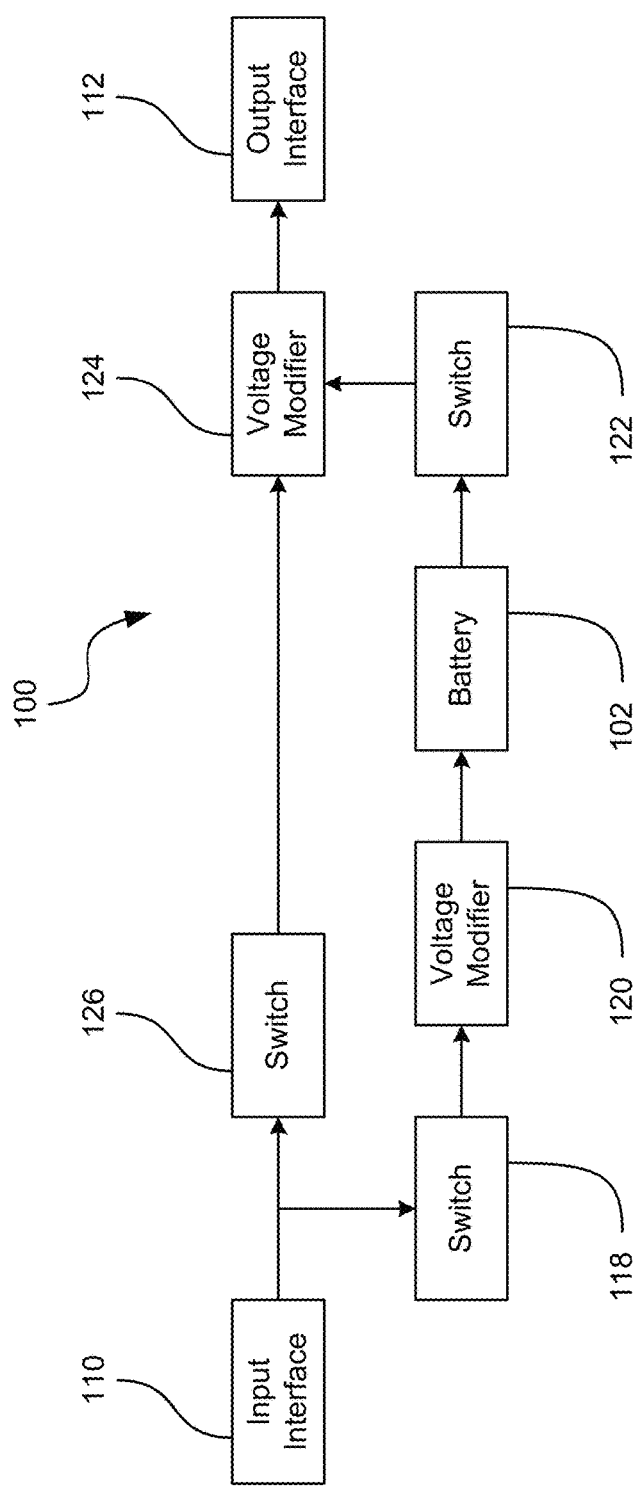
FIG. 5a is a schematic view of an example embodiment of a charging device.

With reference now to FIG. 5a, in some embodiments, the charging device 100 can include a charging electrical pathway from the input interface 110 to the supplemental battery 102. In FIG. 5a, the charging electrical pathway can extend from the input interface 110, through the switch 118, through the voltage modifier 120, to the supplemental battery 102. The voltage modifier 120 can adjust the voltage to an appropriate voltage level for charging the supplemental battery 102. In some embodiments, the input voltage at the input interface 110 can be higher than the voltage that the supplemental battery 102 is configured to receive (e.g., above an upper threshold voltage), and the voltage modifier 120 can be configured to reduce or "buck" the voltage down to the appropriate level, although the voltage modifier 120 can be configured to raise or "boost" the voltage if the input voltage is lower than the voltage that the supplemental battery 102 is configured to receive (e.g., below a lower threshold voltage). The switch 118 can be closed to direct electrical charge along the charging electrical pathway (e.g., to charge the supplemental battery 102), and the switch 118 can be opened to disrupt the charging electrical pathway (e.g., so that the supplemental battery 102 is not charged).

The charging device 100 can include a discharge electrical pathway from the supplemental battery 102 to the output interface 112, which can be used when the supplemental battery 102 is delivering charge to the mobile electronic device 150. The discharge electrical pathway can extend from the supplemental battery 102, through the switch 122, through the voltage modifier 124, to the output interface 112. The voltage modifier 124 can adjust the voltage to an appropriate voltage level for the mobile electronic device 150. In some embodiments, the supplemental battery 102 can be configured to output a voltage that is lower than the voltage used by the mobile electronic device 150 (e.g., below a lower threshold voltage), and the voltage modifier 124 can be configured to raise "boost" the voltage up to the appropriate level, although the voltage modifier 124 can be configured to reduce or "buck" the voltage if the voltage output by the supplemental battery 102 is higher than the voltage that the mobile electronic device 150 is configured to receive (e.g., above an upper threshold voltage). The switch 122 can be closed to direct electrical charge along the discharge electrical pathway (e.g., to charge the mobile electronic device 150 using the supplemental battery 102), and the switch 120 can be opened to disrupt the discharge electrical pathway (e.g., so that the supplemental battery 102 is not used to charge the mobile electronic device 150).

The charging device 100 can include a bypass electrical pathway from the input interface 110 to the output interface 112, which can be used to relay electrical charge from the external power source 180, through the charging device 100, to the mobile electronic device 150. The bypass electrical pathway can extend from the input interface 110, through the switch 126, through the voltage modifier 124, to the output interface 112. In some embodiments, the bypass electrical pathway does not go through, or otherwise include, the supplemental battery 102. The voltage modifier 124 can adjust the voltage to an appropriate voltage level for the mobile electronic device 150. In some embodiments, the discharge electrical pathway and the bypass electrical pathway can both use the same voltage modifier 124 (e.g., the same boost converter or voltage regulator), although the bypass electrical pathway can use a different voltage modifier than the discharge electrical pathway. In some circumstances, the voltage on the bypass electrical pathway can be different than the voltage used by the mobile electronic device 150. For example, the wrong external power source 180 might be used, the external power source 180 might malfunction, or the voltage might drop due to the electrical cable 184 and/or due to electrical components of the charging device 100. The voltage modifier 124 can be configured to raise "boost" the voltage up to the appropriate level if the voltage on the bypass electrical pathway is lower than the voltage used by the mobile electronic device 150 (e.g., below a lower threshold voltage), although the voltage modifier 124 can be configured to reduce or "buck" the voltage if the voltage on the bypass electrical pathway is higher than the voltage that the mobile electronic device 150 is configured to receive (e.g., above an upper threshold voltage). The switch 126 can be closed to direct electrical charge along the bypass electrical pathway (e.g., to charge the mobile electronic device 150 using the external power source 180 and bypassing the supplemental battery 102), and the switch 126 can be opened to disrupt the bypass electrical pathway (e.g., so that electrical power input through the input interfaced 110 is not passed through to charge the mobile electronic device 150).

The voltage modifier 120 and/or the voltage modifier 124 (and the other voltage modifiers discussed herein) can include a boost converters, buck converters, voltage regulators, etc. In some embodiments, the voltage modifiers discussed herein can include an inductor. In some embodiments, the voltage modifier 120 (e.g., the buck converter) and the voltage modifier 124 (e.g., the boost converter) can utilize the same inductor. In some embodiments, different inductors can be used by the voltage modifier 120 and the voltage modifier 124, which can facilitate the simultaneous charging of the supplemental battery 102 and the mobile electronic device 150. Using two different inductors for the voltage modifiers 120 and 124 can facilitate boosting the voltage (e.g., using the voltage modifier 124) and bucking the voltage (e.g., using the voltage modifier 120) at the same time.

By way of example, in some implementations, a mobile electronic device 150 (e.g., a smart phone) can be configured to receive electrical power at 5 volts, and can be configured to accept only voltages of plus or minus 5% from 5 volts (i.e., 4.75 volts to 5.25 volts). An external power source 180 (e.g., a wall charger that is plugged into an electrical power outlet) can output a voltage at 5 volts. An electrical cable 184 can couple the external power source 180 to the charging device 100, and the electrical cable 184 can have resistance that results in a voltage drop to 4.8 volts. The transition through the electrical connector 184 and the input interface 110 and the other electrical components of the charging device 10 can result in a further voltage drop to 4.7 volts, which is below the lower threshold voltage of 4.75 volts. Accordingly, if the electrical charge from the external power source 180 were merely passed through the charging device 100 to the mobile electronic device 150, the voltage would be rejected by the mobile electronic device 150. The voltage modifier 124 (e.g., a boost converter) can be configured to boost the voltage to a voltage level between 4.75 volts and 5.25 volts (e.g., to 5 volts or 5.2 volts). The charging device 100 can deliver the boosted voltage to the mobile electronic device 150 via the output interface 112.

In some embodiments, the voltage modifier 124 can boost the voltage to about the ideal voltage value for the mobile electronic device 150 (e.g., 5 volts in the above example), while in some embodiments, the voltage modifier 124 can boost the voltage to a voltage that is above the ideal voltage value, in order to compensate for further voltage drops that can occur after the voltage boost (e.g., voltage drop due to the transition from the output interface 112 to the input interface 160 of the mobile electronic device and/or due to an electrical cable (not shown) extending between the charging device 100 and the mobile electronic device 150). For example, the voltage modifier 124 can boost the voltage to a value between the ideal voltage and the upper threshold voltage value for the mobile electronic device 150. The voltage modifier 124 can boost the voltage to a value that is in the upper 50% of the range between the lower voltage threshold and the upper voltage threshold (e.g., between 5 volts and 5.25 volts), or between about 60% and about 95% of the range between the lower voltage threshold and the upper voltage threshold, or between about 70% and about 90% of the range between the lower voltage threshold and the upper voltage threshold (e.g., between about 5.1 volts and 5.2 volts in the above example), or between about 60% and about 80% of the range between the lower voltage threshold and the upper voltage threshold, although values outside these ranges can be used in some implementations.

In some embodiments, the charging device 100 can be configured to pass through the electrical charge along the bypass electrical pathway if the voltage is between the upper and lower threshold voltage values (e.g., between 4.75 volts and 5.25 volts in the above example) without modifying the voltage. In some embodiments, the charging device 100 will use the voltage modifier 124 (e.g., boost converter) to boost the voltage if the voltage is above the lower threshold value by only a small amount, which can compensate for later voltage drops from the output interface 112 or an electrical cable between the charging device 100 and the mobile electronic device 150. For example, if the voltage is over the lower threshold voltage by a value of about 0.3 volts or less, about 0.2 volts or less, or about 0.1 volts or less, or about 0.05 volts or less, the charging device 100 can boost the voltage (e.g., using the voltage modifier 124). By way of example, the charging device can pass through voltages between 4.8 volts and 5.25 volts without modifying the voltage, and can boost voltages below 4.8 volts, even though the mobile electronic device accepts voltages down to 4.75 volts. In some embodiments, the charging device 100 will use the voltage modifier 124 (e.g., boost converter) to boost the voltage if the voltage is below the ideal voltage for the mobile electronic device 150 (e.g., 5 volts in the above example), is in the lower about 50% of the acceptable voltage range, is in the lower about 60% of the acceptable voltage range, or is in the lower about 70% of the acceptable voltage range (e.g., less than about 5.1 volts in the above example), although values outside these ranges can also be used.

In some embodiments, a switch (not shown in FIG. 5a) can be closed to enable the bypass electrical pathway to avoid the voltage modifier 124 when no voltage modification is needed (e.g., when the input voltage is between 4.8 volts and 5.25 volts). For example, if no voltage modification is to be performed, the input interface 110 can be directly electrically coupled to the output interface 112 to provide the bypass electrical pathway. In some embodiments, if no voltage modification is needed, the electricity can still be routed through the voltage modifier 124. The voltage modifier 124 can be configured to pass the electrical charge through without modifying the voltage when the voltage is already at an acceptable value (e.g., between 4.8 volts and 5.25 volts).

In some embodiments, the charging device 100 can include one or more voltage sensors (not shown), which can be configured to measure the voltage at one or more locations (e.g., at the input interface 110, at the voltage modifier 120, at the voltage modifier 124, and/or at the battery 102). In some embodiments, the controller 104 can receive voltage information (e.g., from the one or more voltage sensors) and can control the charging device 100 based at least in part on the voltage information. For example, the controller 104 can actuate switches to direct electrical charge. For example, in the input voltage is already within an appropriate range for the mobile electronic device 150, the controller 104 can actuate a switch to bypass the voltage modifier 124. In some embodiments, one or both of the voltage modifiers 120 and 124 can receive voltage information (e.g., from the one or more voltage sensors) and can use the voltage information to control the amount of voltage change applied by the voltage modifiers 120 and 124. In some embodiments, one or both of the voltage modifiers 120 and 124 can use a voltage feedback loop. The controller 104 can direct electrical power (e.g., by actuating switches 118, 122, and/or 126) along a single electrical pathway (e.g., along the discharge electrical pathway to charge the mobile electronic device 150 from the supplemental battery 102) and/or along multiple electrical pathways simultaneously. For example, the charging device 100 can direct electrical power along the bypass electrical pathway and the charging electrical pathway to charge both the mobile electronic device 150 and the supplemental battery 102 at the same time. In some embodiments, the charging device 100 can use the bypass electrical pathway to charge the mobile electronic device 150, and can use the discharge electrical pathway at the same time to increase the amount of current that is output to the mobile electronic device 150 (e.g., if the current output using the bypass electrical pathway is below the charging current that is accepted by the mobile electronic device 150). In various embodiments, the charging device 100 can monitor the input current (e.g., received by the input interface), the charging current (ICHG) (e.g., delivered to the supplemental battery), and/or the output current (e.g., delivered to the output interface 112), such as by using one or more integrated sense amplifiers and/or one or more analog-to-digital converters.

Figure 5B:
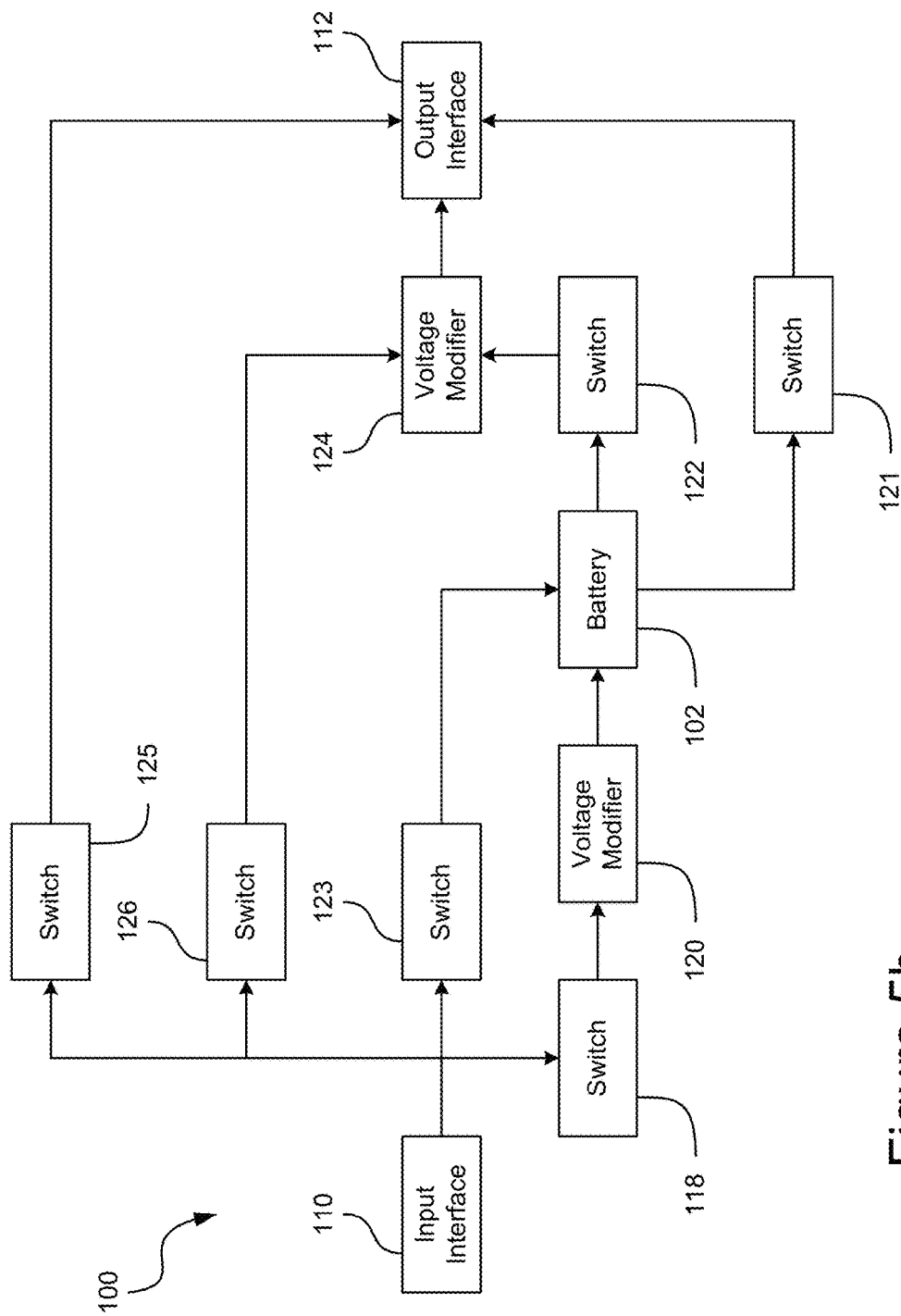
FIG. 5b is a schematic view of an example embodiment of a charging device.

With reference to FIG. 5*b*, in some embodiments, the charging device 100 can include a charging electrical pathway from the input interface 110 to the supplemental battery 102. In FIG. 5*b*, the charging electrical pathway can extend from the input interface 110, through the switch 118, through the voltage modifier 120 (which can be a boost converter, a buck converter, a voltage regulator, etc.), to the supplemental battery 102. The boost converter, which can be used as the voltage modifier 120, can increase the voltage to an appropriate voltage level for charging the supplemental battery 102. The buck converter, which can be used as the voltage modifier 120, can decrease the voltage to an appropriate voltage level for charging the supplemental battery 102.

In some embodiments, the voltage that the supplemental battery 102 is configured to receive (e.g., 9V) is greater than the voltage that the output interface 112 is configured to receive (e.g., 5.1V), and/or the voltage supplied by the power source 180 (not shown in FIG. 5*b*) at the input interface 110 can be lower than the voltage that the supplemental battery 102 is configured to receive. In some embodiments, the battery 102 can include multiple battery cells, which can be coupled in series or in parallel. The voltage modifier 120 (e.g., a boost converter) can be configured to increase or "boost" the voltage received from the input interface 110 up to the appropriate voltage level for charging the supplemental battery 102 (e.g., which can include multiple battery cells in series). A controller 104 (not shown in FIG. 5*b*) can close the switch 118, and can open one or more switches 123, 125, and/or 126 when the voltage receive at the input interface 110 is lower than the voltage used to charge the supplemental battery 102 such that a boost converter raises the voltage, as discussed herein.

In some embodiments, the voltage received at the input interface 110 is higher than the voltage that supplemental battery 102 is configured to receive (e.g., for charging the supplemental battery 102). The voltage modifier 120 (e.g., a buck converter) can reduce or "buck" the voltage received from the input interface 110 down to the appropriate level for charging the supplemental battery 102. A controller 104 (not shown in FIG. 5*b*) can close the switch 118, and can open one or more switches 123, 125, and/or 126 when the voltage receive at the input interface 110 is higher than the voltage used to charge the supplemental battery 102 such that a buck converter lowers the voltage, as discussed herein.

In some embodiments, the voltage supplied by the power source 180 (not shown in FIG. 5*b*) at the input interface 110 can be at an acceptable level or within an acceptable voltage range for charging the supplemental battery 102. An electrical pathway or circuit can bypass the voltage modifier 120 and can couple the power supplied at the input interface 110 to the battery 102 without the voltage modifier 120. A controller 104 (not shown in FIG. 5*b*) can close the switch 123 and can open one or more switches 118, 126, and/or 125 when the voltage received from the input interface 110 is at an acceptable level for charging the supplemental battery 102.

The charging device 100 can include a discharge electrical pathway from the supplemental battery 102 to the output interface 112, which can be used when the supplemental battery 102 is delivering charge to the mobile electronic device 150. The discharge electrical pathway can extend from the supplemental battery 102, through the switch 122, through the voltage modifier 124 (which can be a boost converter, a buck converter, a voltage regulator, etc.), to the output interface 112. The buck converter can reduce the voltage to an appropriate voltage level for the mobile electronic device 150. The boost converter can raise the voltage to an appropriate voltage level for the mobile electronic device 150. In some implementations, an electrical pathway or circuit can bypass the voltage modifier 124 and can couple the supplemental battery 102 to the output interface 112 without the voltage modifier 124 (e.g., by the controller 104 closing switch 121 and opening switch 122), such as when the supplemental battery 102 is configured to output a voltage that is at an appropriate level for the electronic device 150.

In some implementations, the charging device 100 can include an electrical pathway or circuit from the input interface 110, through the switch 126, through the voltage modifier 124, to the output interface 112. This electrical pathway or circuit can be used to direct electrical power from the input interface 110 (e.g., received from the power supply 180) to the output interface 112 (e.g., to the electronic device 150) without going through the battery 102. The charging device 100 can include a boost converter as the voltage modifier 124, such that the system can increase the voltage if the voltage received from the input interface 110 is lower than the voltage appropriate to deliver to the electronic device 150. The charging device 100 can include a buck converter as the voltage modifier 124, such that the system can decrease the voltage if the voltage received from the input interface 110 is higher than the voltage appropriate to deliver to the electronic device 150. The controller 104 can close switch 126 and can open one or more other switches 118, 123, and/or 125 to deliver electrical power from the input interface 110, through the voltage modifier 124, to the output interface 112.

In some implementations, the charging device 100 can include an electrical pathway or circuit from the input interface 110, through the switch 125, to the output interface 112, which can deliver electrical charge from the input interface 110 to the output interface 112 without going through the supplemental battery 102, the voltage modifier 120, or the voltage modifier 124. For example, if the voltage received from the input interface 110 is the appropriate voltage level to provide to the electronic device 150, the controller 104 can close the switch 125 and can open one or more other switches 118, 123, 125, and/or 126 (e.g., to direct electrical power directly form the input interface 110 to the output interface 112).

As discussed herein, the controller 104 (not shown in FIG. 5*b*) can open and close various switches 118, 121, 122, 123, 125, and 126 to direct electrical power along various different electrical pathways in the charging device 100. The controller 104 can control the switches based on voltage levels, which can be measured using on or more voltage sensors (not shown in FIG. 5*b*), which can be positioned to measure voltages at various positions, as discussed herein.

In some embodiments, multiple switches shown herein can be combined using a single switch. For example, one or more of the switches 118, 123, 125, and 126 can be combined using a multi-way switch. Similarly, switches 122 and 121 can be combined using a multi-way switch. Many variations are possible. For example, various electrical pathways or circuits in FIG. 5b can be omitted to form various combinations and sub-combinations of the electrical pathways or circuits discussed herein. Additional electrical pathways or circuits can be included. For example, an electrical pathway or circuit can extend from the voltage modifier 120 to the voltage modifier 124, and a switch can be positioned to control that electrical pathway or circuit. Accordingly, in some instances, the voltage received from the input interface 110 can be first modified by the voltage modifier 120 (e.g., raised if the voltage modifier 120 is a boost converter or reduced if the voltage modifier is a buck converter) and that modified voltage can then be modified a second time by the voltage modifier 124 (e.g., raised if the voltage modifier 120 is a boost converter or reduced if the voltage modifier is a buck converter) and the second modified voltage can be provided to the output interface 112 (e.g., for delivery to the electronic device 150).

Figure 6:
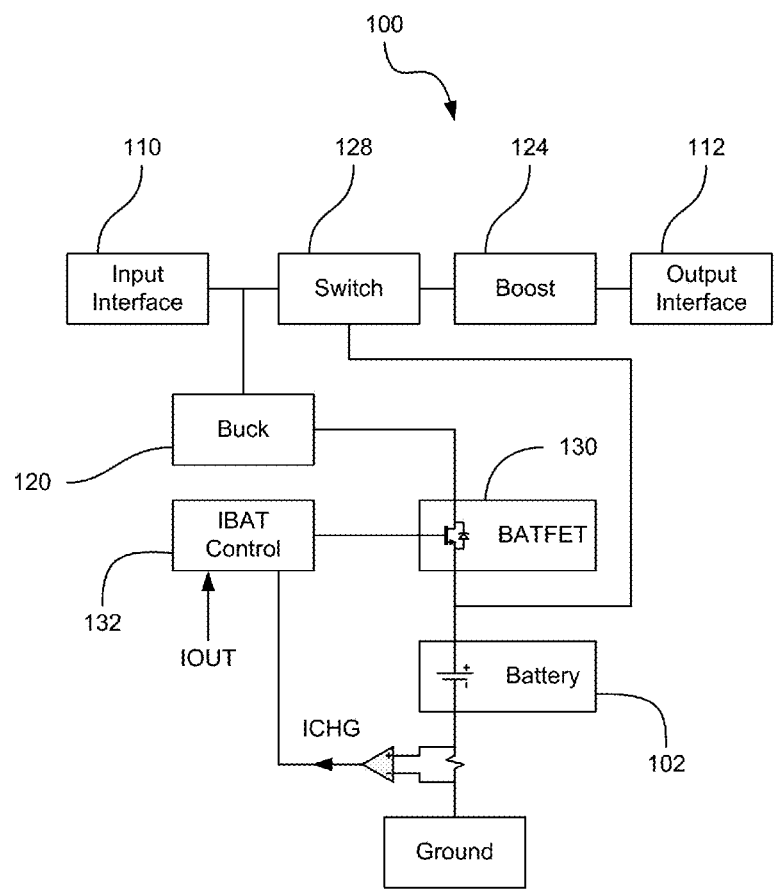
FIG. 6 is another schematic view of an example embodiment of a charging device.

With reference to FIG. 6, the charging electrical pathway can extend from the input interface 110, through the voltage modifier 120 (e.g., a buck converter), through a battery field-effect transistor (BATFET) 130, to the battery 102. The BATFET 130 can receive input from a battery current controller (IBAT Control) 132, which can be based at least in part on the output current (IOUT) and/or the charge current (ICHG). In some embodiment, the BATFET 130 and/or IBAT Control 132 can be configured to impede overcharging of the battery 102 (e.g., by limiting or stopping the current delivered to the battery).

In the example embodiment of FIG. 6, the discharge electrical pathway can extend from the battery 102, through the switch 128, through the voltage modifier 124 (e.g., a boost converter), to the output interface 112. The bypass electrical pathway can extend from the input interface 110, through the switch 128, through the voltage modifier 124 (e.g., boost converter), to the output interface 112. The switch 128 can control flow of electricity through both the discharge electrical pathway and the bypass electrical pathway. The switch 128 can toggle the input to the voltage modifier 124 (e.g., a boost converter) between the input interface 110 (for the bypass electrical pathway) and the battery 102 (for the discharge electrical pathway). In some embodiments, a single switch (e.g., switch 128 of FIG. 6) can be used in place of the switches 126 and 122 of FIG. 5. In some embodiments, a single switch can be used in place of the two switches 118 and 126 of FIG. 5. With reference to FIG. 6, in some embodiments, a switch (not shown in FIG. 6) can be positioned in the charging electrical pathway. With reference again to FIG. 5, a bypass switch 126 can be positioned between the input interface 110 and the output interface 112 (e.g., on the bypass electrical pathway), and a charging switch 118 can be positioned between the input interface 110 and the supplemental battery 102 (e.g., on the charging electrical pathway). Electrical charge that is passed through the charging device 100 from an external power source 180 to charge the mobile electronic device 150 can pass through the bypass switch 126. Electrical charge that is used to charge the supplemental battery 102 of the charging device 100 can pass through the charging switch 118. In some embodiments, the electrical current sent to the supplemental battery 102 does not pass through the bypass switch 126, and/or the electrical current that is routed from the input interface 110 to the output interface 112 does not pass through the charging switch 118. Using the two switches 118 and 126, as shown in FIG. 5, can enable more throughput of electrical energy, as compared to an embodiment that uses a single switch for both the bypass electrical pathway and the charging electrical pathway, for example, because the embodiment with two switches can have a higher thermal limit than the embodiment with a single switch. Because the charging switch 118 can receive the electrical current that is delivered to the supplemental battery 102 along the charging electrical pathway but not the electrical current that is directed along the bypass electrical pathway, and because the bypass switch 126 can receive the electrical current that is directed along the bypass electrical pathway but not the electrical current that is delivered to the supplemental battery 102 (e.g., via the charging electrical pathway), more electrical current can be used without overloading the switches' 118 and 126 thermal limits, as compared to an implementation in which a single switch receives both the electrical current for the charging electrical pathway and the current for the bypass electrical pathway.

Many of the features and much of the functionality described in connection with the example embodiment of FIG. 5 applies also to the example embodiment shown in FIG. 6 and vice versa. By way of example, with reference to FIG. 6, if the voltage received at the input interface 110 is within a first range, or above a first threshold, (e.g., between about 5 volts and 5.5 volts), the controller 104 can pass the electrical charge from the input interface 110 to the output interface 112. In some cases, a switch (not shown in FIG. 6) can be used to connect the input interface 110 directly to the output interface 112, bypassing the voltage modifier 124 (e.g., the boost converter). In some cases, the electricity can be directed through the voltage modifier 124 without changing the voltage. If the voltage received at the input interface 110 is within a second range, or below the first threshold, (e.g., between about 3.9 volts and about 5.0 volts), the controller 104 can operate the switch 128 to connect the input to the voltage modifier 124 (e.g., the boost converter) to the input interface 110 (e.g., to use bypass electrical pathway, as discussed herein). The charging device 100 can boost the voltage from the value between about 3.9 volts and 5.0 volts up to about 5.1 volts using the voltage modifier 124 (e.g., the boost converter) and can deliver the boosted voltage to the mobile electronic device 150 via the output interface 112. If the available current is greater than the charge current used by the mobile electronic device 150, the charging device 100 can be configured to charge the supplemental battery 102 at the same time. The voltage can be reduced (e.g., from the value between about 3.9 volts and about 5.0 volts) to a voltage value or range that is used by the supplemental battery 102 (e.g., between about 3.7 volts and about 4.7 volts) by the voltage modifier 120 (e.g., the buck converter).

In some embodiments, the charging device 100 can give priority to charging the mobile electronic device 150 (e.g., using the bypass electrical pathway), such that the charging device 100 will provide the mobile electronic device 150 with the full charging current accepted by the mobile electronic device 150 and will use the surplus current, if available, to charge the supplemental battery 102 (e.g., using the charging electrical pathway). In some embodiments, the charging device can direct larger amounts of current to the supplemental battery 102 when no mobile electronic device 150 is coupled to the output interface 112 or when the mobile electronic device 150 is fully charged.

When no voltage is available at the input interface (e.g., the charging device 100 is not coupled to an external power source 180), or when the voltage received at the input interface 110 is within a third range, or below a second threshold (e.g., lower than about 3.9 volts), the charging device 100 can use the supplemental battery 102 to provide electrical power to the output interface 112 (e.g., using the discharge electrical pathway, as discussed herein). The controller 104 can use the switch 128 to connect the input to the voltage modifier 124 (e.g., the boost converter) to the supplemental battery 102, and the voltage provided by the supplemental battery 102 can be boosted to about 5.1 volts and can be delivered to the output interface 112.

Figure 7:
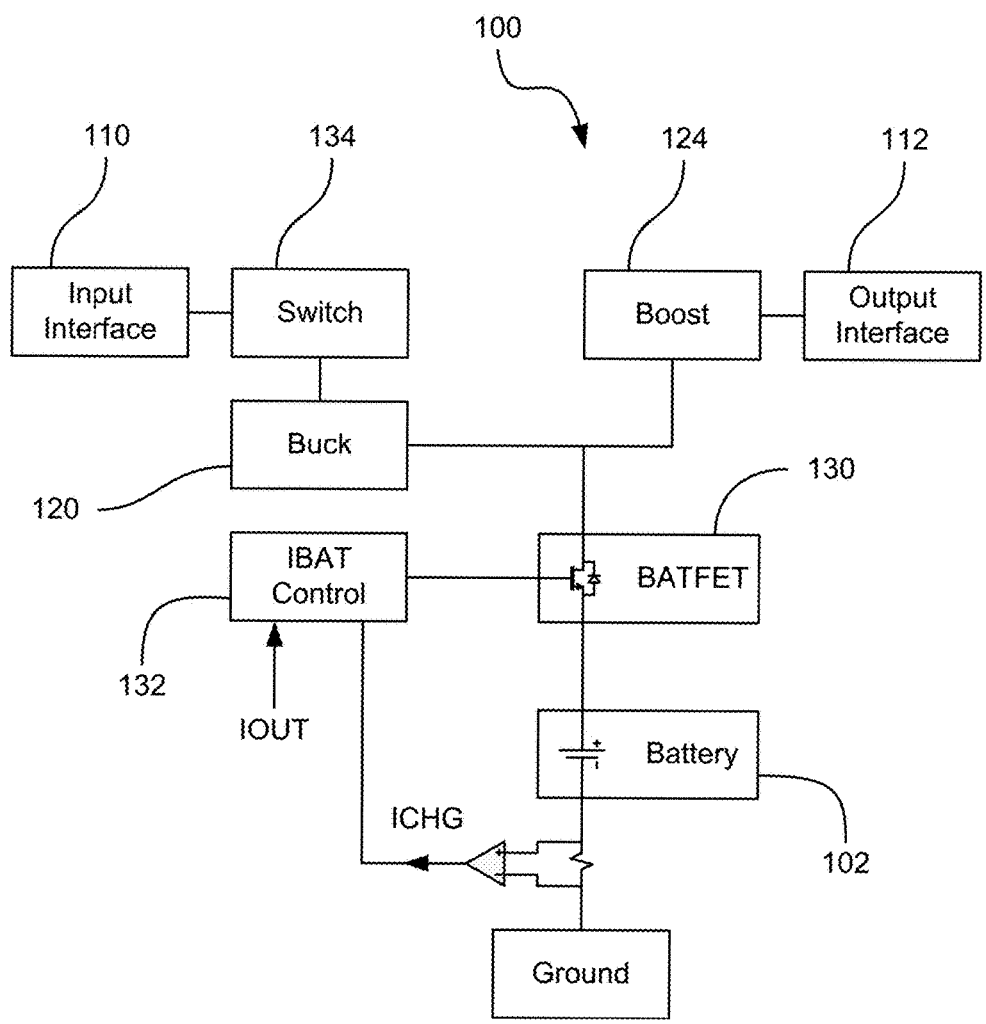
FIG. 7 is another schematic view of an example embodiment of a charging device.

With reference to FIG. 7, in some embodiments the charging device 100 can receive a voltage that is higher than the voltage used by the supplemental battery 102 and higher than the voltage used by the mobile electronic device 150. The charging electrical pathway can extend from the input interface 110, through a switch 134, through a voltage modifier 120 (e.g., a buck converter), through the BATFET 130, to the supplemental battery 102. The discharge electrical pathway can extend from the supplemental battery 102, through the BATFET 130, through the voltage modifier 124 (e.g., a boost converter), to the output interface 112. The bypass electrical pathway can extend from the input interface 110, through the switch 134, through the voltage modifier 120 (e.g., the buck converter), to the output interface 112. In some embodiments, the bypass electrical pathway can go through the voltage modifier 124 (e.g., the boost converter) before reaching the output interface 112 (as can be seen in FIG. 7), and in some embodiments, the bypass electrical pathway does not go through the voltage modifier 124 (e.g., the boost converter). The switch 134 can be provided between the voltage modifier 120 (e.g., the buck converter) and the input interface 110 to impede back feed from the supplemental battery 102 to the input interface 110.

Many of the features and much of the functionality described in connection with the example embodiment of FIG. 7 applies also to the example embodiments shown in FIGS. 5 and 6 and vice versa. By way of example, when a voltage is available at the input interface 110 (e.g., a relatively high voltage such as between about 9 volts and about 17 volts), an internal switch can be used to route the electrical power through the voltage modifier 120 (e.g., the buck converter) to the output interface 112. The voltage modifier 120 (e.g., the buck converter) can be configured to reduce the voltage to a value that can be used by the supplemental battery 102 (e.g., between about 3.7 volts and about 4.5 volts), and the voltage modifier 124 (e.g., a boost converter) can be configured to then raise the voltage to a value that is accepted by the mobile electronic device 150 (e.g., about 5.1 volts). Many variations are possible, for example, the voltage modifier 120 (e.g., the buck converter) can be configured to reduce the voltage to a first value or range (e.g., about 5.1 volts) when it is used in the bypass electrical pathway to supply electrical charge from the input interface 110 to the output interface 112 (e.g., without using the voltage modifier 124 to boost the voltage), and the voltage modifier 120 (e.g., the buck converter) can be configured to reduce the voltage to a second value or range (e.g., between about 3.7 volts and about 4.5 volts) when used in the charging electrical pathway to supply electrical charge from the input interface 110 to the supplemental battery 102. For example, the voltage modifier 120 can include a variable buck converter or the voltage modifier 120 an include two buck converters and at least one switch controlled by the controller 104 depending on whether the charging device is used in charging mode, bypass mode, or both. In some embodiments, a switch can be used to direct the electrical charge from the input interface 110 to the output interface 112 without going through the voltage modifier 120 (e.g., the buck converter) or the voltage modifier 124 (e.g., the boost converter).

When voltage is available at the input interface 110 (e.g., between about 9 volts and about 17 volts), the charging device 100 can use the voltage modifier 120 (e.g., the buck converter) to reduce the voltage to be delivered to the supplemental battery 102 (e.g., to between about 3.7 volts to about 4.5 volts). In some embodiments, the charging device 100 can simultaneously use the voltage modifier 124 (e.g., the boost converter) to raise the voltage (e.g., the voltage that was previously reduced by the voltage modifier 120) to provide the voltage to the output interface 112 that is appropriate for the mobile electronic device 150 (e.g., about 5.1 volts). Thus, the charging device 100 can reduce the voltage (e.g., from between about 9 volts and about 17 volts to a value between about 3.7 volts to about 4.5 volts) to charge the supplemental battery 102, and the charging device 100 can raise the reduced voltage (e.g., from between about 3.7 volts and about 4.5 volts to a value of about 5.1 volts) to charge the mobile electronic device 150. The input to the voltage modifier 124 (e.g., the boost converter) can be the output of the voltage modifier 120 (e.g., the buck converter 120), such as when the charging device operates in bypass mode using the bypass electrical pathway to charge the mobile electronic device 150.

The charging device 100 can give priority to charging the mobile electronic device 150. For example, in some embodiments, the charging device 100 will charge the supplemental battery 102 if there is left over current that remains after providing the mobile electronic device 150 with the full amount of current accepted by the mobile electronic device 150. In some embodiments, the charging device 100 can also charge the supplemental battery 102 if no mobile electronic device 150 is coupled to the output interface 112 or if the mobile electronic device 150 is fully charged. In some embodiments, if the available current is higher than the charging current used by the mobile electronic device 150, the charging device 100 can use the remaining current to charge the supplemental battery 102. If the available current is lower than the charging current used by the mobile electronic device 150, the charging device 100 can provide additional current from the supplemental battery 102 to the output interface 112 (e.g., via the discharge electrical pathway).

When no voltage is available at the input interface 110 (e.g., no external power source 180 is connected), the charging device 100 can provide electrical power from the supplemental battery 102 to the output interface 112 (e.g., via the discharge electrical pathway). The voltage modifier 124 (e.g., the boost converter) can raise the voltage provided by the supplemental battery 102 to provide a voltage to the output interface 112 that is appropriate for the mobile electronic device 150 (e.g., about 5.1 volts).

Figure 8:
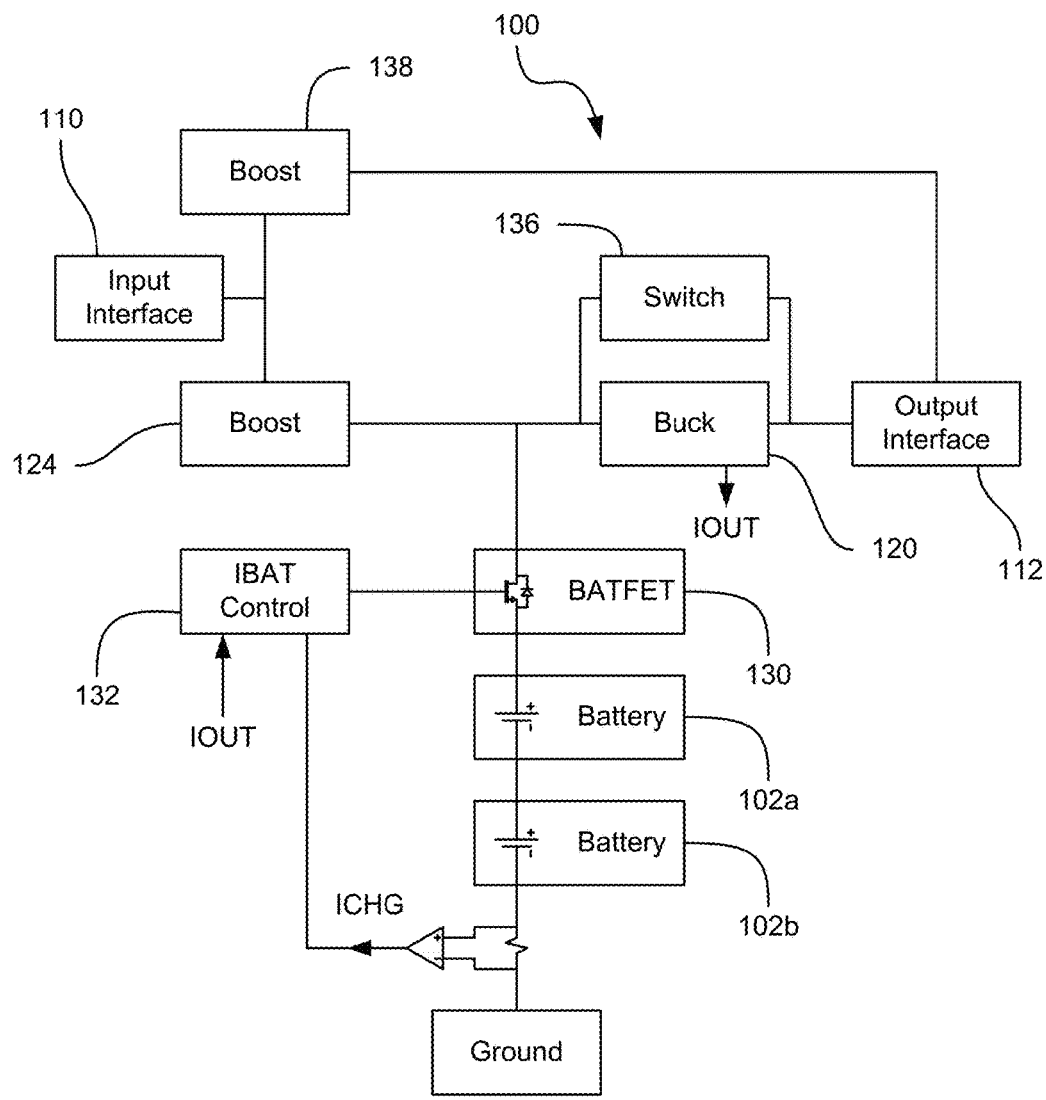
FIG. 8 is another schematic view of an example embodiment of a charging device.

With reference to FIG. 8, in some embodiments, the charging device 100 can be configured to receive voltage that is lower than the battery voltage. For example, the charging device 100 can include multiple batteries 102a and 102b, which can be connected in series to increase the battery voltage (e.g., to about 6 volts to about 9 volts). In some embodiments, the charging device 100 can be configured to receive voltage between about 3.9 volts and about 5 volts. In some embodiments, the charging device 100 can be configured to receive voltage between about 3 volts and 6 volts. The charging pathway can extend from the input interface 110, through the voltage modifier 124 (e.g., a boost converter), through the BATFET 130, to the two or more batteries 102a and 102b. The discharge electrical pathway can extend from the two or more batteries 102a and 102b, through the voltage modifier 120 (e.g., a buck converter), and to the output interface 112.

The bypass electrical pathway can be implemented in various manners. In a first example implementation the bypass electrical pathway can extend from the input interface 110, through the voltage modifier 124 (e.g., the boost converter), through the voltage modifier 120 (e.g., the buck converter), to the output interface 112. For example, in some embodiments, the switch 136 and the voltage modifier 138 can be omitted from the example embodiment of FIG. 8. By way of example, the voltage modifier 124 can be configured raise the input voltage (e.g., between about 3.9 volts and about 5 volts) to a battery voltage level (e.g., between about 6 volts and about 9 volts), and the voltage modifier 120 can be configured to lower the voltage from the battery voltage level (e.g., between about 6 volts and about 9 volts) to a voltage level for the mobile electronic device 150 (e.g., to a voltage of about 5.1 volts). Accordingly, in some embodiments disclosed herein the bypass electrical pathway can both boost and buck the voltage.

In a second example implementation, the bypass electrical pathway can extend from the input interface 110, through the voltage modifier 124 (e.g., the boost converter), through the switch 136, to the output interface 112. The switch 136 can be used to connect the output of the voltage modifier 124 (e.g., the boost converter) to the output interface 112 without going through the voltage modifier 120 (e.g., the buck converter). In some embodiments, the voltage modifier 124 can be configured to raise the voltage to a first level that is configured for use by the mobile electronic device 150 (e.g., to about 5.1 volts) when used in the bypass electrical pathway to charge the mobile electronic device 150, and the voltage modifier 124 can be configured to raise the voltage to a second level that is configured for use by the two or more batteries 102a and 102b (e.g., between about 6 volts and about 9 volts) when used in the charging electrical pathway. For example, the voltage modifier 124 can include a variable boost converter, or the voltage modifier 124 can include two boost converters and a switch that is controlled by the controller 104 based on whether the charging device 100 is in charging mode (e.g., using the charging electrical pathway to charge the batteries 102a and 102b) or in bypass mode (e.g., using the bypass electrical pathway to charge the mobile electronic device 150). In the second example implementation, the voltage modifier 138 can be omitted.

In a third example implementation, the bypass electrical pathway can extend from the input interface 110, through the voltage modifier 138 (e.g., a boost converter), to the output interface 112. The voltage modifier 138 can be configured to raise the input voltage to a voltage level used by the mobile electronic device 150 (e.g., to about 5.1 volts). The charging device 100 can use the voltage modifier 124 to boost the voltage for charging the two or more batteries 102a and 102b (e.g., at between about 6 volts and about 9 volts), and can use the voltage modifier 138 to boost the voltage for charging the mobile electronic device (e.g., at about 5.1 volts). The voltage modifier 138 can be configured to boost the voltage less than the voltage modifier 124. In the third example implementation, the switch 136 can be omitted.

Many of the features and much of the functionality described in connection with the example embodiment of FIG. 8 applies also to the example embodiments shown in FIGS. 5 to 7 and vice versa. By way of example, with reference to FIG. 8, when voltage is available at the input interface 110, any one of the three bypass electrical pathways described above can provide electrical charge to the output interface 112, which can be used to charge the mobile electronic device 150. In some embodiments, the voltage modifier 124 (e.g., the boost converter) can raise the voltage to the battery voltage level (e.g., between about 6 volts and about 9 volts) for charging the two or more batteries 102a and 102b. The charging device can be configured to charge the mobile electronic device 150 (e.g., via the bypass electrical pathway) and the two or more supplemental batteries 102a and 102b simultaneously.

The charging device 100 can give priority to charging the mobile electronic device 150. For example, in some embodiments, the charging device 100 will charge the supplemental batteries 102a and 102b if there is left over current that remains after providing the mobile electronic device 150 with the full amount of current accepted by the mobile electronic device 150. In some embodiments, the charging device 100 can also charge the supplemental batteries 102a and 102b if no mobile electronic device 150 is coupled to the output interface 112 or if the mobile electronic device 150 is fully charged. In some embodiments, if the available current is higher than the charging current used by the mobile electronic device 150, the charging device 100 can use the remaining current to charge the supplemental batteries 102a and 102b. If the available current is lower than the charging current used by the mobile electronic device 150, the charging device 100 can provide additional current from the supplemental batteries 102a and 102b to the output interface 112 (e.g., via the discharge electrical pathway).

When no voltage is available at the input interface 110 (e.g., no external power source 180 is connected), the charging device 100 can provide electrical power from the supplemental batteries 102a and 102b to the output interface 112 (e.g., via the discharge electrical pathway). The voltage modifier 120 (e.g., the buck converter) can lower the voltage provided by the supplemental batteries 102a and 102b to provide a voltage to the output interface 112 that is appropriate for the mobile electronic device 150 (e.g., about 5.1 volts).

Figure 9:
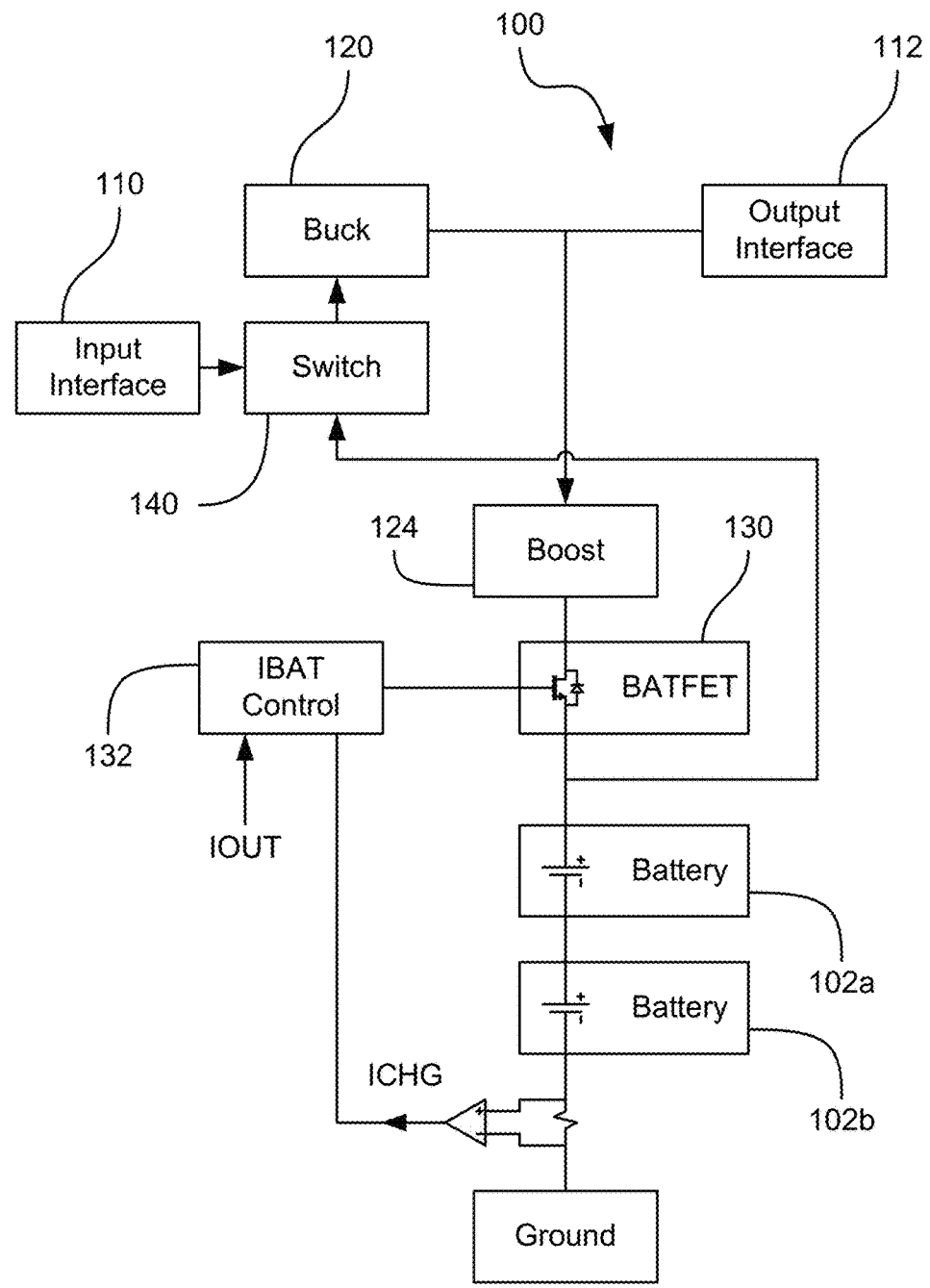
FIG. 9 is another schematic view of an example embodiment of a charging device.

With reference now to FIG. 9, the bypass electrical pathway can extend from the input interface 110, through the switch 140, through the voltage modifier 120 (e.g., a buck converter), to the output interface 112. The charging electrical pathway can extend from the input interface 110, through the switch 140, through the voltage modifier 120 (e.g., the buck converter), through the voltage modifier 124 (e.g., a boost converter), through the BATFET 130, to the one or more supplemental batteries 102a and 102b. The discharge electrical pathway can extend from the one or more supplemental batteries 102a and 102b, through the switch 140, through the voltage modifier 120 (e.g., the buck converter), to the output interface 112.

Many of the features and much of the functionality described in connection with the example embodiment of FIG. 9 applies also to the example embodiments shown in FIGS. 5 to 8 and vice versa. By way of example, the input interface can receive voltage (e.g., between about 9 volts and about 17 volts). In some cases, the input voltage can be higher than the voltage used by the one or more batteries 102a and 102b and/or higher than the voltage used by the mobile electronic device 150. When an input voltage is received at the input interface 110, the switch 140 can connect the input of the voltage modifier 120 (e.g., the buck converter) to the input interface 110. The voltage modifier 120 (e.g., the buck converter) can lower the voltage to a voltage level used by the mobile electronic device 150 (e.g., to about 5.1 volts). The reduced voltage can be provided to the output interface 112 for charging the mobile electronic device 150. In some cases, the voltage modifier 124 (e.g., the boost converter) can raise the voltage that was reduced by the voltage modifier 120 up to a voltage level for charging the one or more supplemental batteries (e.g., up from about 5.1 volts to between about 6 volts and about 9 volts). Accordingly, in some embodiments, the charging electrical pathway can both buck and boost the voltage between the input interface 110 and the one or more batteries 102a and 102b.

The charging device 100 can give priority to charging the mobile electronic device 150. For example, in some embodiments, the charging device 100 will charge the one or more supplemental batteries 102a and 102b if there is left over current that remains after providing the mobile electronic device 150 with the full amount of current accepted by the mobile electronic device 150. In some embodiments, the charging device 100 can also charge the one or more supplemental batteries 102a and 102b if no mobile electronic device 150 is coupled to the output interface 112 or if the mobile electronic device 150 is fully charged. In some embodiments, if the available current is higher than the charging current used by the mobile electronic device 150, the charging device 100 can use the remaining current to charge the one or more supplemental batteries 102a and 102b. In some embodiments, if the available current is lower than the charging current used by the mobile electronic device 150, the charging device 100 can provide additional current from the supplemental batteries 102a and 102b to the output interface 112 (e.g., via the discharge electrical pathway). For example, the switch 140 can be configured to provide input to the voltage modifier 120 from both the input interface 110 (bypass mode) and the one or more supplemental batteries 102a and 102b (discharge mode), and in some implementations, the voltage modifier 120 can include multiple buck converters to accommodate input from both the input interface 110 and the one or more supplemental batteries 102a and 102b.

When no voltage is available at the input interface 110 (e.g., no external power source 180 is connected), the charging device 100 can provide electrical power from the one or more supplemental batteries 102a and 102b to the output interface 112 (e.g., via the discharge electrical pathway). The voltage modifier 120 (e.g., the buck converter) can lower the voltage provided by the one or more supplemental batteries 102a and 102b to provide a voltage to the output interface 112 that is appropriate for the mobile electronic device 150 (e.g., about 5.1 volts).

Many variations are possible. For example, embodiments shown or described as having a single supplemental battery 102 can instead include multiple supplemental batteries, and embodiments showing multiple supplemental batteries 102a and 102b can instead us a single supplemental battery. In some embodiments, the charging devices 100 shown and described can include multiple output interfaces 112 for charging multiple mobile electronic devices (e.g., as shown, for example, in FIG. 4).

In some embodiments, the charging device 100 can be configured to determine the electrical power capacity of the external power source 180, as discussed herein. The power capacity information can be stored in the memory 106 and/or used by the controller 104 to operate the charging device 100. For example, the controller 104 can use the power capacity information to determine how much current to provide to the mobile electronic device 150 (e.g., via the bypass electrical pathway) and/or how much current to provide to the supplemental battery 102 (e.g., via the charging electrical pathway). In some embodiments, the charging device 100 can be configured to determine the electrical power capacity of the external power source 180 from one or more bias voltages output by the external power source 180 (e.g., from the D+ and/or D− lines). In some embodiments, the charging device 100 can be configured to empirically determine the electrical power capacity of the external power source 180.

Figure 9A:
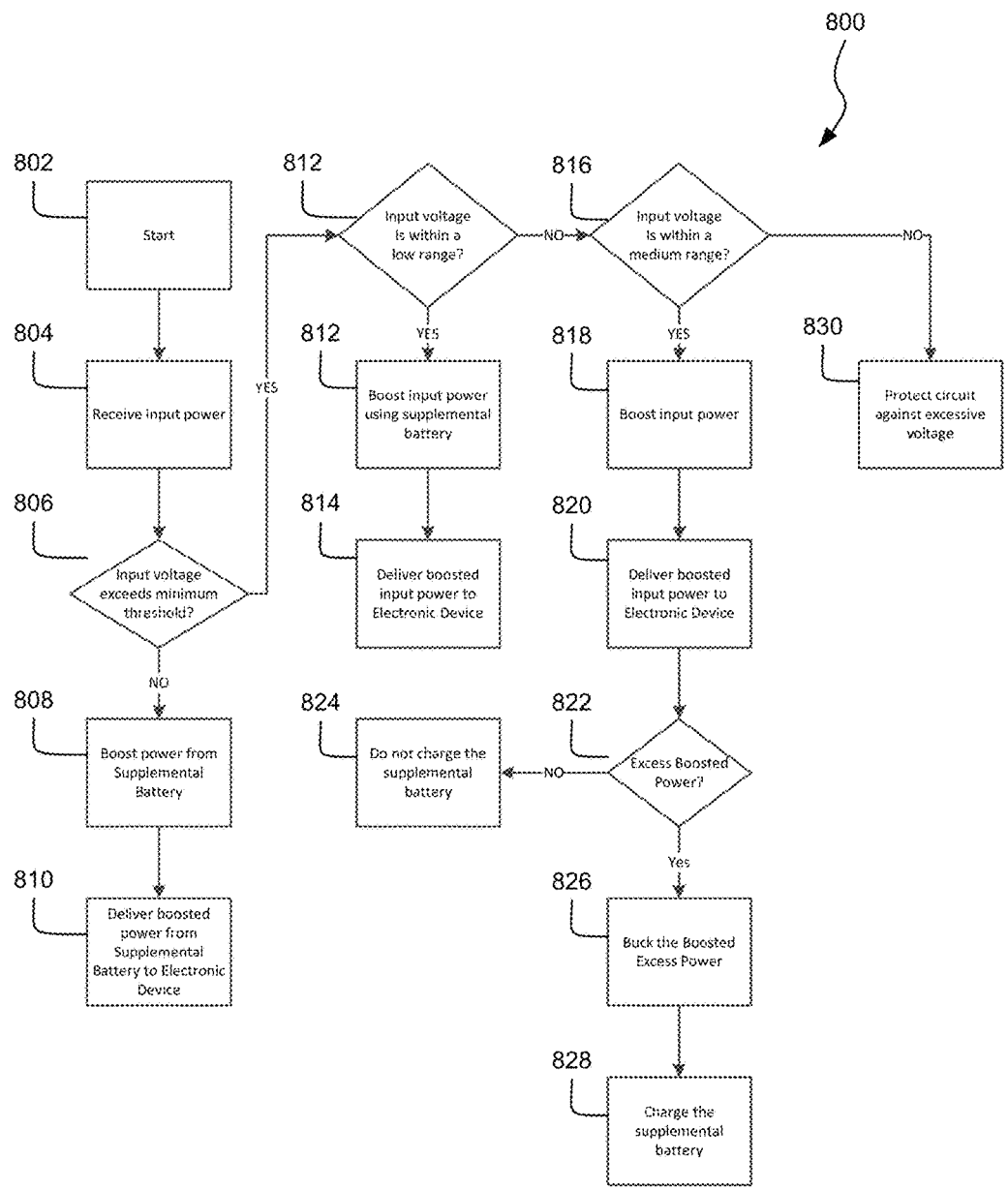
FIG. 9a is a flowchart of an example embodiment of a method for managing power.

FIG. 9a is a flowchart of an example embodiment of a method 800 for managing power in the charging device 100. This method 800 can be used when the output voltage to an electronic device 150 requires a higher voltage than what the supplemental battery 102 provides. For example, the electronic device 150 might require 5.1 V, and the supplemental battery 102 might output a voltage of 4.5 V.

The method can start at block 802. At block 804, input power is received. At block 806, a determination can be made if the input voltage exceeds a minimum threshold, for example, 3.5 V. If the input voltage is less than the minimum threshold voltage, then at block 808, a supplemental battery 102 can provide power through a boost converter. At block 810, the boosted power can be delivered to electronic device 150.

If the input voltage exceeds the minimum threshold, at block 812, it can be determined whether the input power is within a low range, such as between 3.5V to 4.8 V. If the input voltage falls within that range, then the input power can be boosted using power from the supplemental battery 102 at block 814. At block 816, the boosted power can be delivered to the electronic device 150.

If the input voltage does not fall within the low range, then at block 816, it can be determined whether or not the input voltage falls within a medium range, such as between 4.8V and 5.3 V. If the input voltage falls with the medium range, then the input power can be boosted at block 818. The boosted input power can be delivered to the electronic device 150 at block 820. At block 822, it can be determined if any excess power remains after the boosted power is delivered to the electronic device 150. If the electronic device 150 uses all of the boosted power, then no power is used to charge the supplemental battery 102 at block 824. If any excess power remains, then at block 826, the excess power can be bucked down to an appropriate voltage level for the battery, such as 4.5 V. Then at block 828, the supplemental battery 102 can be charged with the excess power.

If the input voltage exceeds the medium range, then an overvoltage problem can occur. At block 830, the circuit may protect the battery against the excessive input voltage, for example, by isolating the power input from the power source 180, or by isolating the battery by opening circuit switches, or through the use of fuses.

In some embodiments, the steps 806, 812, and 816 can be combined into one step for determining the input voltage, or can be performed in parallel.

Figure 9B:
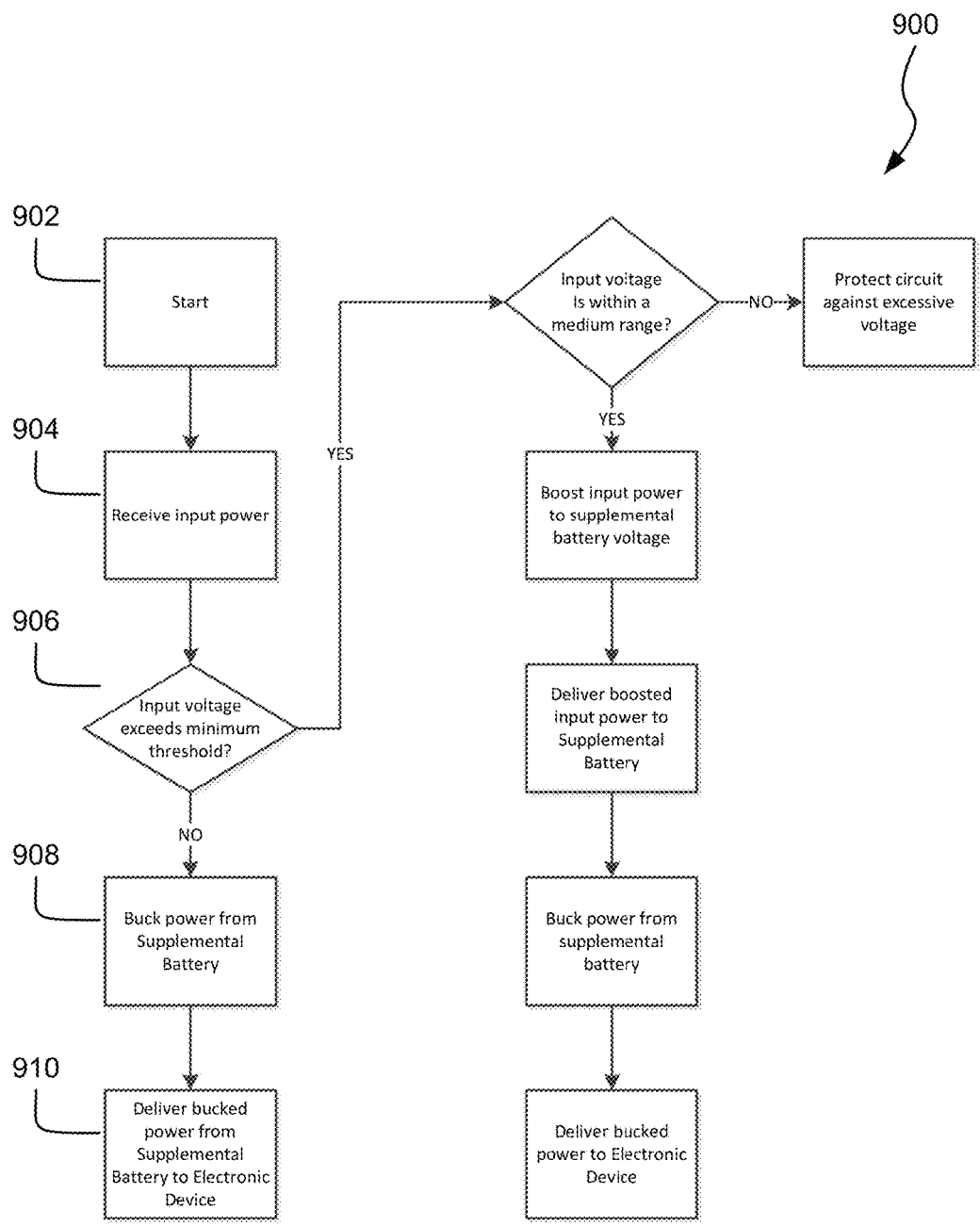
FIG. 9b is a flowchart of an example embodiment of a method for managing power.

FIG. 9b is a flowchart of an example embodiment of a method for managing power. This method 900 can be used when the output voltage to an electronic device 150 requires a lower voltage than what the supplemental battery 102 provides. For example, the electronic device 150 might require 5.1 V, and the supplemental battery 102 might contain two 4.5 V cells in series, combining for a total voltage of 9 V.

The method can start at block 902. At block 904, input power is received. At block 906, a determination can be made if the input voltage exceeds a minimum threshold, for example, 4.5 V. If the input voltage is less than the minimum threshold voltage, then at block 908, a supplemental battery 102 can provide power through a buck converter. At block 910, the bucked power can be delivered to electronic device 150.

If the input voltage exceeds the minimum threshold, then at block 912 it can be determined whether the input power voltage is within a low range, such as between 4.5V to 9 V. If the input voltage falls within the low range, then the input power can be boosted through a boost converter at block 914 to the voltage level of the supplemental battery 102, such as 9 V. At block 916, the boosted power can be delivered to the supplemental battery 102. At block 918, power from the supplemental battery 102 can then be bucked down to 5.1 V. At block 920, the power can be delivered at 5.1 V to the electronic device 150.

If the input voltage is not within the low range, then at block 922 it can be determined whether the input voltage is within a medium range, such as between 9V and 15 V. If the input voltage falls within the medium range, then the input power can be delivered to the supplemental battery 102 at block 924. From there, power from the supplemental battery 102 can be bucked down to 5.1 volts at block 918, and then the bucked power can be delivered to the electronic device 150 at block 920.

If the input voltage is not within the medium range, then an overvoltage problem can occur. At block 926, the circuit may protect the battery against the excessive input voltage, for example, by isolating the power input from the power source 180, or by isolating the battery by opening circuit switches, or through the use of fuses.

In some embodiments, the steps 906, 912, and 922 can be combined into one step for determining the input voltage, or can be performed in parallel.

Figure 10:
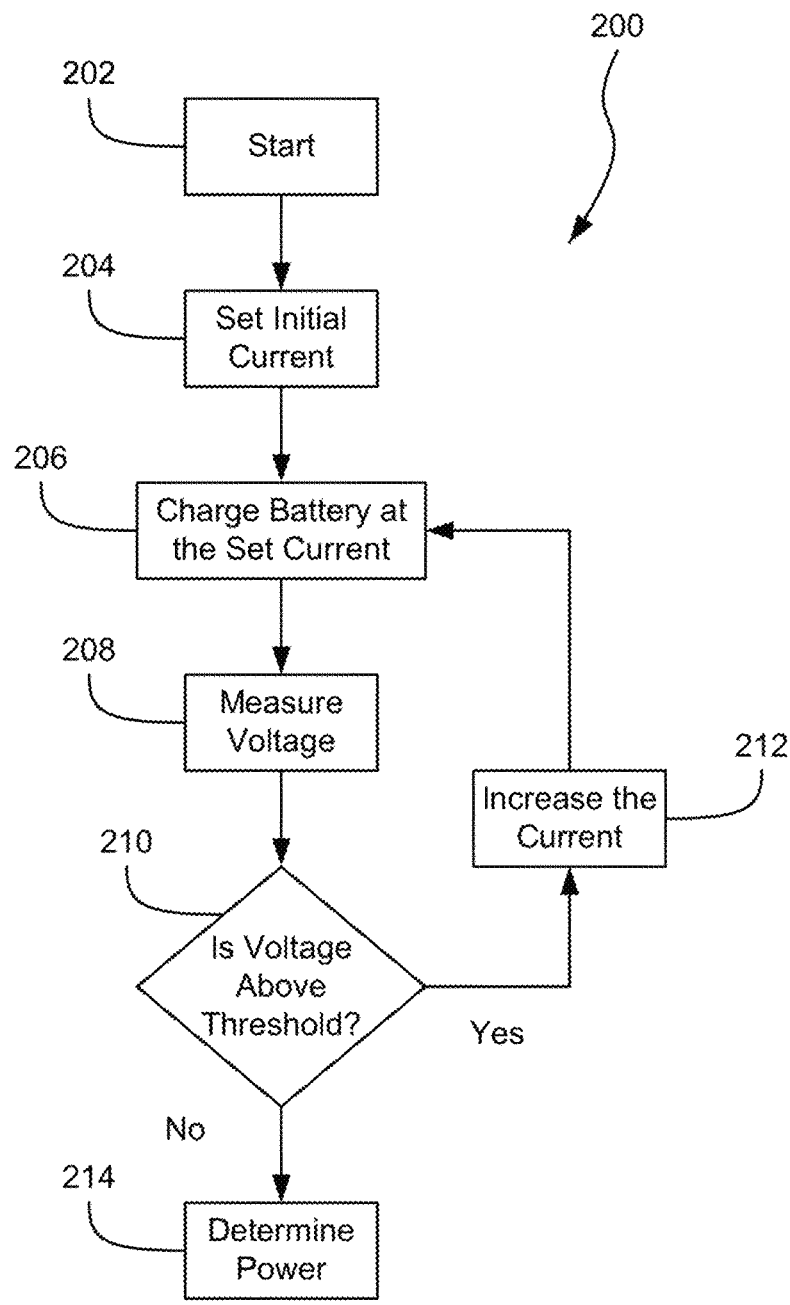
FIG. 10 is a flowchart showing an example embodiment of a method for determining power capacity of a power source.

FIG. 10 shows a flow chart of an example embodiment of a method 200 for determining the electrical power capacity of a power supply. The method 200 can be executed by the charging device 100, and the controller 104 can perform several of the functions described in the method 200. The method 200 starts at block 202. At block 204, an initial current value can be set. At block 206, the charging device 100 can charge the supplemental battery 102 using the initial level of current (e.g., set at block 104). At block 208, the voltage associated with the current delivered to the supplemental battery 102 can be measured. At block 210 the controller 104 can determine whether the measured voltage is above a threshold voltage value. A measured voltage above the threshold voltage value can indicate that the power supply is capable of providing electrical power at least equal to the value of the initial electrical current multiplied by the threshold voltage value. The electrical power P can be defined using the equation P=VI, wherein V is the voltage and wherein I is the electrical current.

When the voltage is above the threshold voltage value (at block 210), the method 200 can proceed to block 212, where the amount of current is increased. The method 200 can then return to block 206, where the charging device 100 can try to charge the supplemental battery 102 using the increased amount of electrical current. At block 208, the voltage associated with the increased amount of electrical current can be measured, and at block 210 the controller 104 can determine whether the measured voltage is above the threshold voltage value. If the measured voltage at the increased current is still above the threshold voltage value, the method 200 can again increase the current at block 212, and the process can repeat as described above. When the current has been raised to a value that causes the voltage to drop below the threshold value (at block 210) the method 200 can proceed to block 214, where the controller 104 can determine the electrical power capacity of the power supply. By way of example, the power capacity can be calculated using the highest current value that resulted in a voltage that was above the threshold voltage value. For example, the power capacity P of the power supply can be determined using P=VI, wherein V is the threshold voltage value, and wherein I is the highest current value that resulted in a voltage that was above the threshold voltage value. Many variations are possible. In some implementations, block 206 can include drawing electrical current from the power supply without charging the supplemental battery 102, and various types of variable loads can be used to draw different amounts of current for determining the capacity of the power supply, as described herein. In some embodiments, the method 200 can increase the current at block 212 by discrete incremental steps (e.g., by 50 milliamps or 100 milliamps) or the current can be increased continuously while the voltage is monitored continuously.

Figure 14:
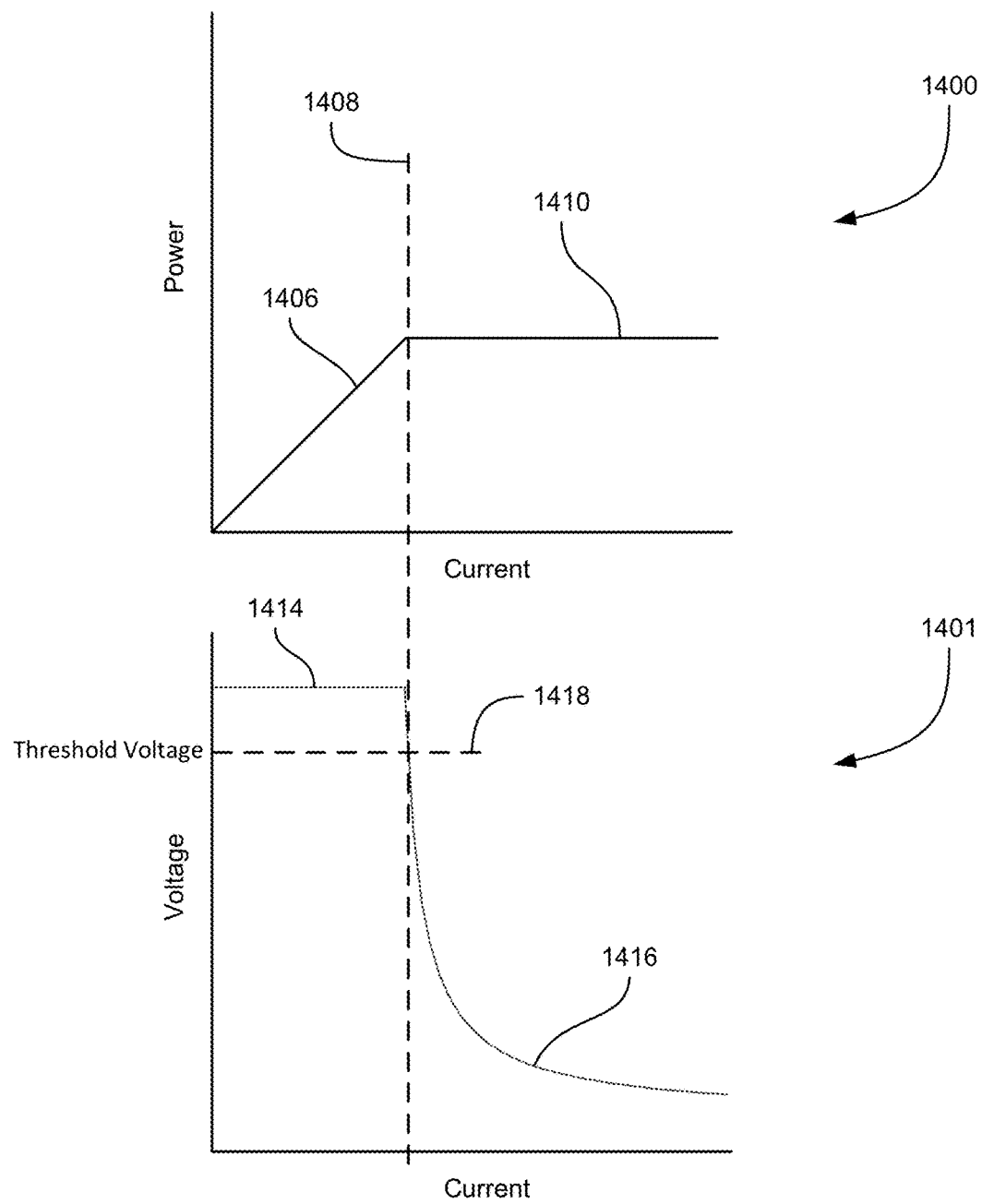
FIG. 14 is a graph showing an example of effects of drawing current from a power supply.

FIG. 14 includes graphs 1400 and 1401 showing an example of effects of drawing current from a power source. The graph 1400 shows current drawn from the power source 180 along the x-axis and the total power drawn from the power source 180 along the y-axis. The graph 1401 shows current drawn from the power source 180 along the x-axis and the voltage of the power drawn from the power source 180 along the y-axis.

As increased current is drawn from the power source 180 through block 212, the power supply is capable of providing a power at a steady voltage level 1414. As the current increases and steady power is provided, the total power provided by power source 180 increases (e.g., at a steady rate) at 1406 according to the formula P=IV. The system can draw additional current as long as the voltage provided by the power source is above the voltage threshold 1418.

When the power source 180 reaches a maximum power capacity as indicated by 1410, it cannot provide additional power. To maintain the maximum power as additional current is drawn from the power source 180, the voltage output will drop according to the relationship V=Pmax/I, where Pmax is the maximum power capacity of the power source 180, V is voltage, and I is the current. Accordingly, the voltage output of the power supply 180 at capacity when drawing increasing amounts of current is shown by line 1416.

When the voltage output of the power source 180 falls below the voltage threshold 1418, the power can be determined, either by measuring the power directly, or by measuring voltage and current and calculating P=IV. The threshold voltage 1418 can be set at the desired output voltage (e.g., the voltage at 1414), or it can be set at a voltage level below the desired voltage output to allow for small voltage fluctuations, as shown in FIG. 14.

With reference to FIG. 10, the charging device 100 can empirically determine the power capacity of an external power source 180 by incrementally increasing the amount of electrical power requested from the external power source 180 (e.g., for charging the supplemental battery 102 at incrementally higher currents), and by monitoring the power delivered to the charging device 100 from the external power source 180 to determine when the external power supply is unable to supply the requested electrical power. When the external power source 180 is unable to provide the requested electrical power, the determination can be made that the requested electrical power is above the capacity of the external power source 180. The output power capacity of the external power source 180 can be determined to be the highest output power that was successfully provided by the external power source 180 during the interrogation process (e.g., while the requested power was incrementally increased as described above).

It should be understood that the determined maximum power capacity of the external power source 180 might, in some instances, not be the complete maximum power capacity of the power source 180. In some embodiments, the system can be configured to incrementally increase the power drawn from the power supply, until it goes too far and exceeds the capacity of the power source, and the system can then scale back the electrical power by one increment and determine that power level to the maximum power capacity of the power source. Accordingly, in some instances, the power source might be capable of providing a small amount of additional electrical power above the determined maximum power capacity (e.g., depending on the amount of incremental power added at block 212).

By way of example, the charging device 100 can charge the supplemental battery 102 with a current of 500 milliamps, and the charging device 100 can determine whether the supplied voltage is at least 5 volts. If the supplied voltage is at least 5 volts, the power source 180 is capable of providing at least 2.5 watts of electrical power. The charging device 100 can then charge the supplemental battery 102 with a current of 600 milliamps, and the charging device 100 can determine whether the supplied voltage is at least 5 volts. If the power source 180 is able to provide 600 milliamps at 5 volts, the power capacity can be at least 3 watts. The process can be repeated using 700 milliamps, 800 milliamps, 900 milliamps, etc. The charging device 100 can charge the supplemental battery 102 using 1000 milliamps from the external power source 180, and can determine that the supplied voltage is at least 5 volts, which can indicate that the power capacity of the external power source 180 is at least 5 watts. Then the charging device 100 can try to charge the supplemental battery 102 at 1100 milliamps, and can determine that the supplied voltage is lower than 5 volts (the example threshold voltage value). This can indicate that the power capacity of the external power source 180 is below 5.5 watts. In the above example, the controller 104 can determine that the power capacity of the external power source 180 is 5 watts, because 1000 milliamps was the highest tested current for which the external power source 180 was able to supply a voltage of at least 5 volts (the example threshold voltage value).

In the above example, the charging device 100 is configured to increase the charging current by increments of 100 milliamps. The charging current can be increased by increments of various different values such as about 1 milliamp, about 5 milliamps, about 10 milliamps, about 25 milliamps, about 50 milliamps, about 100 milliamps, about 150 milliamps, about 200 milliamps, about 250 milliamps, or any values therebetween. Different increments of charging current can be used for different types of batteries. For example, batteries with different charge or discharge rates (e.g., C1 vs. C10 vs. C12 rated batteries) can use different increments of current. The current increment values provided above can, for example, be used for a 1 amp charger, whereas current increment values could be ten times larger, for example, for a 10 amp charger. In some embodiments, smaller incremental increases in the current can result in a more precise determination of the power capacity of the power source, and larger increments in current can result in faster power determinations.

Many variations are possible. For example, in some embodiments, an algorithm can be used to test the power supply at various power levels (e.g., using various current values), which can be above or below the power capacity level, instead of incrementally raising the current. For example, the charging device 100 can charge the supplemental battery 102 at 500 milliamps and can determine that the supplied voltage is at least 5 volts. The charging device 100 can then to charge the supplemental battery 102 at 1000 milliamps and can determine that the voltage is at least 5 volts. The charging device 100 can then try to charge the supplemental battery 102 at 1500 milliamps and can determine the supplied voltage is below 5 volts. The charging device 100 can then try to charge the supplemental battery 102 at 1200 milliamps and can determine that the voltage is above 5 volts. The charging device can then try to charge the supplemental battery 102 at 1300 milliamps and can determine that the supplied voltage is below 5 volts. In the above example, the controller can determine that the power output capacity of the power source 180 can be between 6 watts and 6.5 watts. Depending on the desired level of precision, the charging device 100 can continued to apply the algorithm to try one or more additional current values between 1200 milliamps and 1300 milliamps. Once a desired level of precision is obtained, the controller can determine the output electrical power capacity of the external power supply 180, which can be determined based in the highest tested level of current that was able to be provided with a voltage of at least 5 volts (which is the example voltage threshold value in this example).

Using an algorithm to test different power levels (e.g., by delivering different currents to the supplemental battery 102 or to some other variable load device) can be advantageous over a system that merely incrementally increases the power level (e.g., by incrementally increasing the current delivered to the supplemental battery 102 or to some other variable load device), because embodiments that utilize an algorithm can, in some instances, produce a more precise power capacity determination with fewer test cycles. Many different algorithms can be used to determine how much to increase or decrease the current during each test cycle. Generally, the amount that the current is increased and/or decreased gets smaller as the algorithm narrows down the range of the power capacity level. In some embodiments, the algorithm can adjust the drawn current by analog values (e.g., continuous change to the current). In some embodiments, the algorithm can adjust values at discrete increments.

In some embodiments, the charging device 100 can determine a maximum power capacity of the power supply 180 (e.g., empirically as described herein) and can draw the maximum amount of power possible from a power source 180. An electronic device 150 might not be able to utilize the maximum amount of power possible from the power source 180. This can occur, for example, when the power source 180 is capable of delivering more power than the electronic device 150 can support. It can also occur, for example, when the power source 180 can deliver a range of power outputs and the electronic device 150 cannot negotiate with the power source 180 to select the optimum power output. In these examples, the charging device 100 can act as a middleman or negotiator to maximize power draw from the power source 180, deliver power to the electronic device 150, and charge the supplemental battery 102 with any excess current.

Figure 11:
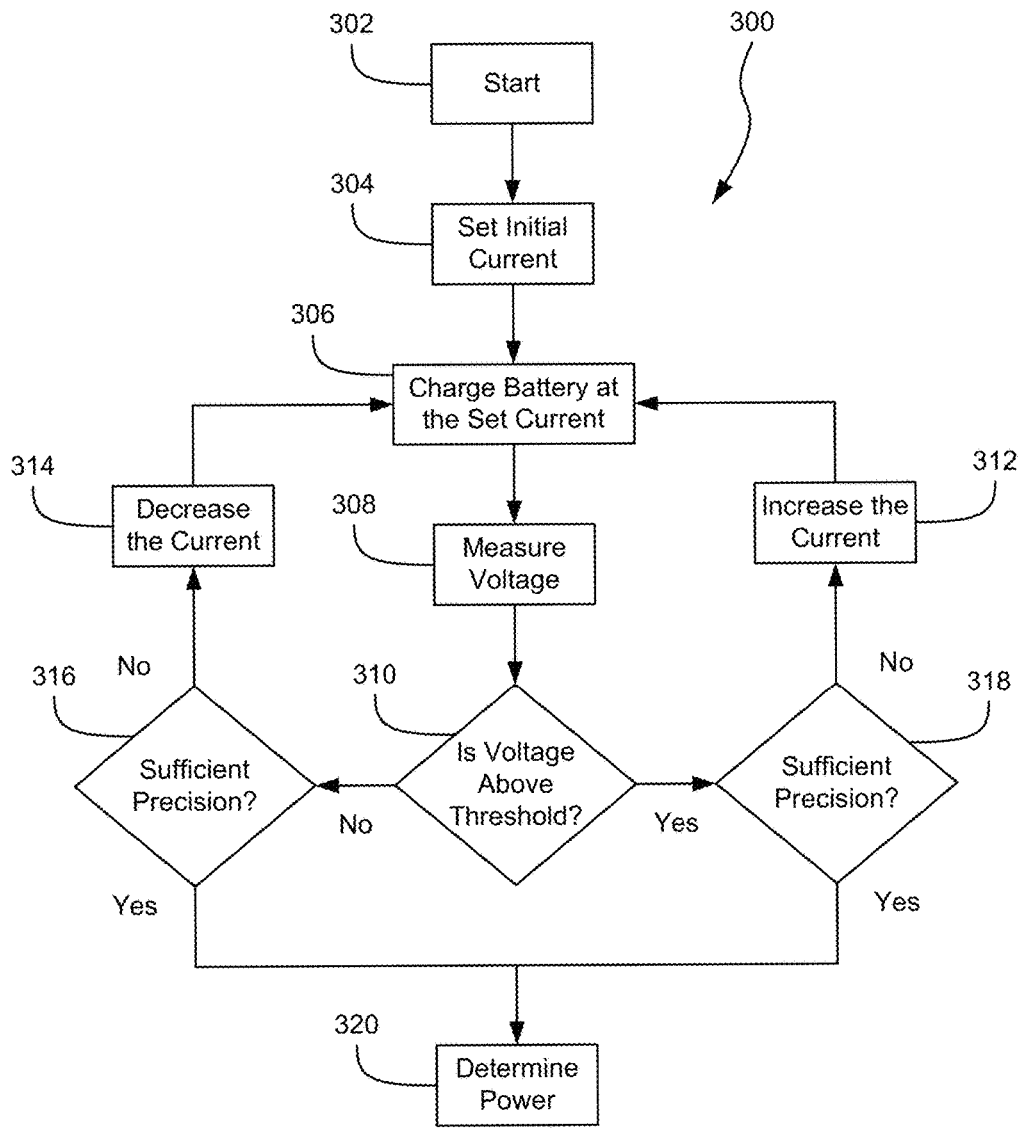
FIG. 11 is another flowchart showing an example embodiment of a method for determining power capacity of a power source.

FIG. 11 is a flowchart showing an example embodiment of a method 300 for determining the power output capacity for an electrical power supply. The method 300 can be similar to, or the same as, the method 200 in some ways. The method 300 can start at block 302. At block 304 an initial current value can be set. At block 306, the charging device 100 can charge the supplemental battery 102 with current supplied by the power supply at the set current value. At block 308, the voltage associated with the current charging the supplemental battery 102 can be measured. At block 310, the controller 104 can determine whether the voltage is above the threshold voltage value. If the measured voltage is above the threshold voltage value, the method 300 can increase the current at block 312, and the method can return to block 306 to repeat the process. If the measured voltage below the threshold value at block 310, the current can be decreased at block 314, and the method 300 can return to block 306 to repeat the process. The algorithm can start by making relatively large changes to the current at blocks 312 and 314, and the algorithm can reduce the amount that the current is changed at blocks 312 and 314 as the process begins to close in on the power capacity limit of the power source 180. In some embodiments, the method 300 can check (at blocks 316 and/or 318) whether sufficient precision has been reached before proceeding to change the current (at blocks 312 and/or 314). If sufficient precision has been achieved (e.g., if the difference between the current tested above the threshold voltage level and the current tested below the threshold voltage level is below a threshold precision value), the method 300 can proceed to block 320 and the controller 104 can determine the power capacity of the power source 180. For example, the power capacity of the power source 180 can be determined based on the highest value of current that supplied a voltage over the threshold voltage value. Various levels of precision can be achieved. For example, the methods 200 and/or 300 can be used to identify the power capacity limit of the power source 180 to within about 2 watts, to within about 1 watt, to within about 0.75 watts, to within about 0.5 watts, to within about 0.25 watts, to within about 0.15 watts, to within about 0.1 watts, or any values therebetween.

Many variations are possible. In some embodiments, charging the supplemental battery 102 can be used as the load to draw electrical power from the power source 180 (e.g., as discussed in connection with FIGS. 10 and 11). However, in some embodiments, other loads can be used to empirically determine the power capacity of the power source 180 instead of charging the supplemental battery 102. For example, current can be delivered to a resistor or other feature in the charging device, instead of to the supplemental battery 102. In some embodiments, the power capacity of the power source 180 can be tested by boosting and/or bucking the voltage to different test voltage levels (e.g., using one or more adjustable voltage modifiers), and the current can be monitored to determine whether the currents supplied at the various test voltages are above or below a threshold current value.

The charging device 100 can be configured to store the determined power capacity level of the external power source 180 in the memory 106. The controller 104 can use the power capacity information in operation of the charging device 100. For example, the controller 104 can determine how much current to deliver to the output interface 112 (e.g., from the input interface 110, along the bypass electrical pathway, for charging the mobile electronic device 150) and/or how much current to deliver to the supplemental battery 102 (e.g., from the input interface 110 and along the charging electrical pathway) based at least in part on the power output capacity of the external power source 180. For example, in some embodiments, the charging device 100 can receive electrical power from the external power source 180 at the input interface 110, and the charging device 100 can deliver a charging current to the output interface 112 (e.g., via the bypass electrical pathway). If the controller 104 determines that the power capacity of the power source 180 is low enough that the charging current is less than the current capacity of the mobile electronic device 150, the controller 104 can provide additional current to the output interface 112 from the supplemental battery 102 (e.g., via the discharge electrical pathway). If the controller 104 determines that the power capacity of the power source 180 is high enough that the charging current delivered to the output interface 112 from the bypass electrical pathway can be higher than the current capacity of the mobile electronic device 150, the controller 104 can send some or all of the excess current to the supplemental battery 102 (e.g., via the charging electrical pathway). In some embodiments, the bypass electrical pathway can be disabled or unused while the charging device 100 performs the empirical interrogation of the power source 180.

Figure 12:
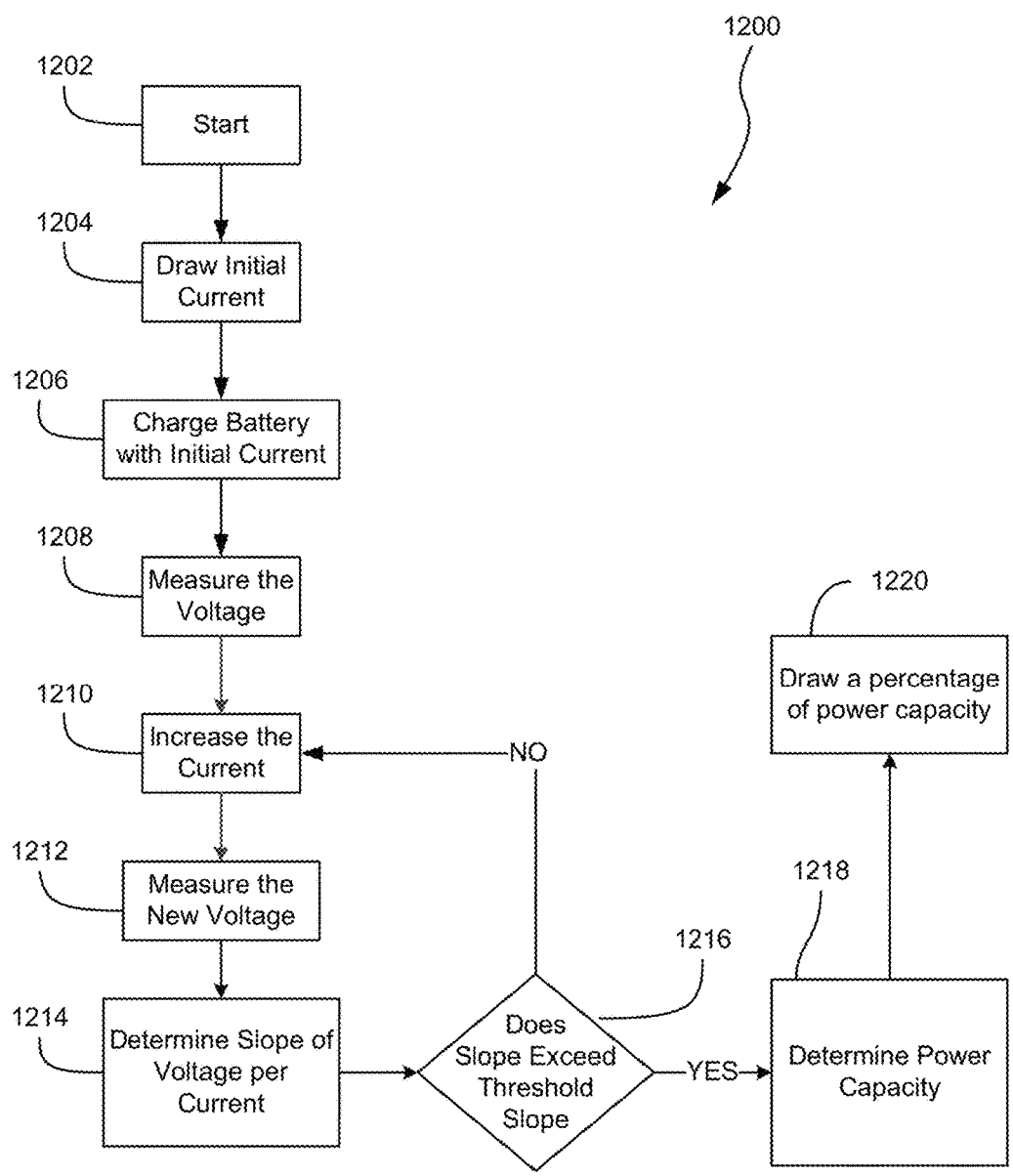
FIG. 12 is another flowchart showing an example embodiment of a method for determining power capacity of a power source.

FIG. 12 is another flowchart 1200 showing an example embodiment of a method for determining power capacity of a power source. The method 1200 can be similar to, and the same as, methods 200 and 300 in some ways. The method 1200 can operate to determine when the power source 180 reaches a maximum output capacity by adjusting a variable resistance to draw more and more current from the power source while measuring the change in the voltage supplied by the power source 180 per change in current. The method can then determine a maximum output power based at least in part on the value of the slope.

The method 1200 can start at block 1202. At block 1204, an initial current is drawn from the power source 180. At block 1206, the supplemental battery 102 is charged with the initial current drawn from the power source 180. At block 1208, the voltage provided by the power source 180 is measured. At block 1210, the current drawn from the power source 180 is increased. At block 1212, the new voltage level of the power source 180 is measured while the increased current is drawn from the power source. At block 1214, the slope of the voltage per current is determined. For example, the slope can be dV/dI where dV is the change in voltage from block 1208 to block 1212 and dI is the change in current from block 1204 to block 1210. At block 1216, a determination is made if dV/dI exceeds a threshold slope. In some embodiments, the threshold slope may be a set number. In some embodiments, the threshold slope may be defined with reference to a previously measured slope value, for example, 110% of a previously measured slope value. In some embodiments, the voltage, current, power, and slope can be adjusted in discrete increments, and in some embodiments, the voltage, current, power, and slope can be adjusted and deterred continuously or as analog values.

If the threshold is not exceeded, then the method returns to block 1210, where the current is increased. Then in block 1212, a new voltage is measured. At block 1214, a new value for the slope (e.g., dV/dI) is calculated (e.g., where dV represents the change in voltage and dI represents the change in current). In some embodiments, the change in voltage can be from the voltage measured at the previous block 1212 to the voltage measured at the latest block 1212.

In some embodiments, the change in voltage can be from the voltage measured at block 1208 to the voltage measured at the latest block 1212. In some embodiments, the change in current can be the amount of current increased at block 1210. In some embodiments, the change in current can be the amount total current increased since drawing the initial current at block 1204.

If the threshold is exceeded, then the power capacity is determined at block 1218. The power capacity can be determined according to the formula P=IV, where I is the amount of current being drawn from the power source 180, and V is the amount of voltage being provided by the power source 180. The voltage and current can be the last voltage and current that was drawn from the power source 180 before the threshold slope was exceeded, the voltage and current drawn from the power source 180 that caused the slope to be exceeded, or anywhere in between those two values, for example.

For example, if the method proceeds through blocks 1202, 1204, 1206, 1208, 1210, 1212, 1214, and 1216 to determine that the slope exceeds the threshold slope, then at block 1218, the power capacity can be determined based on the initial current drawn at block 1204 and the voltage measured at block 1208. In another example, if the method proceeds through blocks 1202, 1204, 1206, 1208, 1210, 1212, 1214, and 1216 to determine that the slope exceeds the threshold slope, then at block 1218, the power capacity can be determined based on the increased current drawn at block 1210 and the new voltage measured at block 1212. Alternatively, the power can be determined based a value between the voltage values used in the two prior examples, the current can be determined based on a value between the current values used in the two prior examples, or the power can be determined to be a value between the power amounts determined in the two prior examples.

For example, if the method proceeds through blocks 1202, 1204, 1206, 1208, 1210, 1212, 1214, 1216, 1210 again, 1212 again, 1214 again, and 1216 again to determine that the slope exceeds the threshold slope, then at block 1218, the power capacity can be determined based on the initial current drawn at block 1210 and the voltage measured at block 1212. In another example, if the method proceeds through blocks 1202, 1204, 1206, 1208, 1210, 1212, 1214, 1216, 1210 again, 1212 again, 1214 again, and 1216 again to determine that the slope exceeds the threshold slope, then at block 1218, the power capacity can be determined based on the initial current drawn at block 1210 again and the voltage measured at block 1212 again. Alternatively, the power can be determined based a value between the voltage values used in the two prior examples, the current can be determined based on a value between the current values used in the two prior examples, or the power can be determined to be a value between the power amounts determined in the two prior examples.

At block 1220, a percentage of the power capacity of the power source 180 is drawn. The percentage can be 100% to maximize power draw at the highest possible voltage. In other embodiments, the percentage can be less than 100% in order to reduce strain on the power source, or to account for small changes in the power output. The power is drawn from the power source 180 to charge the supplemental battery 102, the electronic device 150, or both.

Many variations to the method 1200 of FIG. 12 are possible. For example, in some embodiments, the current is not used to charge the supplemental battery 102. For example, any variable load device or component can be used to draw different amounts of current to implement the method 1200 of FIG. 12.

Figure 16:
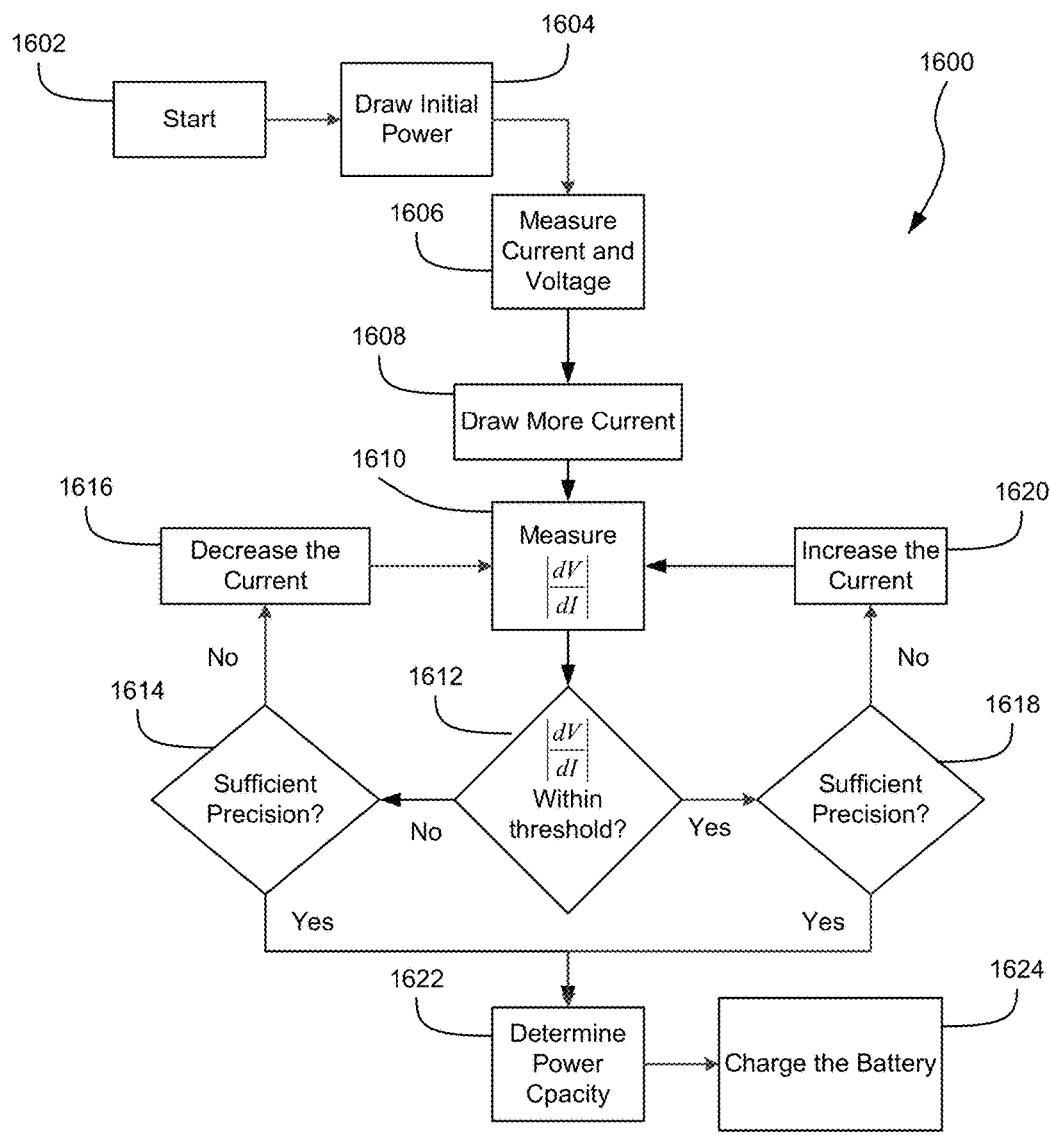
FIG. 16 is a flowchart showing another example embodiment of a method for determining power capacity of a power source.

FIG. 16 is a flowchart showing another example embodiment of a method 1600 for determining power capacity of an electrical power source 180. The method 1600 can be similar to, or the same as, methods 200, 300, and 1200 in some ways. The method 1600 can start at block 1602. At block 1604, power can be drawn from the power source 180. At block 1606 the current and voltage of the power drawn from the power source 180 can be measured. At block 1608, more current can be drawn from the power source 180.

At block 1610, the value of the slope of voltage per current is determined, which can be dV/dI, where dV represents the change in voltage from block 1604 to block 1608, and dI represents the change in current from block 1604 to block 1608. At block 1612, a comparison can be made to determine if the slope (e.g., dV/dI) is within a threshold slope limit.

If the measured slope (e.g., dV/dI) is within (e.g., below) the threshold slope limit, then it can be determined if power capacity can be calculated with sufficient precision at block 1618 based on the information voltage and current output information about the power source 180 so far. If not, then at block 1620, the current drawn from the power source 180 is increased. The blocks 1610 and 1612 can be repeated again, where a new slope (e.g., dV/dI) is measured that accounts for the newly increased current at 1620. In some embodiments, the new slope dV/dI can be calculated where dV represents the change in voltage from when the initial power was drawn at block 1604 to the voltage level when increased current was drawn at 1620, and dI represents the change in current from when power was drawn at block 1604 and after increased current was drawn at block 1620. In some embodiments, the new slope dV/dI can be calculated based on the most recent measurements of voltage and current, where dV represents the change in voltage from when more current was drawn at block 1608 to the voltage level when increased current was drawn at 1620, and dI represents the change in current from when power was drawn at block 1608 and after increased current was drawn at block 1620. In some embodiments, the two or more new current and voltage values can be generated and used to determine the new slope (e.g., dV/dI) at block 1610.

The loop for measuring the slope (e.g., dV/dI) at block 1610, determining if the measured slope (e.g., dV/dI) is within a threshold limit for the slope (e.g., dV/dI) at block 1612, and increasing the current at block 1620 if the measured slope (e.g., dV/dI) is within the limit for the slope (e.g., dV/dI) or decreasing the current at block 1616 if the measured slope (e.g., dV/dI) is above or outside the slope threshold, can be repeated (e.g., until sufficient precision is obtained). In some embodiments, the most recent measurements of voltage and current will be from block 1616 or 1620 of a previous loop, or new voltage and current values can be generated for each slope determination.

If the measured slope (e.g., dV/dI) is exceeds the threshold limit of the slope (e.g., dV/dI), then a determination occurs at block 1614 if the power capacity can be calculated with sufficient precision at block 1614 based on the information voltage and current output information about the power source 180 so far. If not, then at block 1616, the current drawn from the power source 180 is decreased. The blocks at block 1610 and 1612 can be repeated again, where a new slope (e.g., dV/dI) is measured that accounts for the newly decreased current at 1616. In some embodiments, the new slope (e.g., dV/dI) can be calculated where dV represents the change in voltage from when the initial power was drawn at block 1604 to the voltage level when decreased current was drawn at 1616, and dI represents the change in current from when power was drawn at block 1604 and after decreased current was drawn at block 1616. In some embodiments, the new slope (e.g., dV/dI) can be calculated based on the most recent measurements of voltage and current, where dV represents the change in voltage from when more current was drawn at block 1608 to the voltage level when decreased current was drawn at 1616, and dI represents the change in current from when power was drawn at block 1608 and after decreased current was drawn at block 1616. In some instances multiple new current and voltage values can be generated and used to determine the new slope (e.g., dV/dI). The loop for measuring the slope (e.g., dV/dI) at block 1610, determining if the measured slope (e.g., dV/dI) is within a threshold limit for the slope (e.g., dV/dI) at block 1612, and decreasing the current at block 1616 if the measured slope (e.g., dV/dI) is within the limit for the slope (e.g., dV/dI) or increasing the current at block 1620 if the slope (e.g., dV/dI) is above or outside the slope threshold, can be repeated (e.g., until sufficient precision is reached). In some embodiments, the most recent measurements of voltage and current will be from block 1616 or 1620 of a previous loop, or new current and voltage values can be generated for each slope determination.

The algorithm can start by making relatively large changes to the current at blocks 1616 and 1620, and the algorithm can reduce the amount that the current is changed at blocks 1616 and 1620 as the process begins to close in on the power capacity limit of the power source 180. This can increase the precision until the power capacity can be calculated with a sufficient precision.

If sufficiently precise measurements have been taken at either block 1614 or block 1618 to enable a sufficiently precise calculation of the power capacity, then the maximum power of the power source 180 can be determined at block 1622 by measuring the power, or by calculating power by measuring voltage and current, or using the current and voltage values used to determine the slope.

In some embodiments, after exceeding the threshold slope limit, the current can be decreased by a small increment, and the slope (e.g., dV/dI) can be recalculated each time until it falls back within the threshold slope limit. Then, the current can be increased by an even smaller amount until the slope (e.g., dV/dI) exceeds the threshold slope limit again. This process can continue while the amount that the current is increased and/or decreased gets smaller and smaller as the process narrows down to the power capacity limit of the power source.

Once the maximum power has been determined, the system can charge the supplemental battery 102, a battery of the electronic device 150, or both utilizing the maximum power available (or some percentage thereof) at block 1624. For example, the power supply can deliver delivering power at the power capacity at the highest possible voltage for which the power source is compatible. In some embodiments, charging the battery at block 1624 can occur at a percentage of the maximum power capacity or at a percentage of the highest voltage, where the percentage is less than 100%. This prevents over exerting the power supply at its maximum capacity, and/or can account for small variations in the power output from the power source.

In some embodiments, the slope (e.g., dV/dI) is represented as a magnitude. In other embodiments, the slope (e.g., dV/dI) is not calculated as a magnitude, and the slope (e.g., dV/dI) threshold is correspondingly represented to have positive or negative limits. In some embodiments, an actual number is calculated for slope (e.g., dV/dI) and/or the threshold for the slope (e.g., dV/dI), and the comparison at block 1612 can be made using a numerical comparator. In some embodiments, the slope (e.g., dV/dI) and/or the threshold for the slope (e.g., dV/dI) are not calculated as a number, but instead can be represented as analog signals, and the comparison at block 1612 can be determined using an analog comparator.

The methods shown in FIG. 10, FIG. 11, FIG. 12, and FIG. 16 can be used separately, in parallel, or combined in order to interrogate a power source 180 to determine the actual power capacity, especially when the actual power capacity differs from a manufacturer's stated power capacity. Each method can yield a slightly different result from the other methods, and a final determination of the power capacity can be based on one or more of the different results.

Figure 15:
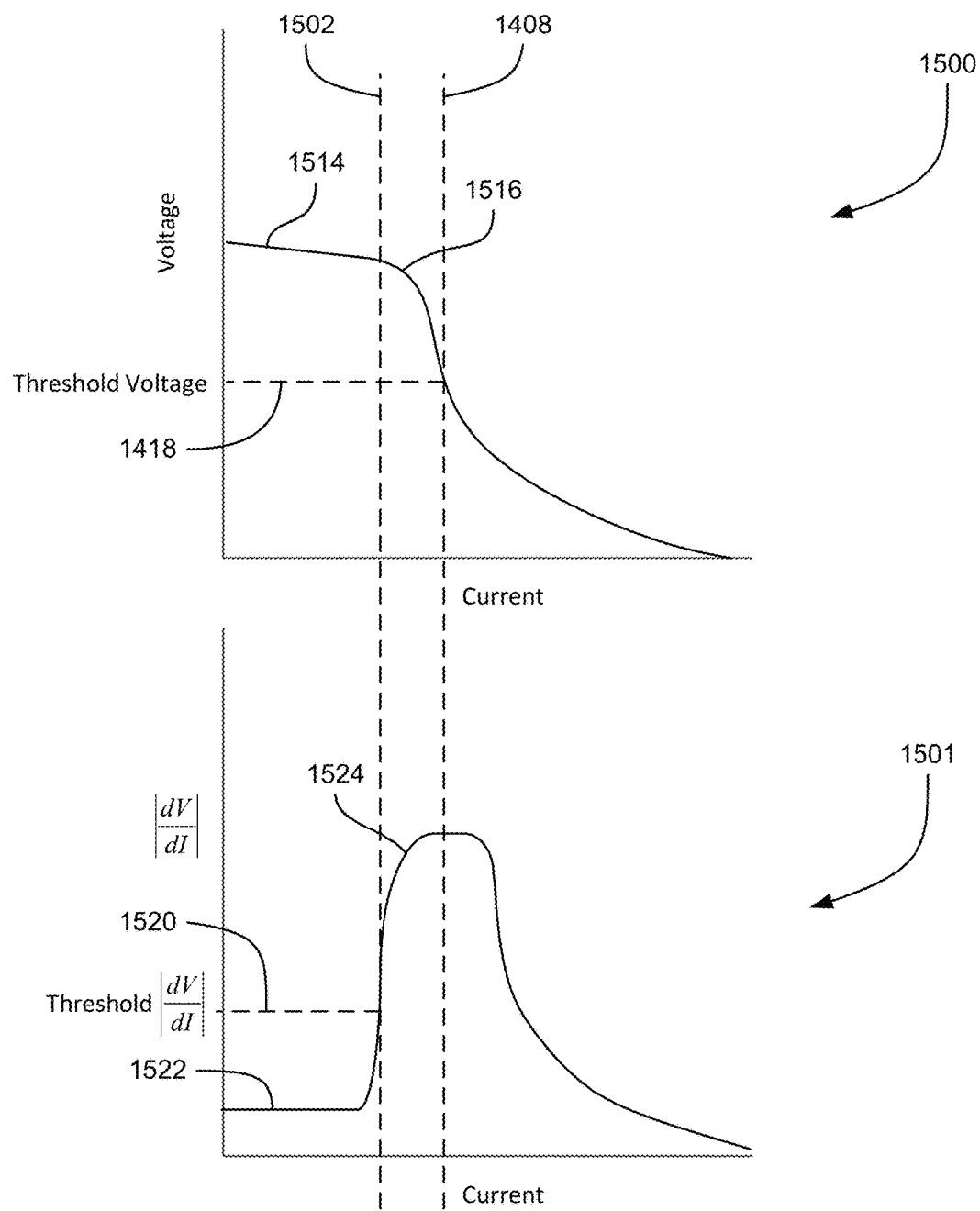
FIG. 15 is another graph showing an example of effects of drawing current from a power supply.

FIG. 15 includes additional graphs 1500 and 1501 showing an example of effects of drawing current from a power supply. FIG. 15 helps to explain certain parts of the method in FIG. 16 in comparison with the methods in FIGS. 10 and 11 that utilize a voltage threshold. The graph 1500 represents current drawn from the power source 180 along the x-axis and the voltage of power drawn from the power source 180 along the x-axis. The graph 1501 shows the current drawn from the power source along the x-axis and the magnitude of the change in voltage per change in current drawn from the power source 180 (e.g., the slope) along the y-axis. Graph 1501 shows the magnitude of the slope for (dV/dI) at various current values.

As increased current is drawn from the power source 180 (e.g., through block 1210 of FIG. 12), the power supply is capable of providing a power at a generally stable voltage level near line section 1514. This voltage level can decrease at a small rate, and has a small slope value as shown by line section 1522.

As additional current is drawn from the power supply (e.g., at block 212, 312, 1210, and 1620), the power supply begins to reach capacity around line section 1516. The slope (e.g., the rate of dV/dI) increases as shown by line segment 1524 on the graph 1501. When the amount of current indicated by the dotted line 1502 is drawn from the power supply, the slope (e.g., dV/dI) can exceed a threshold value for the slope (e.g., dV/dI) 1520. When even more current is drawn past the amount indicated by 1502, the voltage output by the power supply will continue to fall. When the amount of current indicated by the dotted line 1408 is drawn from the power supply, the voltage can fall below a threshold voltage level 1418.

The threshold for the slope (e.g., dV/dI) 1520 can be set higher than the slope (e.g., dV/dI) value of line segment 1522. This allows for some fluctuations. In some embodiments, the slope threshold (e.g., dV/dI threshold) can be closer or equal to the slope (e.g., dV/dI) value of line segment 1522.

In some embodiments, the slope threshold (e.g., dV/dI threshold) 1522 can be exceeded before the voltage of the power source 180 drops below the threshold voltage value 1418. In some embodiments, the threshold for the slope (e.g., dV/dI) 1522 can be exceeded at the same time as, or after the voltage of the power source 180 drops below the threshold voltage value 1418.

In order to determine the power capacity of the power supply (e.g., at 214, 320, 1218, and/or 1622), one or both of the amounts of current drawn at 1502 and 1408 can be taken into account. The power capacity can be calculated using the voltage and current at 1502 and 1408 or in anywhere in between the range of currents 1502 and 1408 or at a value where the current is below 1502 or below 1408.

Figure 17:
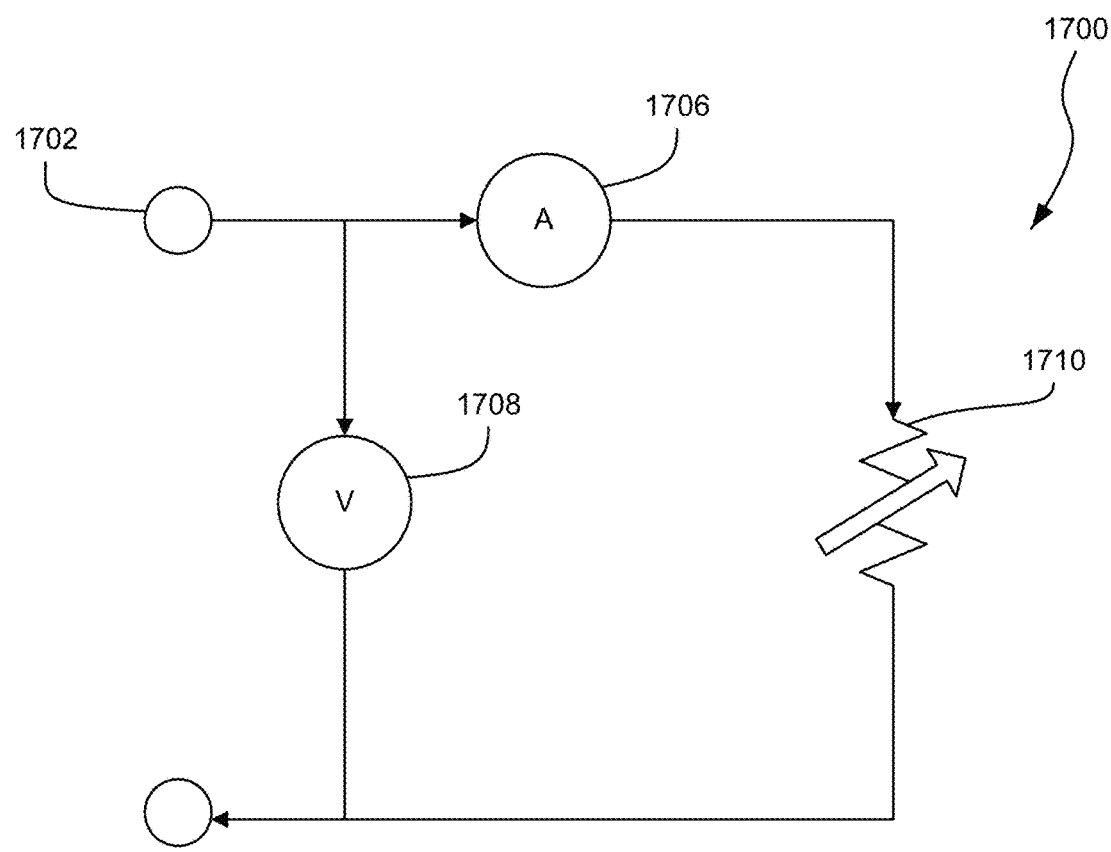
FIG. 17 is a schematic view of an example circuit for measuring voltage and current.

FIG. 17 is a schematic view of an example circuit 1700 for interrogating a power source, as disclosed herein. Power can be received from the power source 180 at input 1702. A voltmeter 1708 can measure a voltage, and an ammeter 1706 can measure current. A variable load 1710 can be used to change resistances or to otherwise draw more or less current from the power source 180. The variable load 1710 can be the supplemental battery 102, which can be charged at different currents. A number of other circuits for drawing currents can be used. The circuit 1700 can be used to implement the methods 200, 300, 1200, 1600, or to otherwise empirically interrogate a power source to determine the power output capacity of the power source, as described herein. Many variations are possible. For example, in some instances, the ammeter 1706 can be omitted, and the current can be determined based on the voltage and the setting of the variable load 1710.

With reference again to FIG. 1, in some embodiments, the charging device 100 can include one or more temperature sensors 142. For example, the charging device 100 can include one or more external temperature sensors configured to measure an external temperature outside the charging device 100, and/or the charging device 100 can include one or more internal temperature sensors configured to measure one or more internal temperatures at one or more locations inside the charging device. The one or more internal temperature sensors can be configured to measure the temperature at or near the supplemental battery 102, at or near the controller 104, at or near the input interface 110, at or near the output interface 112, at or near one or both of the voltage modifiers 120 and/or 124, and/or at other locations in the charging device 100 that are susceptible to heat. The one or more temperature sensors 142 can include one or more thermistors, for example, although other types of temperature sensors can also be used.

The controller 104 can use the temperature information from the one or more temperature sensors 142 in operating the charging device 100. For example, the controller 104 can reduce the electrical current if a temperature rises above a threshold temperature level. In some embodiments, the controller 104 can disable the charging device 100, or some functionality thereof, if a temperature is outside an acceptable range, above a threshold temperature value, or below a threshold temperature value.

Figure 13A:
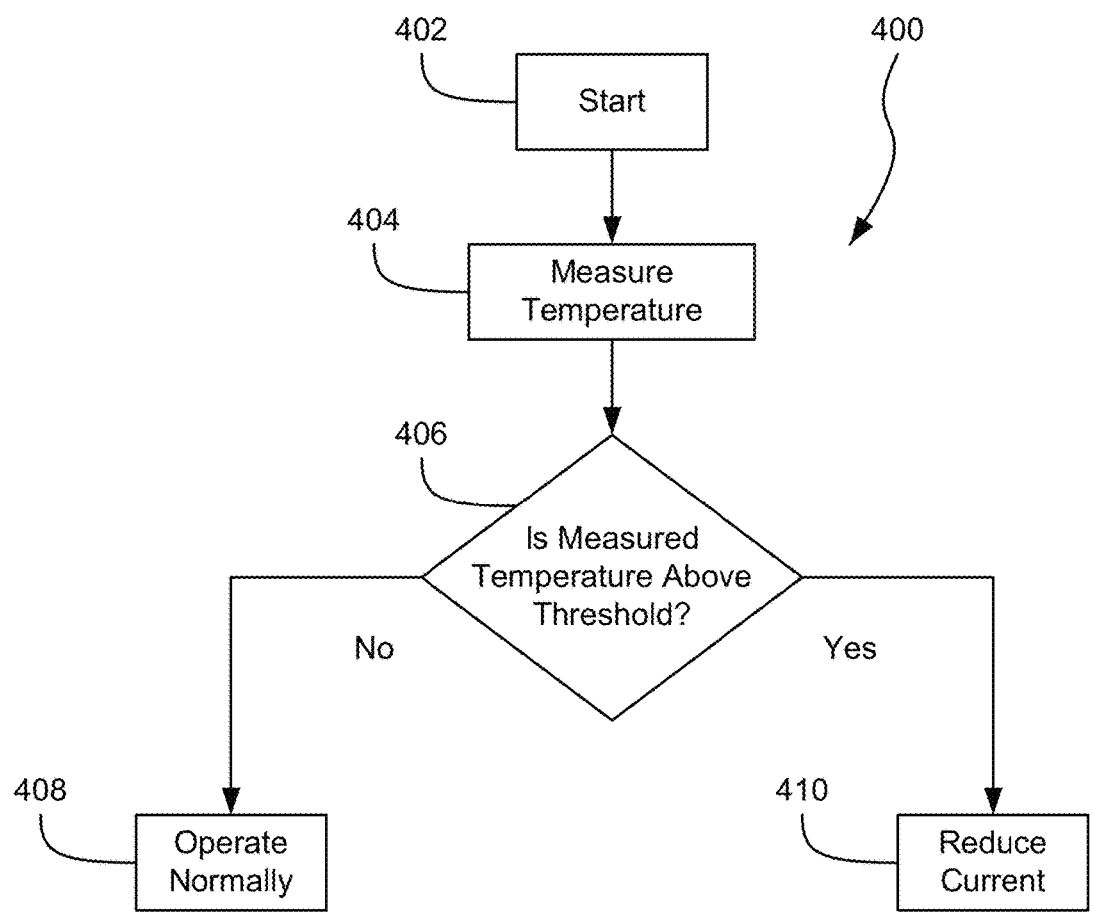
FIG. 13a is a flowchart showing another example embodiment of a method for managing heat in a charging device.

FIG. 13a is a flowchart showing an example embodiment of a method 400 for managing heat in a charging device 100. The method 400 can start at block 402. At block 404, a temperature can be measured (e.g., using the one or more temperature sensors 142). If the measured temperature is below a threshold temperature value at block 406, the charging device 100 can operate normally at block 408. For example, the charging device 100 can use the maximum amount of electrical current that is available for charging the supplemental battery 102 and/or for charging the mobile electronic device 150 (e.g., via the output interface 112). In some embodiments, the charging device 100 can operate normally at block 408 by delivering electrical charge to the supplemental battery 102 and/or to the mobile electronic device 150 at the full charge rate of the supplemental battery 102 and/or of the mobile electronic device 150. In some embodiments, the charging device 100 can monitor the temperature at one or more locations continuously or periodically. If a temperature measured at block 404 is determined to be above a threshold temperature value at block 406, the controller 104 can reduce electrical current at block 410. The controller 104 can use a formula or a lookup table (which can be stored in memory 106) to determine how much to reduce the electrical current at block 410.

In some embodiments, the reduction of the electrical current can depend at least in part on the amount of time that the measured temperature is above the threshold temperature level. For example, in some cases, the current is not reduced until the temperature has been above the threshold temperature value for an amount of time. The amount of time that the temperature can be above the threshold before the reduction of current can be a lower amount of time depending on how far the measured temperature is above the threshold value, and if the temperature is high enough over the threshold value, the electrical current can be reduced at 410 without delay. In some embodiments, the electrical current can be reduced at block 410 when the measured temperature goes above the threshold (e.g., without delay).

The method 400 can be applied to measured internal temperatures and/or measured external temperatures. In some embodiments, the method 400 can be applied to temperatures measured at multiple locations. For example, temperature sensors can monitor the temperature at various locations inside the charging device 100, as discussed above. In some embodiments, the controller 104 can be configured to reduce electrical current 410 for a particular area or component in the charging device 100 that is associated with the temperature sensor 142 that reports the temperature above the threshold. For example, if a temperature sensor associated with the supplemental battery 102 reports a temperature that is above the threshold temperature value, the electrical current delivered to the supplemental battery 102 (e.g., via the charging electrical pathway) can be reduced and/or the electrical current output from the supplemental battery 102 (e.g., via the discharge electrical pathway) can be reduced. In some cases, the electrical current to or from the supplemental battery 102 can be reduced while the electrical current delivered to the mobile electronic device 150 (e.g., via the bypass electrical pathway) is not reduced. Accordingly, in some embodiments, the charging device 100 can be configured to manage temperatures at specific locations, areas, or components without unnecessarily limiting the functionality of other aspects of the charging device 100. In some embodiments, the electrical current can be reduced for one location or component and the electrical current can be raised for a different location or component, such that electrical power capacity is not wasted. For example, if a temperature sensor 142 indicates that the bypass electrical pathway is above the threshold temperature value, the current on the bypass electrical pathway can be reduced and the current along the charging electrical pathway can be increased. In some embodiments, the electrical current along two or more of the charging electrical pathway, the discharge electrical pathway, and the bypass electrical pathway can be reduced together (e.g., proportional current reduction, equal current reduction, etc.). By way of example, if a temperature sensor 142 measures a temperature that is above the threshold level, the electrical current along the bypass electrical pathway (e.g., for charging the mobile electronic device 150) and the current along the charging electrical pathway (e.g., for charging the supplemental battery 102) can both be reduced. Both currents can be reduced by the same amount (e.g., a reduction of 100 milliamps, 200 milliamps, 300 milliamps, etc. for both the bypass electrical pathway and the charging electrical pathway. Both current can be reduced proportionally (e.g., the current of the bypass electrical pathway and the charging electrical pathway can be reduced by 10%, 15%, 20%, 25%, etc.) In some embodiments, different temperature thresholds can be used for different temperature sensors 142. Accordingly, for components that are more fragile, a lower temperature threshold can be used. In some embodiments, the current can be further reduced if the measured temperature stays above the threshold temperature value.

Figure 13B:
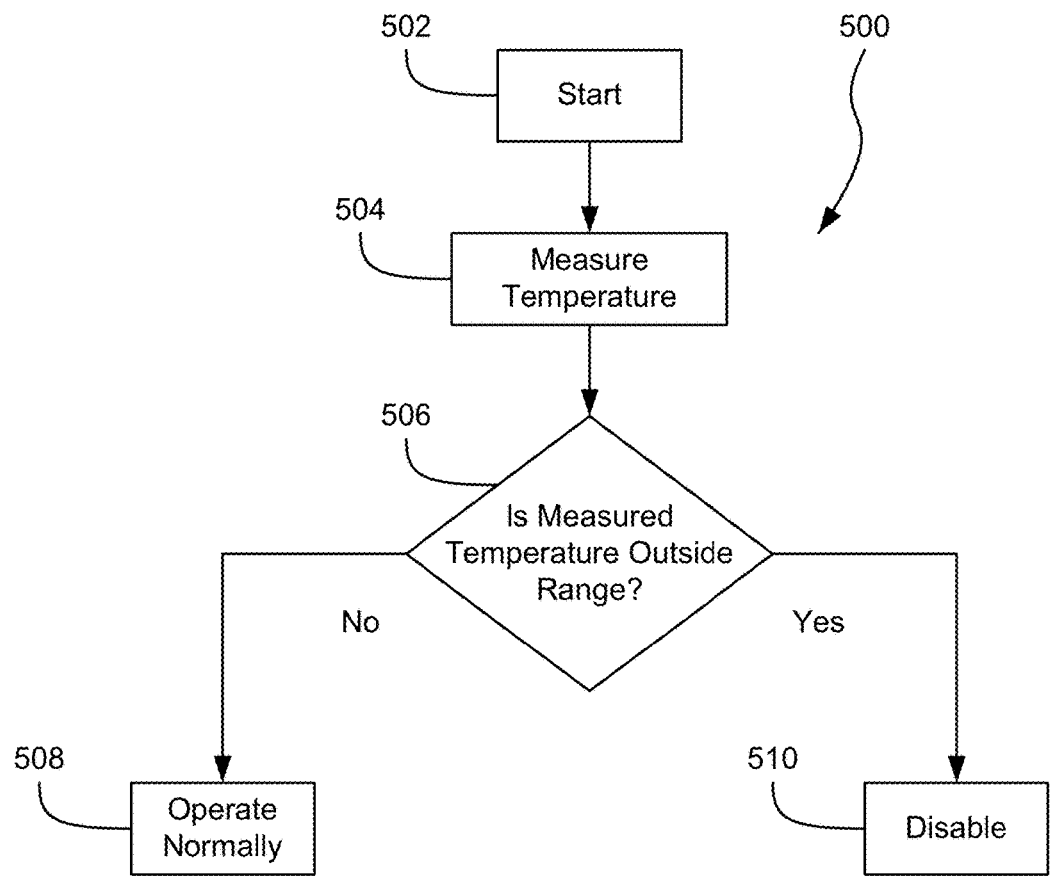
FIG. 13b is a flowchart showing another example embodiment of a method for managing a charging device.

FIG. 13b is a flowchart showing an example embodiment of a method 500 for controlling a charging device 100. The method 500 can start at block 502. At block 504, a temperature can be measured (e.g., using the one or more temperature sensors 142). If the measured temperature is inside an acceptable temperature range at block 506, the charging device 100 can operate normally at block 508. If a temperature measured at block 504 is determined to be outside the temperature range at block 506, the controller 104 can disable the charging device 100 at block 510. The temperature range can be configured such that the charging device 100 is disabled if the temperature goes outside of a safe operating temperature range. For example, if the supplemental battery 102 is exposed to extreme temperatures, the supplemental battery 102 can be damaged. Other components of the charging device 100 can also be damaged if exposed to extreme temperatures. In some embodiments the acceptable temperature range of block 506 can be replaced by an upper temperature threshold value and/or a lower temperature threshold value, and the controller 104 can disable the charging device 100 if the measured temperature is below the lower threshold or above the upper threshold.

The measured temperature at block 504 can be an internal temperature or an external temperature. For example, an extreme external temperature can indicate that the charging device 100 has been exposed to potentially damaging conditions (e.g., placed in a freezer, left outside in freezing conditions, etc.) An extreme internal temperature can indicate that the charging device 100 overheated, for example, and might be damaged.

In some embodiments, the controller 104 can be configured to disable 510 the charging device 100 completely at block 510. In some embodiments, some features and functionality of the charging device 100 can be disabled at block 510 while other features and functionality can remain enabled. For example, at block 510, the controller 104 can disable charging and/or discharging of the supplemental battery 102 (e.g., by disabling the charging electrical pathway and/or the discharge electrical pathway) while continuing to permit pass-through charging of the mobile electronic device 150 (e.g., via the bypass electrical pathway). In some embodiments, the controller 104 can disable all electrical charging in the charging device 100 (e.g., by disabling the charging electrical pathway, the discharge electrical pathway, and the bypass electrical pathway). At block 510, the controller 104 can permit the controller 104 to continue to operate. For example, the control 104 can provide an error message (e.g., output to the user via the charge indicator, such as by flashing lights) when the charging device 100 is disabled at block 510. In some cases, the charging device 100 can continue to monitor the temperature when the charging device 100 is disabled at block 510.

In some embodiments, the controller 104 can be configured to activate the charging device 100 under certain conditions after being disabled at block 510. For example, in some embodiments, if the measured temperature returns to values that are inside the acceptable temperature range for an amount of time, the controller 104 can be configured to reactivate the disabled features of the charging device 100. In some embodiments, the controller 104 can be configured to reactivate the charging device 100 in response to a command. For example, a technician can examine the charging device 100 after it has been disabled at block 510 to determine whether the charging device 100 has been damaged. After examination and/or any needed repairs, the technician can provide a command to the charging device 100 to reactivate the charging device 100.

In some embodiments, the charging device 100 can store battery health information in the memory 106. For example, if the measured temperature goes outside of the temperature range, or below a lower temperature threshold, or above an upper temperature threshold, the controller 104 can store associated information to the memory 106. For example, the controller 104 can store the maximum or minimum measured temperature, the time that the measured temperature was outside the range, and/or below the lower threshold, or above the upper threshold, and/or the number of times that the measured temperature has gone outside the range, or below the lower threshold, and/or above the upper threshold. In some embodiments, the controller 104 can store information relating to the number of charge cycles applied to the supplemental battery 102. For example, the number of charge cycles can be stored, the amount of charging can be stored for some or all of the charge cycles (e.g., whether the supplemental battery 102 was charged from 0% capacity to 100% capacity, or from 25% capacity to 75% capacity, or from 10% capacity to 100% capacity, etc.).

In some embodiments, the controller 104 can determine whether to disable the charging device 100, as discussed herein, based at least in part of the battery health information. For example, if charge cycle information indicates that the number of charge cycles is over a threshold number (e.g., about 500 charge cycles) the controller 104 can disable the charging device 100. In some embodiments, more charge cycles can be permitted if the charge cycles are for relatively low charge amounts. In some embodiments, the controller 104 can disable the charging device 100 after fewer charging cycles if the charging device 100 experiences temperature extremes (e.g., temperatures outside the ranges or thresholds discussed in connection with methods 400 and 500). In some embodiments, the controller 104 can use a formula or a lookup table to determine whether to disable the charging device 100 based on the battery health information. The controller 104 can calculate a battery health score (e.g., based at least in part on the stored temperature and/or charging cycle information). If the battery health score exceeds above or below a threshold value, the controller 104 can disable the charging device 100 (e.g., can disable electrical current along one or more of the charging electrical pathway, the discharge electrical pathway, and/or the bypass electrical pathway).

Figure 18:
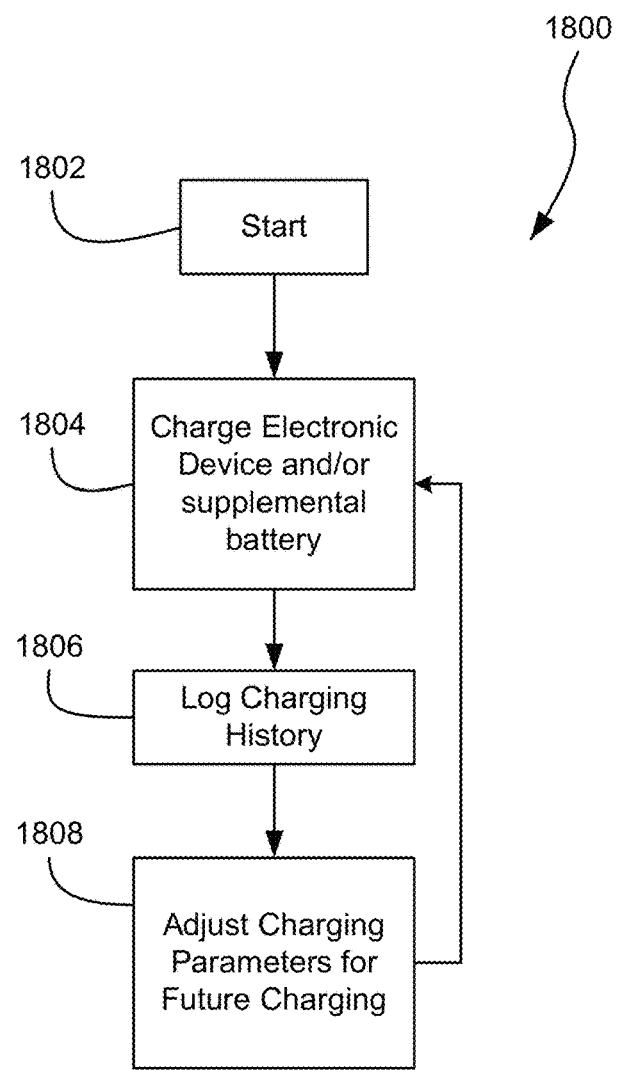
FIG. 18 is a flowchart showing an example embodiment of a method for optimizing charging based on charging history.

FIG. 18 is a flowchart 1800 showing an example embodiment of a method for optimizing charging based on charging history. The method can start at block 1802. At block 1804, the charging device 100 can charge the electronic device 150 and/or the supplemental battery 102. At block 1806, the charging history can be logged. At block 1808, the charging device 100 can adjust parameters for charging the electronic device 150 (e.g., the parameters that will be applied to charging events that will occur in the future).

Logging the charging history 1806 can include, for example, some or all of: logging the duration of charging, the voltage used to charge the electronic device 150, the total power delivered to the electronic device 150 during the charging session, the time of day of charging, the day of week of charging, and the current used to charge the electronic device 150. The charging history could be stored in the memory 106 or some other memory.

Adjusting parameters at block 1808 can be adjusted for speed and efficiency based on user habits inferred from the logged charging history. It can be based on either the latest charging history entry, or it can be based on more than one entry in the charging history.

For example, if the log of charging history indicates that the electronic device 150 was charged only for a short amount of time, then the charging device 100 can adjust parameters so that the next time the charging device 100 charges the electronic device 150, the charging device will charge the electronic device 150 at a faster rate. This can be done, for example, by increasing the current provided to the electronic device 150 and possibly decreasing the voltage to avoid exceeding power limitations. If the logged charging history indicates that the user generally uses the charging device 100 to charge an electronic device 150 for relatively short amounts of time (e.g., less time than would be required to bring the electronic device 150 from a fully depleted state to a fully charged state), that can be an indication that the user's preference is to transfer a relatively large amount of power in a relatively short amount of time (e.g., a performance charging profile), even if that would result in reduced charging efficiency or would result in reduced battery life long term. Accordingly, for later charging events, the controller 104 of the charging device 100 can output a relatively large amount of power (e.g., by increasing the current output from the charging device 100). In another example, if the logged charging history indicates that the user generally charges the supplemental battery 102 (via power received from the power source 180 via the input interface 110) for relatively short amounts of time (e.g., less time than it would take to bring the supplemental battery from a fully depleted state to a fully charged state), the controller 104 can apply a relatively large amount of power to charge the supplemental battery 102 for later charging events, such as by increasing the amount of current delivered to the supplemental battery 102.

In another example, repeated entries in the log of charging history can indicate that the electronic device 150 was previously charged for extended amounts of time and charged for large amounts of power. For example, a user might connect the electronic device 150 to the charging device 100 or otherwise initiate charging (e.g., by toggling a switch or holding down a button) and can leave the electronic device 150 connected or the charging enabled for a relatively long amount of time (e.g., for longer than the time required to charge the electronic device 150 from a fully depleted state to a fully charged state). That can be an indication that the user's preference is to charge the electronic device by a relatively efficient manner even if that means the charging would not be as fast as possible. In this example, the charging device 100 can adjust the parameters for later charging events such that the charging device 100 will charge the electronic device 150 with a relatively efficient approach (e.g., by reducing the current delivered to the electronic device 150). In some embodiments, a lower current but higher voltage can be used to deliver power to the electronic device 150 under this efficiency charging profile as compared to the performance charging profile. This way, the charging occurs at a higher efficiency rate, and the extended amounts of time during which the electronic device 150 will charge still permits the electronic device 150 to fully charge despite the lower current. If the logged charging history indicates that the user left the charging device 100 connected to the power source 180 for relatively long periods of time, the controller 104 can be configured to charge the supplemental battery for later charging events using a slower charging rate (e.g., by reducing the amount of current provided to the supplemental battery 102).

The time of day and day of week data can be similarly used to determine a user's daily and weekly habits to adjust charging parameters. For example, if a user frequently charges an electronic device 150 for short periods of time during working hours on weekdays and charges the electronic device 150 for longer periods of time during all other hours, the charging device 150 can set the parameters to deliver a higher current charge during working hours on weekdays and to deliver a lower current charge during all other times.

As another example, if the log shows that the charging device 150 previously required an amount of power at or near the power capacity of the supplemental battery 102 or greater than some threshold amount of power, the charging device 100 can adjust the parameters to increase the efficiency of power delivery on the next charge in order to maximize the amount of power delivered to the electronic device 150 by increasing the charging voltage and decreasing the charging current.

Figure 19:
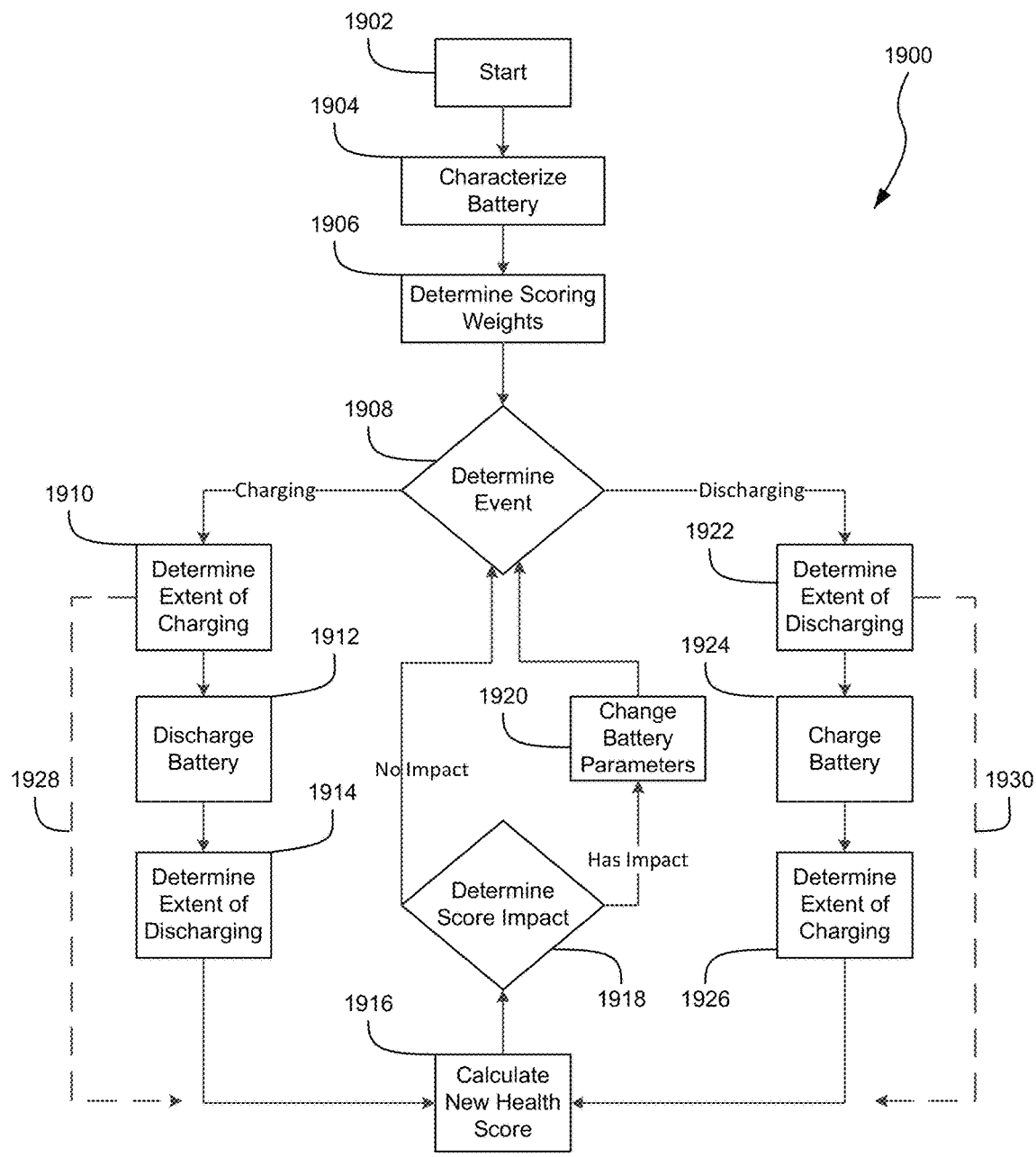
FIG. 19 is a flowchart showing an example embodiment of a method for managing a battery based on a battery health score.

FIG. 19 is a flowchart 1900 showing an example embodiment of a method for managing a battery based on a battery health score. The method can start at block 1902. At block 1904, the supplemental battery 102 is characterized. Characterizing the supplemental battery 102 can include measuring the characteristics of the supplemental battery 102 throughout multiple full or partial discharge cycles at one or more temperature points in order to determine how the supplemental battery 102 is affected by the different charging cycles. The characteristics can include the capacity of the supplemental battery 102, voltage, and other parameters. In some embodiments, characterizing the battery at block 1904 can include characterizing each supplemental battery 102. In other embodiments, characterizing the battery at block 1904 can include characterizing one or more batteries to represent the characteristics of all batteries of a specific model. Based on the characteristics determined at block 1904, scoring weights can be determined at block 1906. The scoring weights can be determined to reflect the relative impact of different types of charging and discharging events on the battery health. For example, the characterization process can rate a battery for 500 full charge-discharge cycles and for 1000 charge-discharge cycles between 20% to 80% capacity. A scoring weight can be assigned to full charge-discharge cycles to reflect the doubled impact compared to the 20% to 80% charge-discharge cycles.

In some embodiments, the characterization can be provided by a third party, such as a battery manufacturer. In some embodiments, the determination of scoring weights can be provided by a third party, such as a battery manufacturer. In these cases, the method 1900 can start at block 1908. The memory 106 can include the battery characterization information and/or the scoring weights. The memory 106 can include battery health information for the supplemental battery 102 (e.g., a current health score for the supplemental battery 102).

At block 1908, an event is determined to be either a charging of the supplemental battery 102 or a discharging of the supplemental battery 102. If a charging event is recorded, then at block 1910 the extent of charging is determined. The extent of charging can be recorded in different formats. For example, it can be determined if there was a full charge, a partial charge, a charge of a certain increment such as a 10% charge, or a charge from one capacity to another capacity such as a 20% capacity to 80% capacity charge. The format of the determination of the extent of charging can match the formats that the battery was characterized with in block 1904.

After a charging event, the supplemental battery 102 can discharge at block 1912. At block 1914, the extent of discharging can be determined. For example, it can be determined if there was a full discharge, a partial discharge, a discharge of a certain decrement, such as a 20% discharge, or a discharge from one capacity to another such as a 90% capacity to 70% capacity charge. The format of the determination of the extent of discharging can match the format that the battery was characterized in block 1904.

At block 1916, a new health score can be calculated. At block 1918, the impact of the new health score can be determined.

The health score can be in different formats. In some embodiments, the health score is a number that reflects the total impact on the supplemental battery 102 from different types of battery cycles. For example, a supplemental battery 102 might be rated during characterization 1904 for 200 full charge-discharge cycles or 400 partial charge-discharge cycles before degrading 30% performance. By continuing example, each full charge-discharge cycle impacts the supplemental battery 102 twice as much as a partial charge-discharge cycle. Scoring weights can be assigned as 2 points per full charge-discharge cycle, and 1 point for a partial charge-discharge cycle during block 1906. When a calculation of the health score reaches 400 points from any combination of full and partial charge-discharge cycles at block 1916, the device can determine the impact at block 1918 that the supplemental battery 102 has 30% degraded performance and adjust the supplemental battery parameters at block 1920. Parameters that can be adjusted include, for example, the time that the supplemental battery 102 gets charged, a supplemental battery charging voltage, a supplemental battery discharging voltage, the operational temperature thresholds, supplemental battery protection limits, etc. The known degradation of the supplemental battery 102 can affect other algorithms, for example, if the supplemental battery 102 is frequently used to charge an electronic device of initially equal capacity and the supplemental battery 102 subsequently degrades, the charging device can adjust charging parameters to increase charging efficiency to charge the electronic device as much as possible.

In another embodiment, the health score can be a total number of times that the supplemental battery 102 was charged, discharged, or both. For example, a supplemental battery 102 can be rated for a threshold of 200 full charge-discharge cycles before the performance of the supplemental battery 102 degrades by a certain amount. The health score can be a count of the number of full charge-discharge cycles that the supplemental battery 102 has gone through. When the supplemental battery 102 goes through the 199th charge-discharge cycle, then no impact can be determined at block 1918. When the supplemental battery 102 goes through the 200th charge-discharge cycle, an impact can be determined at block 1918, and the charging device 100 can change supplemental battery parameters at block 1920 to better manage a degraded supplemental battery 102. In another embodiment, multiple thresholds can be used to account for partial degradations. For example, it can be determined for a supplemental battery 102 rated for 200 full charge-discharge cycles, that a threshold occurs after 100 cycles after which the charging device will adjust the supplemental battery parameters by a small amount, and that after the 200th cycle, the charging device will adjust the supplemental battery parameters again by another amount.

In another embodiment, the charging device determines that each charge-discharge cycle has a certain impact on supplemental battery 102 health and adjusts the supplemental battery parameters each time that a charge-discharge cycle happens (e.g., often by a marginal amount).

In some embodiments, the event determined to occur at block 1908 can be a discharging event. At block 1922, the extent of discharging can be determined. At block 1924, the supplemental battery 102 can be charged. At block 1926, the extent of charging can be determined before proceeding to block 1916 as described above.

In some embodiments, a health score can be calculated at block 1916 after each charge or discharge instead of after a charge-discharge cycle. For example, after determining the extent of a charging event at block 1910, the method can skip at 1928 to block 1916 to calculate a new health score. Likewise, after determining the extent of a discharging event at block 1922, the method can skip at 1930 to block 1916 to calculate a new health score.

Figure 20:
FIG. 20 is an example of a table showing health score information.

FIG. 20 is an example of a table showing various example different charge and discharge types and various corresponding values relating to the impact on battery health. The system can use a lookup table, which can be similar to the table of FIG. 20, to determine the effect of each charging event and/or discharging event on the battery health.

Figure 21:
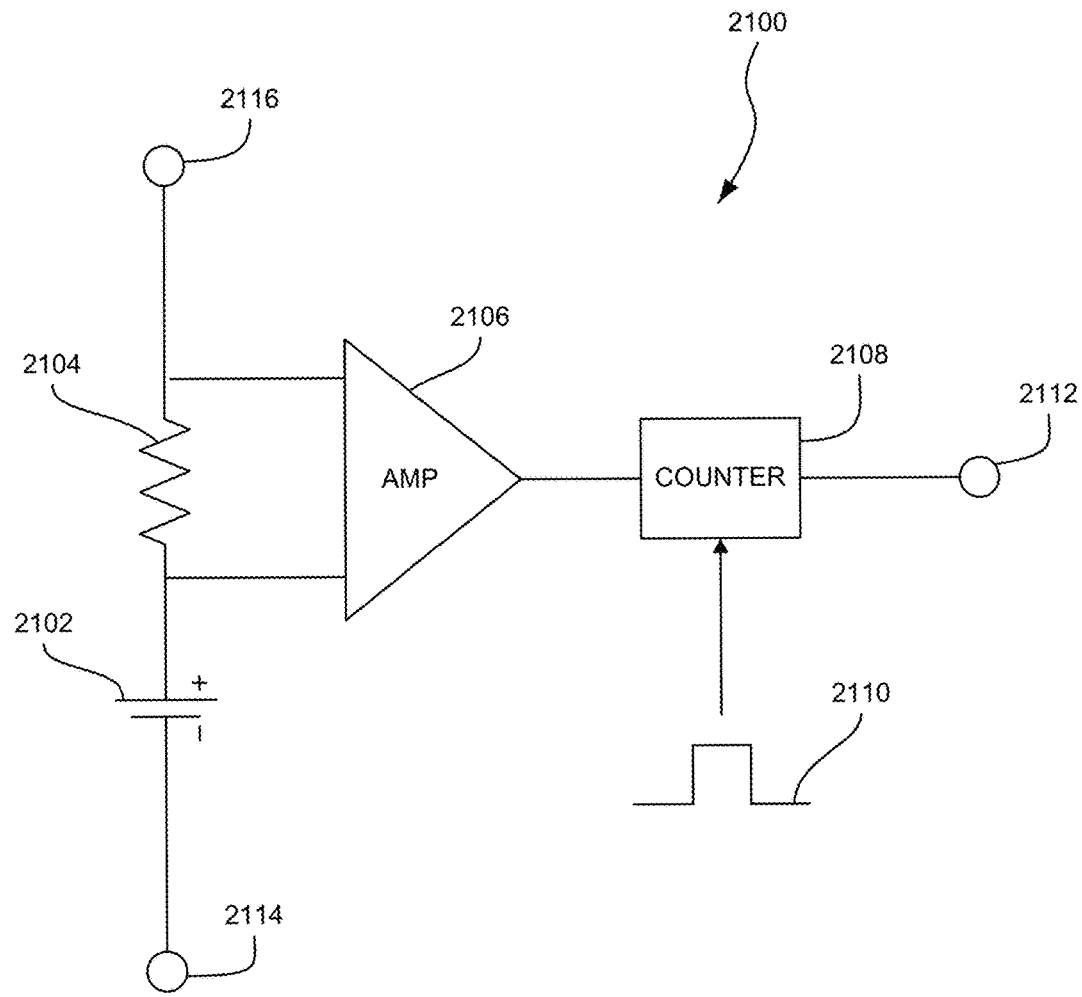
FIG. 21 is a schematic view of a fuel gauge circuit.

FIG. 21 is a schematic view of a fuel gauge circuit 2100. The circuit comprises a battery 2102, such as the supplemental battery 102. The battery 2102 is coupled to a resistor 2104. An op amp 2106 is coupled across the resistor 2104. The output of the op amp 2106 is coupled as an input to a counter 2108, which can include an analog to digital converter circuit (not shown). A clock signal 2110 is input to the counter circuit. The output of the counter circuit 2112 can be coupled to circuitry to manage the battery 2102. The battery 2102 can couple to a load or power source at points 2114 and/or 2116. Many variations and modifications are possible for the fuel gauge circuit 2100, as will be understood to one of skill in the art in view of the disclosure herein.

The fuel gauge circuit 2100 operates by amplifying a voltage difference across the resistor 2104. The resistor 2104 can have a small resistance to avoid unwanted passive power dissipation. The resistor 2104 can have a precise resistance to provide an accurate count. The amplified voltage difference can be sampled by the counter 2108 at certain increments of time provided by a clock signal. The output of the counter 2108 then tracks the total power input to, or output by, the battery 2104, for example.

The fuel gauge circuit 2100 can provide a relatively accurate coulomb counting of the power being delivered to or from the battery. Coulomb counting, as used herein, can refer to tracking electrical charge delivered to a battery and/or provided from the battery (e.g., by a measurement of current and/or other variables). By way of example, by tracking the voltage V across a known resistor 2104, the current I can be tracked, power P can be determined in according to the formula P=IV, and the total energy stored in the battery over time can be tracked (e.g., with a clock signal 2110). The fuel gauge can track and provide an accurate count current to or from the battery that can deviate from initially characterized predictions. In some embodiments, the fuel gauge circuit 2100 can be used to determine a state of charge of the battery 2102 (e.g., whether the battery 2102 is charged to 50%, 75%, 90%, etc.) In some embodiments, the determined state of charge for the battery 2102 can depend on the tracked electrical charge that has been delivered to the battery 2102 and/or delivered from the battery 2102. For example, the voltage and current for electrical charge delivered to and/or provided from the battery 2102 can be tracked. In some implementations, the temperature can also be tracked, and the determined state of charge for the battery 2102 can depend on the temperature during charging and/or discharging of the battery 2102. This information can be used to manage the battery's health. In some embodiments, the information can be output, for example, to a controller 104 such as a microcontroller unit, and the controller 104 can control a battery management unit and a reconfigurable protection circuit module. In some embodiments, the information can be directly input to a battery management unit or protection circuit module.

For example, the total amount of power necessary to charge and discharge a battery 2102 can be tracked. This can be compared to the amount of power that the battery 2102 subsequently charges and discharges to estimate the battery's current capacity. In some embodiments, the capacity of the battery 2102 can be indicated by a charge indicator 114.

In some embodiments, the total battery capacity can be calibrated or recalibrated. For example, when a power source 180 is present to charge the battery, the fuel gauge circuit 2100 can track a voltage difference across the resistor until the supplemental battery 102 no longer charges. This information can be used to determine when the battery capacity has degraded. This information can be referenced with battery characterization data, such as data obtained in block 1904 of FIG. 19, to determine a battery's health. As another example, after a full battery charge, the fuel gauge circuit 2100 can track the voltage difference across the resistor 2104 as the battery 2102 completely discharges (e.g., to a load circuit or output) to estimate the total amount of power that the battery 2102 was able to discharge.

In some embodiments, a battery management unit can charge a battery to 100% capacity and then stop charging the battery, and after a fuel gauge circuit 2100 reading that indicates that the battery only charges to 80% capacity (e.g., due to degradation of the battery), the battery management unit can reconfigure to charge the battery to only 80% capacity and then stop charging the supplemental battery 102 instead of attempting to charge the battery to 100% of its capacity.

In some embodiments, a reconfigurable protection circuit module can protect a battery 2102 against overvoltage limits (e.g., 19V). When data from the fuel gauge circuit 2100 suggests that the battery has degraded by 80%, the reconfigurable protection circuit module can protect the battery 2102 against a different overvoltage limit (e.g., 17V) to account for the battery degradation. The different overvoltage limits can be determined based in part on the amount of degradation, the battery health score, and the battery characterization. In some embodiments, the reconfigurable protection circuit module can provide a similar feature to adjust the current limits (e.g., to account for battery degradation).

In some embodiments, after a fuel gauge circuit 2100 reading that indicates that the battery's capacity has degraded, this information can be referenced with the battery health score and the battery characterization to determine new limits on the highest voltage that the battery should be charged with. For example, a healthy battery can be charged at a voltage range between 9V and 19V, but a degraded battery might only charge with a voltage range of 9V to 17V.

In some embodiments, after a fuel gauge circuit 2100 reading that indicates that the battery's capacity has degraded, this information can be referenced with the battery health score and the battery characterization to determine a new voltage that the battery 2102 should be charged at in order to maximize charging efficiency and stay within power limits. For example, a healthy battery can be capable of charging between 4.5 V and 10V, and the circuitry can charge the healthy battery at 4.5 V and 100 mA under with a power limit of 0.45 mW. The circuitry can reconfigure and charge a degraded battery at 9V and 50 mA under the same thermal limit to maximize charging efficiency.

Figure 22:
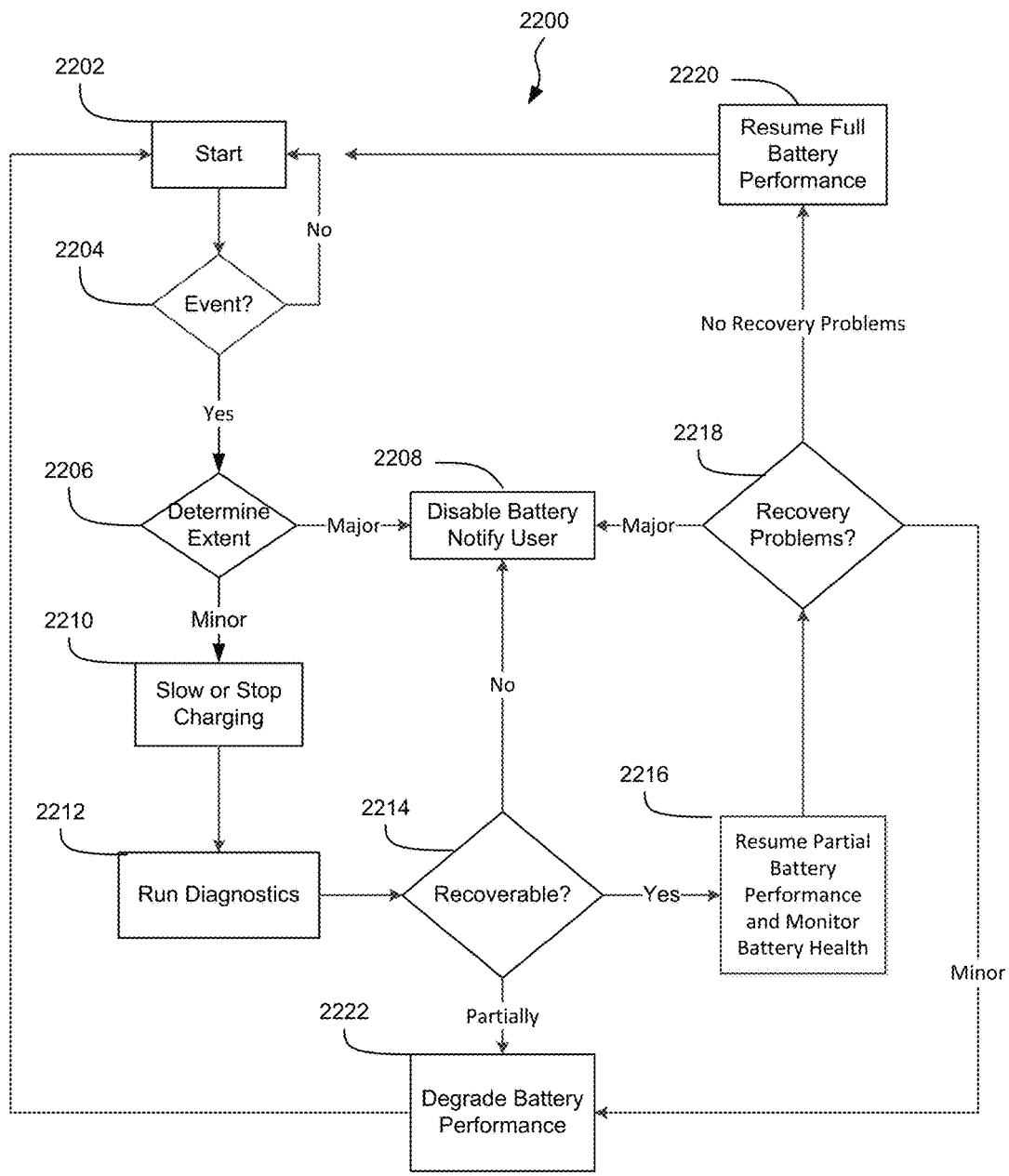
FIG. 22 is a flowchart showing an example embodiment of a method for managing a battery.

FIG. 22 is a flowchart showing an example embodiment of a method for managing a battery. The method can start at block 2202. At block 2204, a battery risk event can be detected. A risk event can be a detected event that poses a risk of damage to the battery 102. If no risk event is detected, the method returns to block 2202 and loops until a risk event is detected. If a risk event is detected, at block 2206, the extent of the risk event can be determined. In some embodiments, risk events can be major events or minor events. In some embodiments, there can be only one classification or there can be multiple classifications of events and the classifications can be different for different types of events. For example, there can be minor thermal events, medium thermal events, and major thermal events. For more examples, there can be impact events, drop events, bend events, short circuit events, and water damage events. In some embodiments, a normal operating temperature range can be between 0 and 45 degrees Celsius. A minor event can be detected when the temperature exceeds the range of 0 to 45 degrees Celsius. A major event can be detected when the temperature exceeds the range of −10 to 60 degrees Celsius.

If a major event is detected, then at block 2208, the battery can be disabled and the user can be notified. For example, if the temperature exceeds 60 degrees Celsius, then a reconfigurable protection circuit module, the controller 104, or some other component can disable the battery, because the battery might be damaged. At block 2208, a user can be notified that the supplemental battery 102 is disabled and/or that damage may have occurred. This can be done through the charge indicator 114. In some embodiments, the user can be notified of the error through one or more lights on the charging device that light up in a certain way. In some embodiments, a visual error message can be displayed on a screen. The user can be notified in a variety of other methods.

If a minor event is detected at 2206, the charging device 100 can slow or stop the supplemental battery 102 from charging or discharging. A minor event can damage the battery, or a minor event can reduce the performance of the supplemental battery 102. For example, the reconfigurable protection circuit module, the controller 104, or some other component can slow down the rate at which the battery charges or discharges, or it can reduce the operating voltage, current, power, or capacity limits of the battery.

At block 2212, the charging device 100 can run diagnostics to determine whether or not the error is recoverable. For example, a minor thermal event triggered by a temperature above 45 degrees Celsius can be recoverable if the temperature falls below a threshold recovery temperature, such as 45 degrees Celsius, within a certain amount of time, such as 15 minutes. The minor thermal event might not be recoverable if the temperature ever exceeds an extreme thermal threshold, such as 60 degrees Celsius, or does not return below a threshold recovery temperature within a certain amount of time. In some embodiments, the diagnostics can test the electrical functionalities of the circuit. For example, if a charging device 100 with a supplemental battery 102 configured to output 4.5 V experiences a minor thermal event, then the circuit can measure the voltage output of the supplemental battery. In such a scenario, the circuit can, for example, isolate the battery from the load and any power sources and measure the output voltage of the supplemental battery 102 to determine if the battery can still output 4.5 V, or the circuit can test for the capacity of the battery. A test circuit can also test for power output, current, stability, and a number of other variables to determine if the supplemental battery 102 can recover after the minor event.

If at block 2214 it is determined that the supplemental battery 102 cannot recover, then at block 2208, the charging device 100 disables the supplemental battery 102 and notifies the user.

If at block 2214 it is determined that the supplemental battery 102 can partially recover from the risk event, then at block 2222, the charging device 100 can degrade the supplemental battery's future performance. For example, after a minor impact event where the charging device 100 was dropped for a short height, the supplemental battery 102 might become damaged and only operate at 50% capacity and charge at a 25% slower rate. At block 2222, the charging device can reconfigure to enable the supplemental battery 102 to only charge and discharge 50% of its capacity and to charge or discharge at a 25% slower rate. In other examples, the charging voltage, discharging voltage, charging current, discharging current, charging rate, discharging rate, power, and other parameters of the supplemental battery 102 can be adjusted to accommodate for the degradation and/or damage to the supplemental battery 102 caused by the minor event.

If at block 2214 it is determined that the supplemental battery 102 is not damaged and/or is recoverable, then at block 2216 the charging device can attempt to resume partial performance of the supplemental battery 102. Partial performance can be resumed at a slow rate while the supplemental battery 102 is carefully monitored. For example, after a minor event, the supplemental battery's capacity can be resumed at 25%, and after verifying that the supplemental battery 102 is stable and operates with expected characteristics for a certain number of charge-discharge cycles or period of time, then resuming battery capacity at 35%, and so on. If any major recovery problems are detected at block 2218, then the battery can be disabled and the user can be notified at block 2208. If minor recovery problems are detected, then the battery's performance can be degraded at block 2222. If no problems are detected at block 2218, then the battery can resume full performance. In some embodiments, special monitoring of battery health can continue to occur after full performance of the supplemental battery 102 has been resumed for a certain number of cycles or for a certain length of time.

Many variations and modifications to the method 2200 are possible. Various operations of the method 2200 can be omitted or combined, and additional operations can be added to the method 2200. For example, in some embodiments, when it is determined at block 2214 that the supplemental battery 102 is not damaged and/or is recoverable, the method can proceed to block 2220 and skip partial recovery and additional diagnostics.

In some embodiments, the method 2200 will not proceed until a risk event condition has ended. For example, if minor water damage is detected at block 2206, the charging device 100 can stop charging the supplemental at block 2210. Before proceeding to block 2212, the charging device can wait for a threshold amount of time for the water damage to end. As another example, if a charging device suffers a minor thermal event that is recoverable, the method might not proceed to block 2216 and resume battery performance until the temperature of the charging device 100 returns within normal limits.

Figure 23:
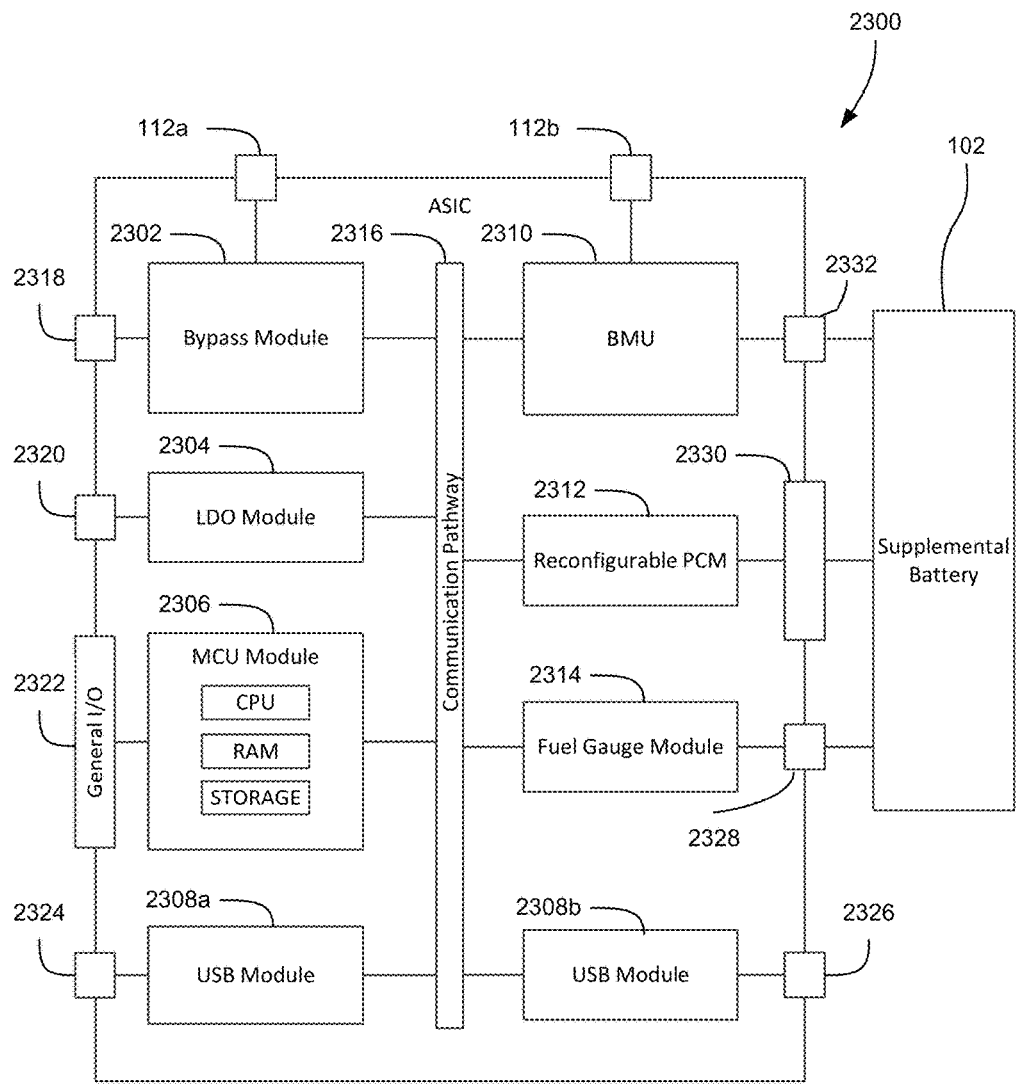
FIG. 23 is a schematic view of an example embodiment of an application specific integrated circuit (ASIC).

FIG. 23 is a schematic view of an example embodiment of an Application Specific Integrated Circuit (ASIC) 2300. The ASIC 2300 can couple to a supplemental battery 102. The ASIC can include each of, or any combination of, the following components: a linear dropout regulator (LDO) module 2304, a battery management unit (BMU) 2310, a reconfigurable protection circuit module 2312, a micro controller unit (MCU) module 2306, a fuel gauge module 2314, and a USB module 2308a, 2308b into a single chip. This enables benefits that arise from combining the different modules into one package. For example, integrating the LDO module into the ASIC provides for cost savings compared to using separate LDO modules outside of the ASIC. Integrating a reconfigurable PCM allows for the benefit of no longer needing custom PCM trimming by a manufacturer, saving time and money, and further allows the PCM 2312 to be reconfigured by the MCU module 2306 as conditions change, such as in response to the battery health, damaging events, different configurations of supplemental batteries 102, different configurations of power sources 180, and different demands of electronic devices 150. The integration of the reconfigurable PCM still allows for real-time, analog protection of the supplemental battery while still maintaining independence from firmware failures.

The ASIC 2300 can have one or more output interface ports 112a, 112b to couple to one or more electronic devices 150. In some embodiments, output interface port 112a and 112b can be the same output interface port.

The ASIC 2300 can have an input port 2318, which can receive electrical power and/or data from an external device or power source 180. In some embodiments, the input port 2318 an be configured to receive an electrical connector 182 from the power source 180. A bypass module 2302 can be configured to couple an electrical pathway between the input port 2318 and the output interface port 112a. The bypass module 2302 can also couple an electrical pathway from the input port 2318 to other modules, such as the BMU 2310.

The ASIC 2300 can have an LDO module. The LDO module can have one or more linear dropout regulators (not shown). The linear dropout regulators can be configured to output one or more voltages at one or more LDO ports 2320. In some embodiments, the LDO module can have a first LDO regulator (e.g., to output 1.8 V) and a second LDO regulator (e.g., to output 3.0 V).

The ASIC 2306 can have an MCU module 2306. The MCU module 2306 can have a central processor unit (CPU), memory such as random access memory (RAM) or other volatile memory, and/or storage such as registers (not shown) or nonvolatile memory. In some embodiments, the registers are part of the CPU. The MCU module 2306 can be configured to receive one or more inputs from a general input/output port 2322. The MCU module 2306 module 2306 can control other parts of the ASIC, and the MCU module 2306 can be programmed to control other parts of the circuit or charging device 100, as described herein. The MCU module 2306 can communicate or control other modules through one or more communication pathways 2316. In some embodiments, MCU module 2306 can comprise microcontroller 104.

In some embodiments, the MCU module 2306 can have Flash storage memory and/or static random access memory. By way of example, the MCU module 2306 can have one or more MCU architecture cores (e.g., 8051 architecture cores) and/or can be programmable via the USB module 2308a, 2308b.

The MCU module 2306 can run one or more algorithms to control other modules of the ASIC based in inputs. For example, the MCU module 2306 can reconfigure the reconfigurable PCM 2312 to change the capacity of the supplemental battery 102 based on input from the fuel gauge 2100, such as when the fuel gauge 2100 indicates that the supplemental battery 102 has only charged to 80% despite the presence of a power source 180, which can be an indication of battery degradation. The MCU module 2306 can configure the reconfigurable PCM and BMU 2310 not to attempt to charge or discharge the supplemental battery 102 beyond the a reduced capacity (e.g., 80% capacity) when an indication is received that the battery 102 has degraded to the reduced capacity (e.g., to 80% capacity). The MCU module 2306 can store the charging history and adjust the performance of the battery, such as the charge rate and the efficiency, based on the charging history as described in FIG. 18. The MCU module 2306 can be used to implement part or all of the methods disclosed herein (e.g., the methods shown in FIG. 10, 11, 12, 13a, 13b, 16, 18, 19, or 22). For example, the MCU module 2306 can be used to determine the power capacity of a power source 180. The MCU module 2306 can store battery characterization and implement part or all of method 1900 in FIG. 19 to calculate a health score, determine a score impact, and change parameters for the supplemental battery 102 by communicating with the BMU 2310 or reconfigurable PCM 2312 through the communication pathway 2316. The MCU module 2306 can perform other functions described herein, and the MCU module 2306 can communicate to control the other modules in the ASIC and other components of the charging device 100.

The ASIC 2306 can have a Battery Management Unit (BMU) 2310. The BMU 2310 can comprise one or more voltage modifiers (not shown in FIG. 23) such as a voltage regulator, a buck converter, or a boost converter. The BMU 2310 and bypass module 2302 can comprise the circuitry of FIGS. 5-9. The BMU 2310 can regulate the charging and discharging voltage, current, and power of the supplemental battery 102. The BMU 2310 can charge or discharge the battery up to certain capacities or at certain rates or at certain efficiencies. The BMU 2310 can reconfigure, based at least in part on control communications from the MCU module 2306, power source 180 power capacity, power source 180 input voltage, required output voltage at output interface 112, supplemental battery configuration, or supplemental battery health.

In some embodiments, the BMU 2310 can comprise both a buck converter and a boost converter. In some embodiments, a first inductor can be used for the buck converter and a second inductor can be used for the boost converter (e.g., the BMU 2310 can be configured to operate the buck converter and the boost converter simultaneously). In some embodiments, a single inductor can be used for both the buck converter and the boost converter (e.g., the BMU can 2310 can be configured to selectively operate the boost converter or the buck converter). In some embodiments, the BMU 2310 can be disabled when the bypass module enables the electrical pathway from input port 2318 to output interface 112.

In some embodiments, the BMU 2310 can be configured to simultaneously boost and buck input voltage received from a power source 180 to both a supplemental battery 102 and an electronic device 150. For example, the BMU 2310 can first boost the voltage to the higher of the voltages required by the supplemental battery 102 and the electronic device 150, and can then buck the voltage down to the lower voltage level of the voltages required by the supplemental battery 102 and the electronic device 150. In some embodiments, the BMU 2310 can be configured to power the electronic device 150 with power from the power source 180 and to charge the supplemental battery 102 with any excess power provided by power source 180 that is not being used to charge the electronic device 150.

For example, the BMU 2310 can be coupled to a 4.5 V battery, and the electronic device 150 is configured to receive 5.1 V or at least 4.8 V. If the power source 180 supplies an input voltage of at least 4.8 V up to a threshold limit such as 12V, the BMU 2310 can toggle one or more switches to charge the electronic device 150. Additionally, the BMU 2310 can charge the supplemental battery 102 with any leftover current if the input current from the power source 180 exceeds the current delivered to the electronic device 150. If the power source 180 supplies an input voltage of between about 3.9 V to less than 4.8 V, the BMU 2310 can operate a boost converter to boost the input voltage up to 5.1 V to charge the electronic device 150. Any leftover current can then be stepped down (e.g., using a buck converter) to 4.5 V and used to charge the supplemental battery 102. If the power source 180 supplies an input voltage of about 0 V to 3.9 V, then the MCU module 2306 can be configured to provide power from the supplemental battery 102 to the electronic device 150 and step up the power provided by the supplemental battery 102 with a boost converter.

As another example, the BMU 2310 can be coupled to a 9 V battery, or to two 4.5 V battery cells in series, and the electronic device 150 can be configured to receive 5.1V or at least 4.8 V. If the power source 180 supplies an input voltage of at least 4.8 V up to a threshold limit such as 19V, the BMU 2310 can toggle one or more switches to step up the power provided by the power source 180 to at least 9 V with a boost converter, and then step down power provided from the battery to 5.1 V with a buck converter. If the power source 180 supplies an input voltage of between about 0 V to 4.5 V, then the BMU 2310 can be configured to step down voltage from the battery to 5.1 V with a buck converter and provide the 5.1 V of power to the electronic device 150.

The ASIC can have a reconfigurable PCM 2312. The PCM 2312 can couple to supplemental battery 102 through port 2330 and protect the supplemental battery 102 against one or more conditions, such as overvoltage, undervoltage, overcurrent, undercurrent, and short circuit conditions. The reconfigurable PCM 2312 can protect one or more battery cells of the supplemental battery 102. The reconfigurable PCM 2312 can protect the supplemental battery 102, such as during either charging or discharging. The reconfigurable PCM 2312 can also be configured to disable charging or discharging, adjust the maximum charging and discharging rates, adjust the maximum voltages for charging and discharging, adjust operational voltages for charging and discharging, adjust the maximum charging current or maximum discharging current, and/or adjust other parameters as described herein. The reconfigurable PCM 2310 can be reconfigurable by the MCU module 2306, through another module, or upon detection of certain circuit conditions. The MCU module 2306 can configure the reconfigurable PCM 2312 based at least in part on the occurrence of one or more damaging events such as described with respect to FIG. 22 and based at least in part on the health of the battery as described with respect to FIG. 19. The reconfigurable PCM 2312 can have circuitry shown in FIG. 27.

The ASIC 2300 can have a fuel gauge module 2314. The fuel module 2314 can be coupled to the supplemental battery 102 via a port 2328. The fuel gauge module 2314 can operate as described herein, such as with respect to FIG. 21. The fuel gauge module 2314 can communicate with the MCU module 2306. MCU module 2306 can determine the current charge and charge capacity of the supplemental battery 102. The MCU module 2306 can output data (e.g., through general I/O ports 2322) to indicate the current charge capacity of the charging device 100 through charge indicator 114. The MCU module 2306 can count the charge input to or drawn out of the supplemental battery 102 in order to determine the current charge of the supplemental battery 102. The MCU module 2306 or other circuitry can periodically recalibrate the maximum capacity of the battery. For example, if a power source 180 is coupled the charging device 100 and continuously supplies power, the MCU module 2306 can track the current flowing into the supplemental battery 102 and determine that the supplemental battery 102 has reached an actual maximum capacity when the fuel gauge module 2314 indicates that no more current flows into the supplemental battery 102, even if the supplemental battery 102 is supposed to be capable of storing a higher maximum capacity. This scenario can occur when the supplemental battery 102 degrades through use, age, damage, or other causes.

The ASIC 2300 can have one or more USB Modules 2308a, 2308b. USB Modules 2308a and 2308b can be a single USB module. The USB modules 2308a, 2308b can have a USB input port 2324 and a USB output port 2326. The USB input port can be in communication with the MCU module 2306, for example, to read, write, program, flash, reset, or operate the MCU module. The USB module 2308a can also be in communication to modify firmware, such as firmware for the MCU module 2306.

The USB module 2308 can act as an intermediary between an electronic device 150 and a power source 180 to maximize power delivery. The USB module 2308a can do this by negotiating with the power source 180 through USB input port 2324 for the highest power that the power source 180 can provide, and negotiating separately with an electronic device 150 coupled through port 2326 to USB module 2308b to deliver the highest power that the electronic device 150 can receive. For example, if a power source 180 is a USB 3.0 device and the electronic device 150 is a USB 2.0 device, the power source 180 might be able to deliver more power than the USB 2.0 device can accept. If the USB 2.0 device were coupled directly to the USB 3.0 device, then the USB 3.0 device could only negotiate to deliver power at USB 2.0 levels. However, when a charging device 100 is coupled as an intermediary between the USB 3.0 device and the USB 2.0 device, the charging device 100 can negotiate for the full amount of power provided over a USB 3.0 interface with the power source, deliver all the power supported over a USB 2.0 interface to electronic device 150, and use any excess current from the power source 180 to charge the supplemental battery 102.

In some embodiments, when the USB module 2308a is coupled through USB input port 2324 to a USB compliant host, which can be the power source 180, and the USB module 2308b is coupled through USB output port 2326 to a USB compliant electronic device 150, then the USB modules 2308a, 2308b can couple the USB compliant power source 180 to the USB compliant electronic device 150. The USB module functions like a bypass pathway between the USB host and a USB device.

In some embodiments, when the USB module 2308a is coupled through USB input port 2324 to a USB compliant host, which can be the power source 180, and the USB module 2308b is not coupled to an electronic device 150, then the USB modules 2308a can register with the USB compliant power source 180 as a portable device. This can allow the USB host to deliver a small amount of current, such as 0.5 A, to the charging device 100. In this configuration, the USB host can also send data to the USB module 2308a. This data can be, for example, instructions to the MCU module 2306, or to rewrite firmware. In some embodiments, if no data is received from the USB host for a certain timeout period, then the USB module 2308a can reregister as a dedicated charger or downstream charging port. This enables the charging device 100 to receive a greater amount of current, such as 1.5 A, from the USB host.

In some embodiments, if the USB module 2308a is not coupled to a power source 180, and the USB module 2308b is coupled to a USB compliant electronic device 150, then the USB module 2308b can register as a dedicated charger to the electronic device 150.

Figure 24:
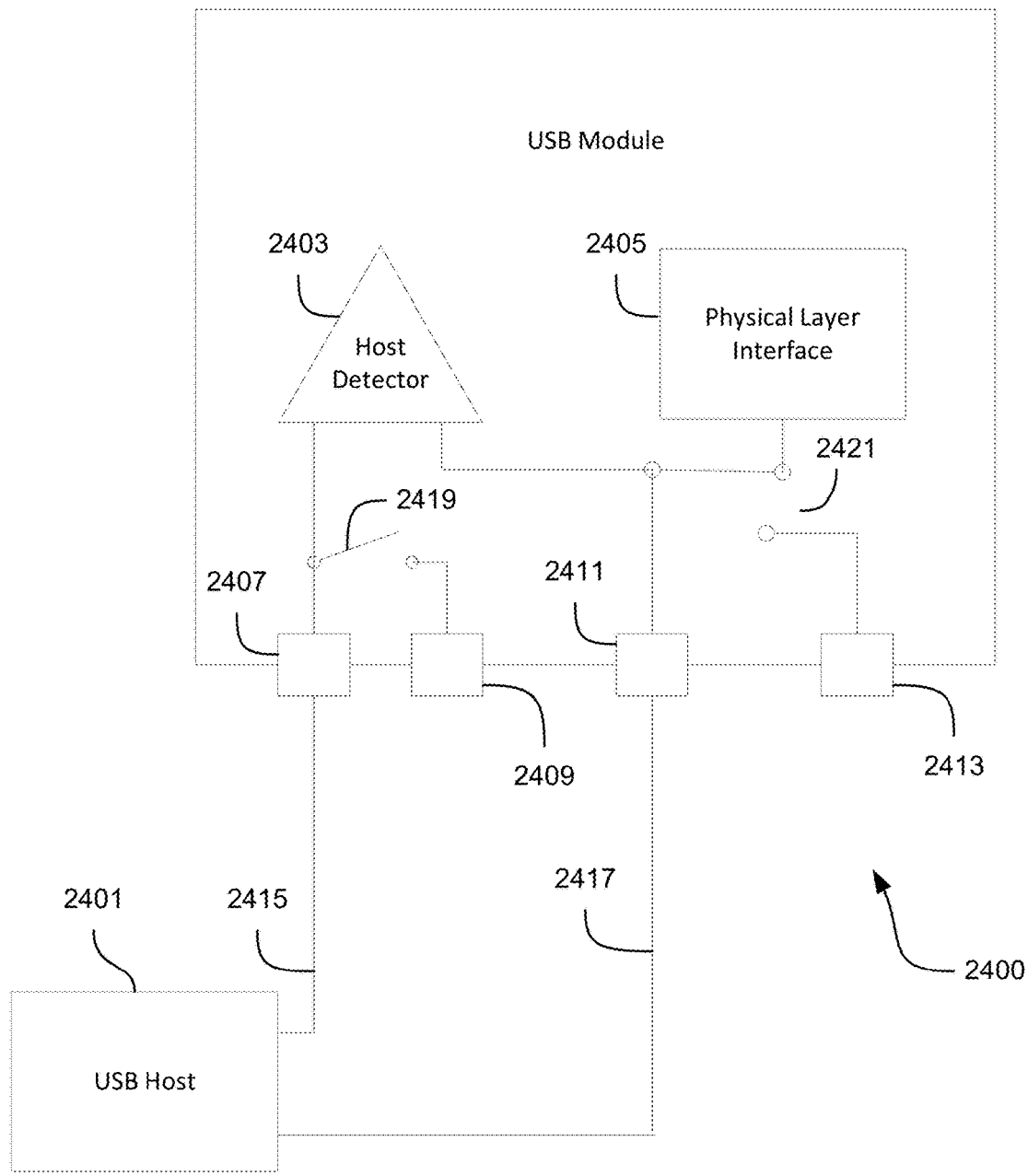
FIG. 24 is a schematic view of an example embodiment of a Universal Serial Bus (USB) module in a first configuration.
Figure 25:
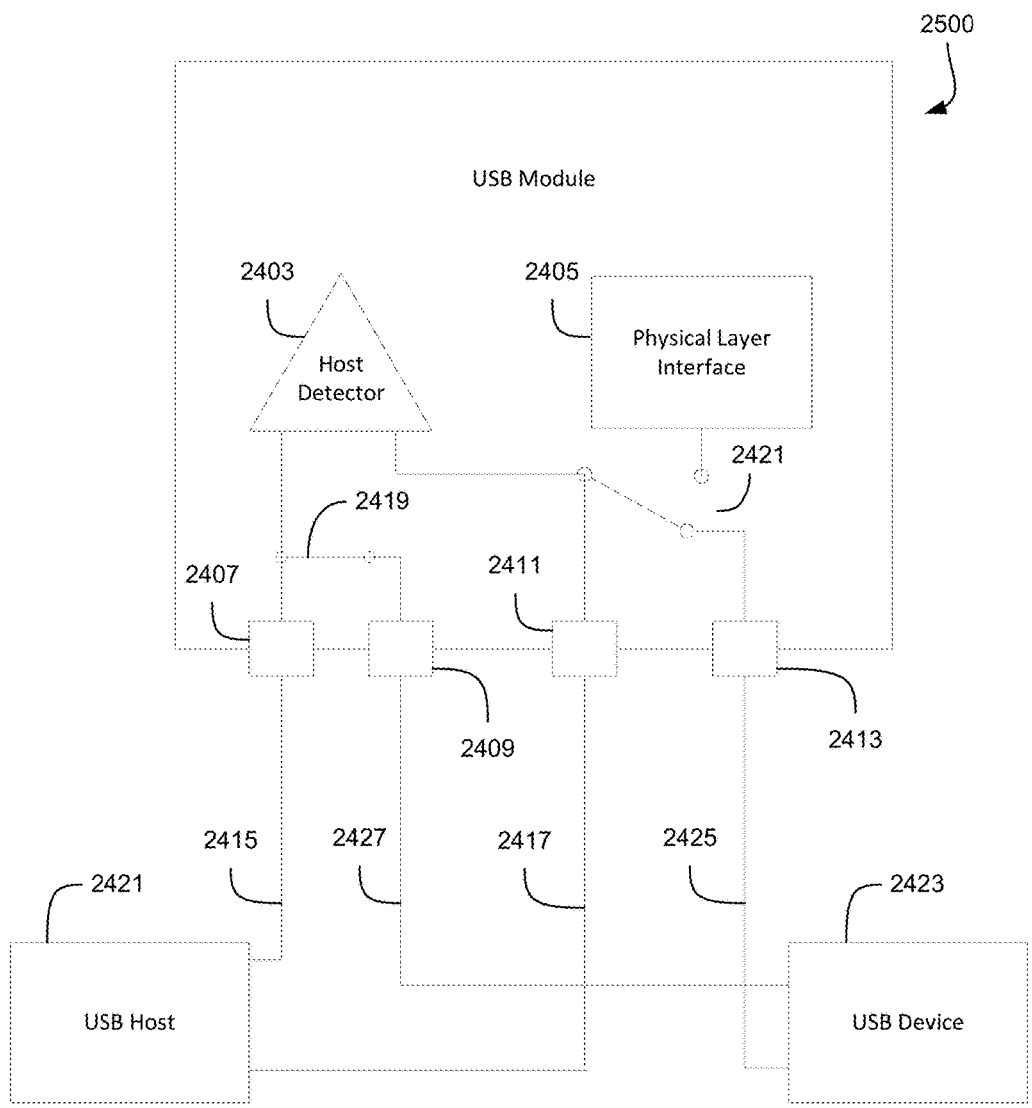
FIG. 25 is a schematic view of an example embodiment of a USB module in a second configuration.
Figure 26:
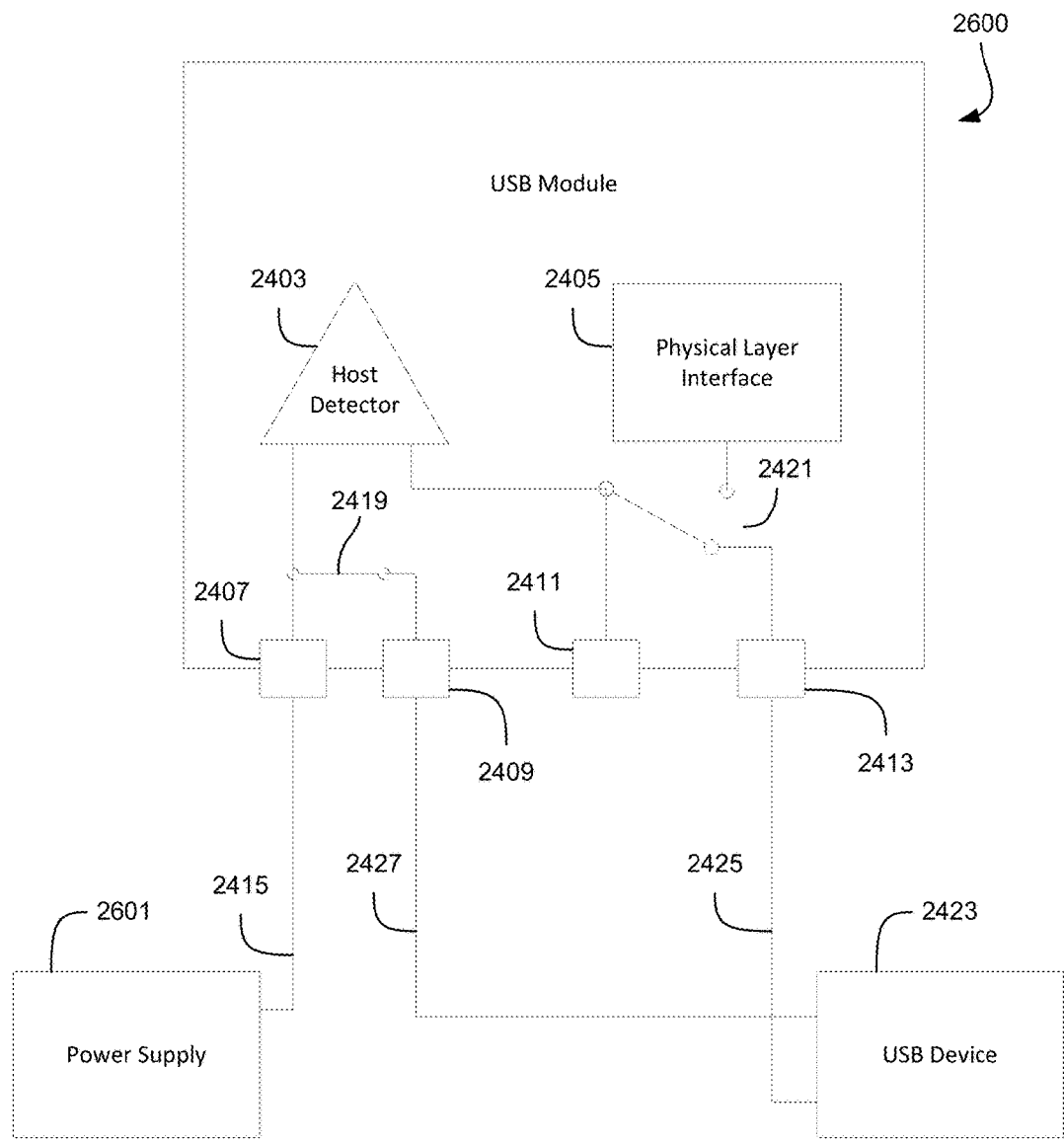
FIG. 26 is a schematic view of an example embodiment of a USB module in a third configuration.

Additional details of USB module 2308 are described with respect to FIGS. 24-26. Various embodiments are described herein in connection with universal serial bus (USB) interfaces, modules, or devices. It will be understood to one of skill in the art that various other types of interfaces, modules, or devices can be used other than USB, and the disclosure provided herein in connection with USB interfaces, modules, or devices can relate to other, non-USB embodiments.

FIG. 24 is a schematic view of an example embodiment of a Universal Serial Bus (USB) module 2400 in a first configuration. The USB module 2400 in FIG. 24 can be the USB module 2308 in FIG. 23.

USB module 2400 can have a host detector 2403 to detect the presence of a USB host 2401 through a port 2407. The USB host 2401 can act as a power source 180. USB module 2400 can also have a physical layer interface 2405 configured to convert formats between a USB data format and an input format for the MCU module. The USB module 2400 can have ports 2407, 2409, 2411, and 2413, which can make up parts of USB input port 2324 and USB output port 2326. The USB module 2400 can have a host detector 2403 to detect the presence of a USB compatible host 2401, e.g., when coupled via a voltage line VBUS 2415. Switch 2419 can be open to prevent port 2407 from electrically coupling with port 2409. Differential pair line DP/DM 2417 can couple from the USB host through port 2411 to the host detector 2403 and to the physical layer interface 2405. Switch 2421 can couple DP/DM 2417 to the physical layer interface 2405 to communicate with the MCU 2306, and switch 2421 can prevent the DP/DM differential pair from electrically coupling to port 2413. In this configuration, no portable device is present. The charging device 100 can communicate with the USB host 2401 and negotiate to receive electrical power, such as the highest amount of power supported by the USB host 2401 or a power level that the charging device 100 is configured to utilize. In some embodiments, the USB module 2400 will first register as a portable device with the USB host 2401 to enable data communication, e.g., through the physical layer interface 2405. If no data is received for a certain period of time, then the USB module 2400 can break the connection with the USB host 2401 and reregister with the USB host as a dedicated charging downstream port, which can enable transfer of higher power levels from the USB host (e.g., power source 180) to the charging device 100.

FIG. 25 is a schematic view of an example embodiment of a USB module in a second configuration 2500. A USB device, which can be electronic device 150, is coupled to the USB module 2500. An electronic device detector (not shown) can detect the presence of a USB device 2423, which can be the electronic device 150. A voltage line VBUS 2427 couples the USB device 2423 through port 2409 and through closed switch 2419 to the host detector and also to the voltage line VBUS 2415 of the USB host 2421. Switch 2421 is in a position to couple the differential pair line DP/DM 2417 of the USB host 2421 to the differential pair line 2425 for the USB device 2423. Switch 2421 disconnects the USB host 2421 from the physical layer interface 2405. The USB module 2500 can enable this USB bypass configuration to electrically couple the voltage line VBUS 2415 of the USB host 2421 to the voltage line VBUS 2427 of the USB device 2423 and to electrically couple the data differential pairs 2417 of the USB host 2421 to data differential pairs 2425 of the USB device 2423. The charging device 100 can do this, for example, to enable communication between USB host 2421 and the USB device 2423. The charging device can also do this when the USB Host 2421 and USB device 2423 support the same maximum transfer of power. For example, when both the USB Host 2421 and USB device 2423 are USB 3.0 devices, the USB module can be configured in this USB bypass configuration. In some embodiments, if the USB host 2421 supports USB 3.0 and the USB device 2423 supports USB 2.0, the USB module 2500 can negotiate with the USB host 2421 for the maximum power available, and then the USB module 2500 can deliver the maximum power supported by the USB device 2423 to the USB device 2423 and divert excess power to the supplemental battery 102.

FIG. 26 is a schematic view of an example embodiment of a USB module in a third configuration. USB module 2600 is coupled to a power supply 2601, which in some embodiments is not USB compliant. The power supply 2601 can have a power line 2415 coupled through port 2407 to the host detector. The power line 2415 can also be coupled through switch 2419 and port 2409 to the USB device 2423. Switch 2421 is in a position disconnecting the physical layer interface from the USB device 2423. The USB module 2600 can register with the USB device 2423 as a dedicated charger.

Figure 27:
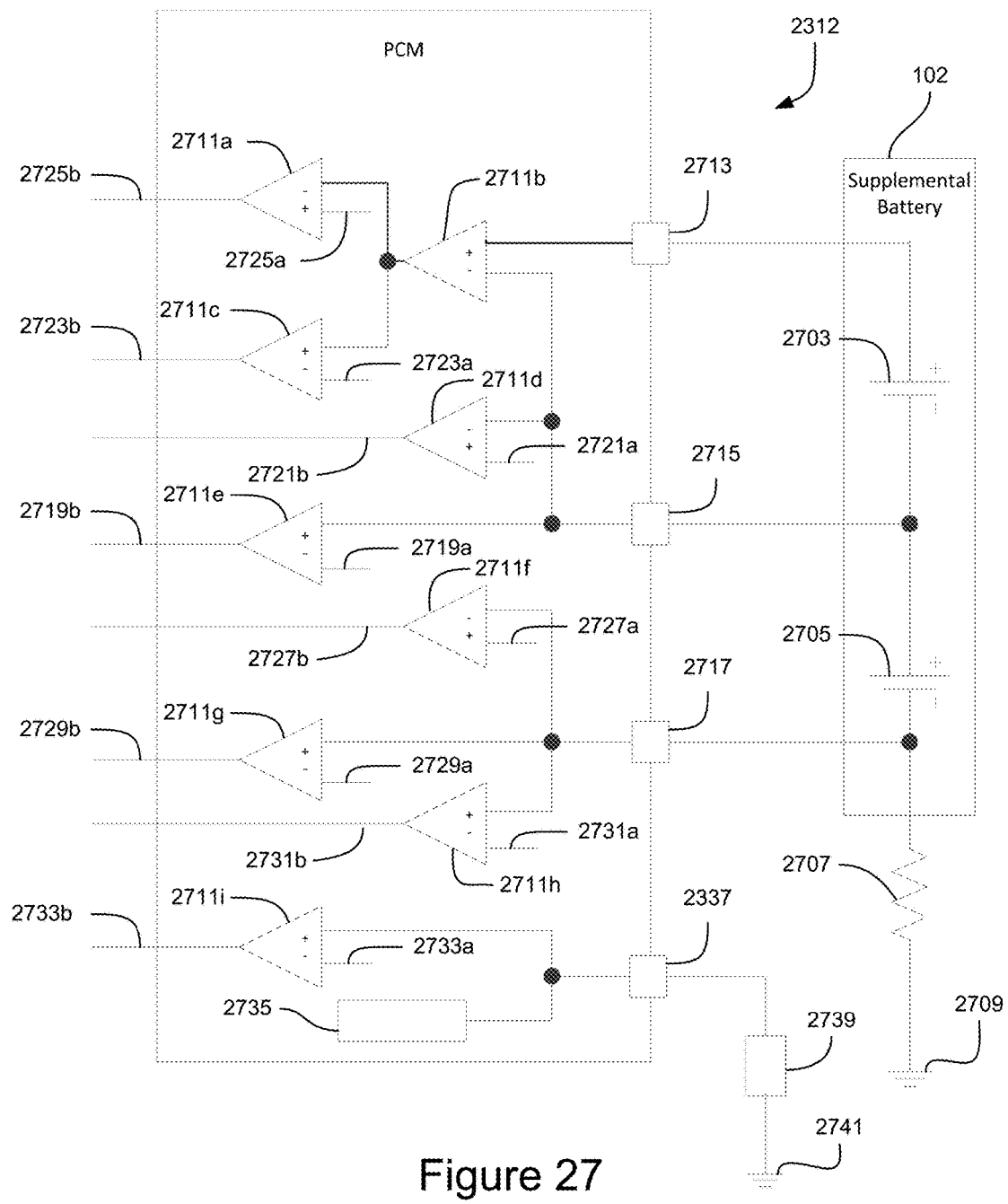
FIG. 27 is a schematic view of an example embodiment of a reconfigurable protection circuit module.

FIG. 27 is a schematic view of an example embodiment of a reconfigurable protection circuit module (PCM) 2312. The reconfigurable PCM 2312 protects the supplemental battery 102 against certain conditions, such as overvoltage, undervoltage, overcurrent, undercurrent, temperature, and/or short circuit problems during both charging and discharging.

The reconfigurable PCM 2312 can be programmed by the MCU module 2306 to detect a variety of health and safety parameters. The MCU module 2306 can program and reprogram values to drive one or more reference lines to control the different safety parameters. Whenever a fault is detected, one or more switches can be opened to disable the supplemental battery.

In some embodiments, a reconfigurable PCM 2312 protects a supplemental battery 102 comprising two battery cells, upper battery cell 2703 and lower battery cell 2705, arranged in a series configuration. The upper battery cell 2703 couples to the reconfigurable PCM at ports 2713 and 2715, and the lower battery cell 2705 couples to the reconfigurable PCM at ports 2715 and 2717. The supplemental battery 102 is coupled to a sense resistor 2707, which is coupled to a grounding reference 2709. Various other configurations are possible. For example, in some implementations, a single battery cell can be used.

An operational amplifier 2711*b* can be coupled at a noninverting input to the positive terminal of upper battery cell 2703 and coupled at an inverting input to the negative terminal of upper battery cell 2703.

An op amp 2711*a* can be coupled at an inverting input to the output of op amp 2711*b* (e.g., to receive a battery voltage for the upper battery cell 2703) and can be coupled at a noninverting input to a reference line 2725*a* for a minimum upper battery cell voltage (which can be a programmable variable that is set in a register, such as set by the MCU module 2306), and op amp 2711*a* outputs an undervoltage detection signal on line 2725*b* for the upper battery cell 2703. In some embodiments, the MCU module 2306, or another processor, can read the undervoltage detection signal from line 2725*b* and determine whether the battery voltage for the upper battery cell 2703 is below the programmed minimum battery voltage threshold. Many variations are possible. In some embodiments, a programmable undervoltage detection circuit can receive a first input for the voltage across the battery 102 (or across a battery cell of a multi-cell battery) and a second input that is a programmable battery minimum voltage threshold. The circuit can include a comparator to determine if the battery voltage of the first input is below the battery minimum voltage threshold of the second input. If the voltage is below the minimum battery voltage threshold (which can be read from a programmable memory such as a register), the circuit can output a signal (e.g., to the MCU module 2306) to take appropriate action (e.g., to raise the battery voltage, to disable the battery, etc.)

An op amp 2711*c* can be coupled at a noninverting input to the output of op amp 2711*b* (e.g., to receive a battery voltage for the upper battery cell 2703) and can be coupled at an inverting input to a reference line 2723*a* for a maximum upper battery cell voltage (which can be a programmable variable that is set in a register, such as set by the MCU module 2306), and the op amp 2711*c* can output an overvoltage detection signal on line 2723*b*. In some embodiments, the MCU module 2306, or another processor, can read the overvoltage detection signal from line 2723*b* and determine whether the battery voltage for the upper battery cell 2703 is above the programmed maximum battery voltage threshold. Many variations are possible. In some embodiments, a programmable overvoltage detection circuit can receive a first input for the voltage across the battery 102 (or across a battery cell of a multi-cell battery) and a second input that is a programmable battery maximum voltage threshold. The circuit can include a comparator to determine if the battery voltage of the first input is above the maximum battery voltage threshold of the second input. If the battery voltage is above the maximum battery voltage threshold (which can be read from a memory, such as a programmable register), the circuit can output a signal (e.g., to the MCU module 2306) to take appropriate action (e.g., the lower the battery voltage, to disable the battery 102, etc.).

An op amp 2711*d* can be coupled at an inverting input to the positive terminal of lower battery cell 2705 (e.g., to receive a battery voltage for the lower battery cell 2705) and can be coupled at a noninverting input to a reference line 2721*a* for a minimum battery voltage (which can be a programmable variable that is set in a register, such as set by the MCU module 2306), and op amp 2711*d* can output an undervoltage detection signal on line 2721*b* for the lower battery cell 2705. In some embodiments, the MCU module 2306, or another processor, can read the undervoltage detection signal from line 2721b and determine whether the battery voltage for the lower battery cell 2705 is below the programmed minimum battery voltage threshold. Many variations are possible. In some embodiments, a programmable undervoltage detection circuit can receive a first input for the voltage across the battery 102 (or across a battery cell of a multi-cell battery) and a second input that is a programmable battery minimum voltage threshold. The circuit can include a comparator to determine if the battery voltage of the first input is below the battery minimum voltage threshold of the second input. If the voltage is below the minimum battery voltage threshold (which can be read from a programmable memory such as a register), the circuit can output a signal (e.g., to the MCU module 2306) to take appropriate action (e.g., to raise the battery voltage, to disable the battery, etc.)

An op amp 2711e can be coupled at a noninverting input to the positive terminal of lower battery cell 2705 (e.g., to receive a battery voltage for the lower battery cell 2705) and can be coupled at an inverting input to a reference line 2719a for a maximum lower cell battery voltage (which can be a programmable variable that is set in a register, such as set by the MCU module 2306), and op amp 2711e can output a lower cell overvoltage detection signal on line 2719b for the lower battery cell 2705. In some embodiments, the MCU module 2306, or another processor, can read the overvoltage detection signal from line 2719b and determine whether the battery voltage for the lower battery cell 2705 is above the programmed maximum battery voltage threshold. Many variations are possible. In some embodiments, a programmable overvoltage detection circuit can receive a first input for the voltage across the battery 102 (or across a battery cell of a multi-cell battery) and a second input that is a programmable battery maximum voltage threshold. The circuit can include a comparator to determine if the battery voltage of the first input is above the maximum battery voltage threshold of the second input. If the battery voltage is above the maximum battery voltage threshold (which can be read from a memory, such as a programmable register), the circuit can output a signal (e.g., to the MCU module 2306) to take appropriate action (e.g., the lower the battery voltage, to disable the battery 102, etc.).

An op amp 2711f can be coupled at an inverting input to the negative terminal of lower battery cell 2705 (e.g., to receive a signal indicative of a battery discharge current from the battery 102) and can be coupled at a noninverting input to a reference line 2727a for a maximum battery discharge current threshold signal (which can be a programmable variable that is set in a register, such as set by the MCU module 2306), and op amp 2711f can output a battery discharge current protection signal on line 2727b. In some embodiments, the MCU module 2306, or another processor, can read the battery discharge current protection signal from line 2727b and determine whether the battery discharge current is above the programmed maximum battery discharge current threshold. Many variations are possible. In some embodiments, a programmable battery current protection circuit can receive a first input corresponding to the amount of current discharged from the battery 102 and a second input that is a programmable battery maximum current discharge threshold. The circuit can include a comparator to determine if the battery discharge current of the first input is above the maximum battery discharge current threshold of the second input. If the battery current discharge is above the maximum battery current discharge threshold (which can be read from a memory, such as a programmable register), the circuit can output a signal (e.g., to the MCU module 2306) to take appropriate action (e.g., the lower the battery discharge current, to disable the battery 102, etc.).

An op amp 2711g can be coupled at a noninverting input to the negative terminal of lower battery cell 2705 and can be coupled at an inverting input to a reference line 2729a for a short circuit reference voltage (which can be a programmable variable that is set in a register, such as set by the MCU module 2306), and op amp 2711g can output a short circuit protection signal on line 2727b. Many variations are possible. The op amp 2711g can be configured to detect a short circuit. The op amp 2711g can receive an input for the voltage across an external sense resistor, which can be in series with the battery 102 (e.g., using an analog comparator). When that voltage exceeds the short circuit reference voltage, the circuit can send a signal indicative of a short circuit (e.g., to the MCU module 2306) and appropriate action can be take, such as disabling the battery 102).

An op amp 2711h can be coupled at a noninverting input to the negative terminal of lower battery cell 2705 (e.g., to receive a signal indicative of a battery charging current used to charge the battery 102) and can be coupled at an inverting input to a reference line 2731a for a maximum battery charging current threshold signal (which can be a programmable variable that is set in a register, such as set by the MCU module 2306), and op amp 2711h can output a maximum battery charging current protection signal on line 2731b. In some embodiments, the MCU module 2306, or another processor, can read the battery charging current protection signal from line 2731b and determine whether the battery charging current is above the programmed maximum battery charging current threshold. Many variations are possible. In some embodiments, a programmable battery current protection circuit can receive a first input corresponding to the amount of current charging the battery 102 and a second input that is a programmable battery maximum charging current threshold. The circuit can include a comparator to determine if the battery charging current of the first input is above the maximum battery charging current threshold of the second input. If the battery charging current is above the maximum battery charging current threshold (which can be read from a memory, such as a programmable register), the circuit can output a signal (e.g., to the MCU module 2306) to take appropriate action (e.g., the lower the battery charging current, to disable the battery 102, etc.).

An op amp 2711i is coupled at a noninverting input to a temperature sensor (e.g., connected to a thermistor drive through port 2337 to a thermistor 2739, which can be coupled to a ground 2741 or other circuitry), to receive a battery temperature. Op amp 2711i can be coupled at an inverting input to a reference line 2733a for a maximum battery temperature signal (which can be a programmable variable that is set in a register, such as set by the MCU module 2306). Op amp 2711i can output a battery temperature detection signal on line 2733b. In some embodiments, the MCU module 2306, or another processor, can read the battery temperature detection signal from line 2733b and determine whether the battery temperature is above the programmed maximum battery temperature threshold. Many variations are possible. In some embodiments, a programmable battery temperature protection circuit can receive a first input corresponding to the battery temperature (e.g., received from a thermistor or other temperature sensor) and a second input that is a programmable battery maximum temperature threshold. The circuit can include a comparator to determine if the battery temperature of the first input is above the maximum battery temperature threshold of the second input. If the battery temperature is above the maximum battery temperature threshold (which can be read from a memory, such as a programmable register), the circuit can output a signal (e.g., to the MCU module 2306) to take appropriate action (e.g., the lower the battery discharge or charging power, to disable the battery 102, etc.).

The reconfigurable PCM can use analog circuits, and not digital circuits, for monitoring the battery voltage, discharge current, charging current, temperature, and short circuit detection. In some implementations analog circuits can be faster than digital circuits and in some cases can be more reliable since the analog circuits may operate independent of the device firmware and digital components. For example, the output of the various detection circuits (e.g., op amps 2711*a-i*) can output a signal (e.g., an amplified voltage) that is indicative of a comparison of the measured value (e.g., battery voltage, charging current, discharge current, temperature) to the reference value (e.g., the maximum or minimum battery voltage threshold, the maximum charging current threshold, the maximum discharge current threshold, the maximum temperature threshold), and the output signal can be received by one or more analog circuits which can be configured to take appropriate action based on the output signals from the reconfigurable PCM. For example, if the signal (e.g., the amplified voltage) of line 2731*b* indicates that the battery charging current is above the maximum battery charging current threshold, the analog circuit can be configured to open a switch that discontinues charging of the battery 102 (e.g., without use of any digital components).

Figure 28:
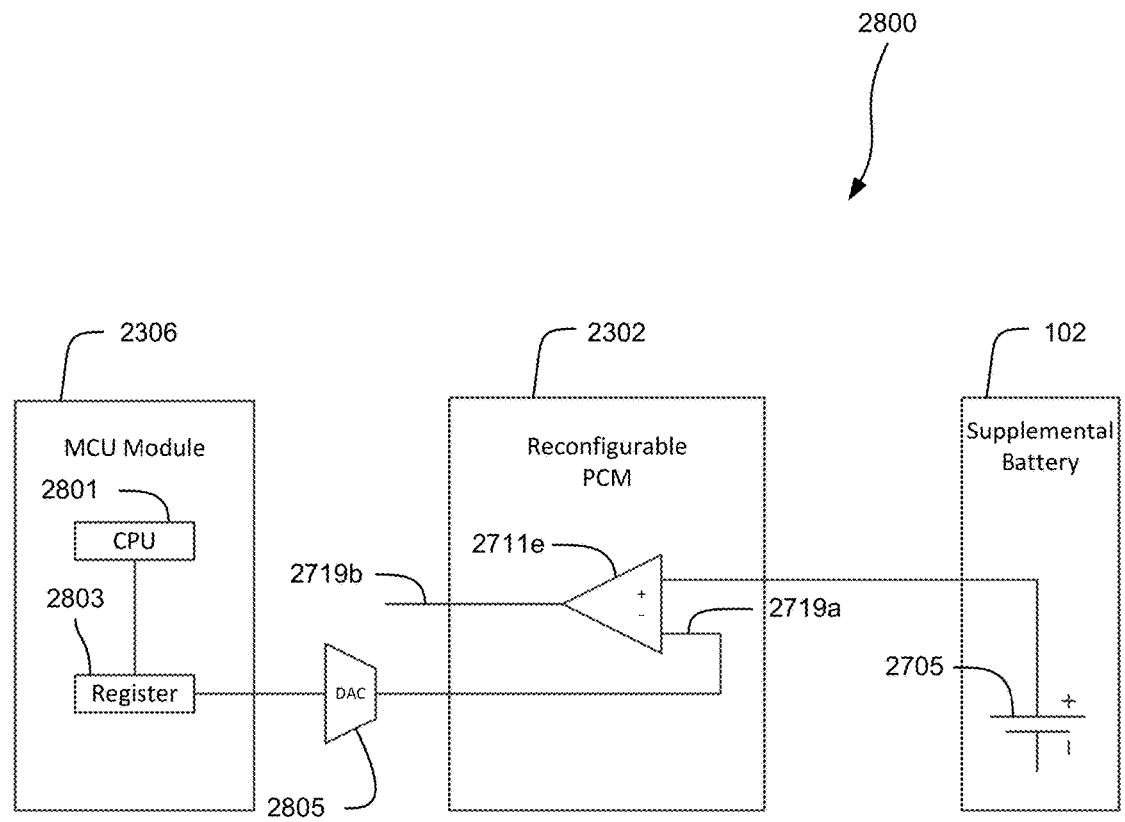
FIG. 28 is schematic view of an example embodiment of a reconfigurable system for protecting a battery.

FIG. 28 is schematic view of an example embodiment of a reconfigurable system 2800 for protecting a battery. An MCU module 2306 has a CPU 2801 that sets a digital overvoltage protection limit in a register 2803. The register output is coupled to a digital to analog converter 2805, which generates an analog representation of the overvoltage protection limit that is input through a line 2719*a* to the inverting input of an op amp 2711*e* in the reconfigurable PCM 2312. The noninverting input of the op amp 2711*e* is coupled to the positive terminal of a battery cell 2705 in the supplemental battery 102. The op amp generates an output signal on line 2719*b* for detecting an overvoltage problem.

Figure 29:
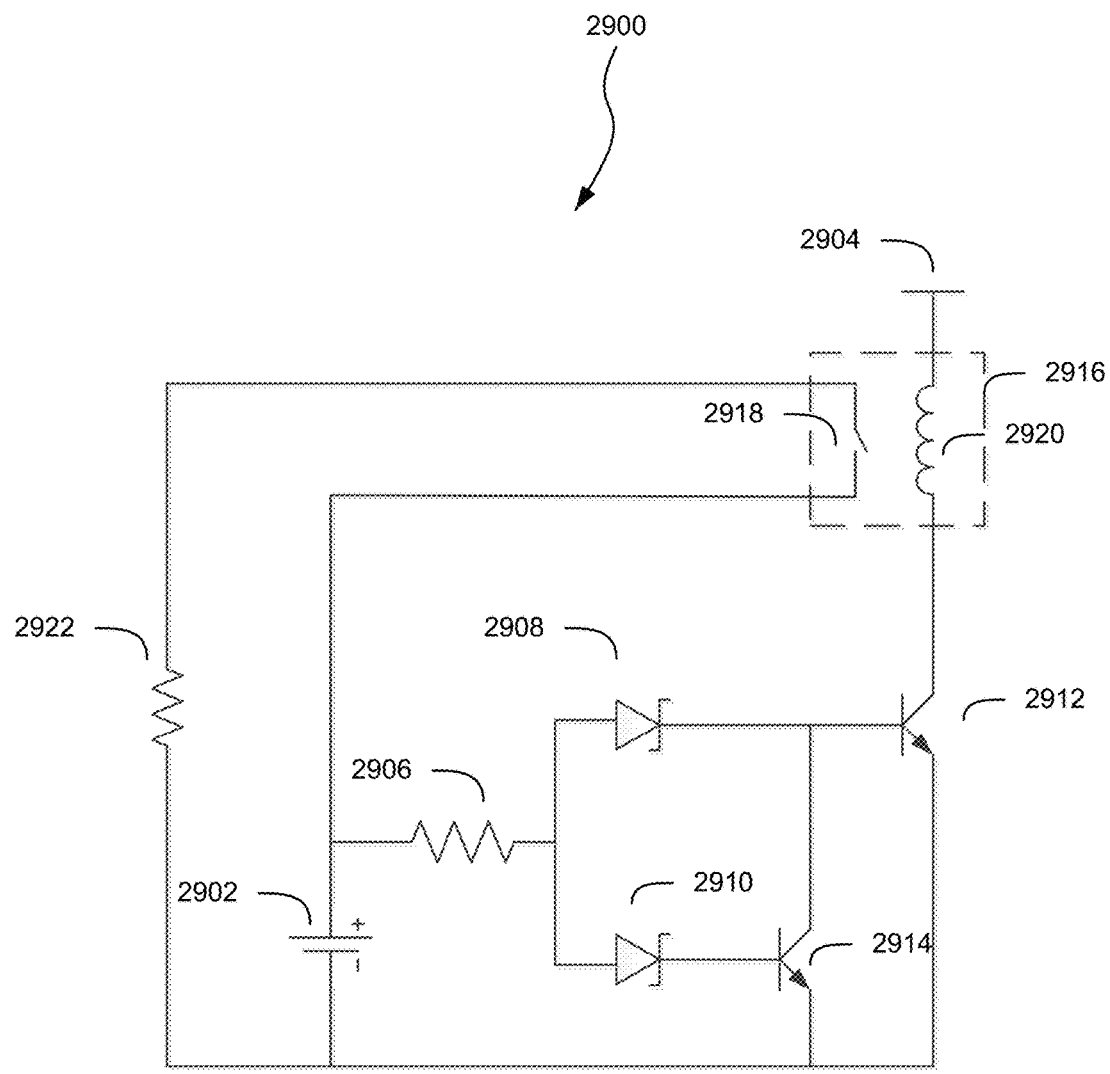
FIG. 29 is a schematic view of an example embodiment of a window control circuit.

FIG. 29 is a schematic view of an example embodiment of a window control circuit 2900. The window control circuit is one example of a circuit that can protect a load 2922 from overvoltage or undervoltage conditions on a battery 2902 through the use of a switch 2916 that opens a circuit 2918 when current flows through 2920 from a voltage source 2904. An analog-to-digital converter (ADC) can be used to perform the same function, and many other variations are possible.

A battery 2902 is coupled to a resistor 2906 that is coupled to two diodes 2908, 2910. When a battery 2902 voltage reaches a minimum value, diode 2908 can turn on when and turn on transistor 2912, which will close the circuit at 2918 and couple the battery to the load 2922. When the battery 2902 voltage reaches a overvoltage, diode 2910 turns and enables transistor 2914, which pulls down the voltage from the base of transistor 2912, turning off transistor 2912 which stops the current through 2920 and opens up the circuit at 2918.

The systems and methods disclosed herein can be implemented in hardware, software, firmware, or a combination thereof. Software can include computer-readable instructions stored in memory (e.g., non-transitory, tangible memory, such as solid state memory (e.g., ROM, EEPROM, FLASH, RAM), optical memory (e.g., a CD, DVD, Blu-ray disc, etc.), magnetic memory (e.g., a hard disc drive), etc.), configured to implement the algorithms on a general purpose computer, one or more special purpose processors, or combinations thereof. For example, one or more computing devices, such as a processor, may execute program instructions stored in computer readable memory to carry out processes disclosed herein. Hardware may include state machines, one or more general purpose computers, and/or one or more special purpose processors. While certain types of user interfaces and controls are described herein for illustrative purposes, other types of user interfaces and controls may be used.

The embodiments discussed herein are provided by way of example, and various modifications can be made to the embodiments described herein. Certain features that are described in this disclosure in the context of separate embodiments can also be implemented in combination in a single embodiment. Conversely, various features that are described in the context of a single embodiment can be implemented in multiple embodiments separately or in various suitable subcombinations. Also, features described in connection with one combination can be excised from that combination and can be combined with other features in various combinations and subcombinations.

Similarly, while operations are depicted in the drawings or described in a particular order, the operations can be performed in a different order than shown or described. Other operations not depicted can be incorporated before, after, or simultaneously with the operations shown or described. In some instances, certain operations described herein can be omitted or can be combined with other disclosed operations. In certain circumstances, parallel processing or multitasking can be used. Also, in some cases, the operations shown or discussed can be omitted or recombined to form various combinations and subcombinations.

What is claimed is:

1. A charging device for charging a mobile electronic device, the charging device comprising:
   a supplemental battery;
   an input interface configured to receive electrical power from an external power source;
   an output interface configured to output electrical power to a mobile electronic device;
   a controller;
   a charging electrical pathway from the input interface to the supplemental battery, wherein the controller is configured to direct electricity from the input interface, along the charging electrical pathway, to the supplemental battery to charge the supplemental battery;
   a discharge electrical pathway from the supplemental battery to the output interface, wherein the controller is configured to direct electricity from the supplemental battery, along the discharge electrical pathway, to the output interface to charge the mobile electronic device;
   a bypass electrical pathway from the input interface to the output interface, wherein the controller is configured to direct electricity from the input interface, along the bypass electrical pathway, to the output interface to charge the mobile electronic device; and
   a computer-readable memory element;
   wherein the controller is configured to:
     store battery health information about the supplemental battery in the computer-readable memory element, wherein the battery health information includes a health score;
     adjust the health score by a first amount upon at least one of charging and discharging the supplemental battery at a first capacity range;

adjust the health score by a second amount upon at least one of charging and discharging the supplemental battery at a second capacity range; and disable or reduce electrical current along one or more of the charging electrical pathway, the discharge electrical pathway, and the bypass electrical pathway based at least in part on the battery health information.

2. The charging device of claim 1, comprising a protective case configured to at least partially enclose the mobile electronic device.

3. The charging device of claim 1, further comprising a temperature sensor, wherein the battery health information includes temperature information received from the temperature sensor.

4. The charging device of claim 1, wherein the battery health information includes charge cycle information.

5. The charging device of claim 1, wherein the controller is configured to reduce an energy capacity to which the supplemental battery is charged based in part on the battery health information.

6. The charging device of claim 1, wherein:
upon detection of a major risk event, the controller is configured to:
disable the supplemental battery from charging and discharging; and
provide a notification to a user; and
upon detection of a minor risk event, the controller is configured to:
diagnose the supplemental battery to determine whether the supplemental battery is unrecoverable, partially recoverable, or fully recoverable;
upon a determination that the supplemental battery is unrecoverable, the controller is configured to:
disable the supplemental battery from charging and discharging; and
provide a notification to a user;
upon a determination that the supplemental battery is partially recoverable, the controller is configured to resume charging and discharging of the supplemental battery at a reduced performance level; and
upon a determination that the supplemental battery is fully recoverable, the controller is configured to resume normal charging and discharging of the supplemental battery.

7. The charging device of claim 6, wherein the major risk event comprises a temperature measurement of less than about −10 degrees Celsius or greater than about 60 degrees Celsius, and wherein the minor risk event comprises a temperature measurement between about −10 degrees Celsius and about 0 degrees Celsius or between about 45 degrees Celsius and about 60 degrees Celsius.

8. A charging device for charging a mobile electronic device, the charging device comprising:
a supplemental battery;
an input interface configured to receive electrical power from an external power source for charging the supplemental battery;
an output interface configured to output electrical power to a mobile electronic device; and
a controller configured to:
receive battery health information for the supplemental battery, wherein the battery health information includes a health score;
adjust the health score by a first amount upon at least one of a charging and discharging the supplemental battery at a first capacity range;
adjust the health score by a second amount upon at least one of charging and discharging the supplemental battery at a second capacity range; and
disable or limit charging or discharging of the supplemental battery based at least in part on the battery health information.

9. The charging device of claim 8, comprising:
a protective case configured to at least partially enclose the mobile electronic device, the protective case comprising:
a lower case portion comprising:
a back portion configured to be positioned along at least a portion of a back side of the mobile electronic device;
a bottom portion configured to be positioned along at least a portion of a bottom of the mobile electronic device;
a right side portion configured to be positioned along at least a portion of a right side of the mobile electronic device;
a left side portion configured to be positioned along at least a portion of a left side of the mobile electronic device;
an open top side to facilitate insertion of the mobile electronic device into the lower case portion;
wherein the supplemental battery is disposed in the back portion of the lower case portion;
wherein the input interface is on an exterior of the lower case portion; and
wherein the output interface is on an interior of the lower case portion, the output interface configured to engage an electrical port on the mobile electronic device; and
an upper case portion comprising:
a top portion configured to be positioned along at least a portion of a top of the mobile electronic device;
wherein the upper case portion is configured to removably couple to the lower case portion to hold the mobile electronic device in the protective case; and
wherein a front opening of the protective case is configured such that a display of the mobile electronic device is visible through the front opening when the upper case portion is coupled to the lower case portion.

10. The charging device of claim 9, further comprising a battery health monitor comprises a temperature sensor configured to measure a temperature for the charging device.

11. The charging device of claim 9, wherein the battery health information includes charge cycle information.

12. The charging device of claim 9, further comprising a battery health monitor is configured to reduce an energy capacity to which the supplemental battery is charged in response to a change in the health score.

13. The charging device of claim 8, comprising a protective case configured to at least partially enclose the mobile electronic device.

14. The charging device of claim 8, further comprising a temperature sensor, wherein the battery health information includes temperature information received from the temperature sensor.

15. The charging device of claim 8, wherein the battery health information includes charge cycle information.

16. The charging device of claim 8, wherein the controller is configured to reduce an energy capacity to which the supplemental battery is charged based at least in part on the battery health information.

17. The charging device of claim 8, wherein:
upon detection of a major risk event, the controller is configured to:
   disable the supplemental battery from charging and discharging; and
   provide a notification to a user; and
upon detection of a minor risk event, the controller is configured to:
   diagnose the supplemental battery to determine whether the supplemental battery is unrecoverable, partially recoverable, or fully recoverable;
   upon a determination that the supplemental battery is unrecoverable, the controller is configured to:
      disable the supplemental battery from charging and discharging; and
      provide a notification to a user;
   upon a determination that the supplemental battery is partially recoverable, the controller is configured to resume charging and discharging of the supplemental battery at a reduced performance level; and
   upon a determination that the supplemental battery is fully recoverable, the controller is configured to resume normal charging and discharging of the supplemental battery.

18. The charging device of claim 17, wherein the major risk event comprises a temperature measurement of less than about −10 degrees Celsius or greater than about 60 degrees Celsius, and wherein the minor risk event comprises a temperature measurement between about −10 degrees Celsius and about 0 degrees Celsius or between about 45 degrees Celsius and about 60 degrees Celsius.

* * * * *